United States Patent [19]
Uchiyama
[11] Patent Number: 5,024,134
[45] Date of Patent: Jun. 18, 1991

[54] PITCH CONTROL DEVICE FOR ELECTRONIC STRINGED INSTRUMENT

[75] Inventor: Shigeru Uchiyama, Sayama, Japan
[73] Assignee: Casio Computer Co., Ltd., Tokyo, Japan

[21] Appl. No.: 345,101
[22] Filed: Apr. 28, 1989

[30] Foreign Application Priority Data

May 2, 1988 [JP] Japan ............................... 63-109625

[51] Int. Cl.[5] ............................................. G01H 1/18
[52] U.S. Cl. ....................................... 84/654; 84/722; 84/DIG. 30
[58] Field of Search ................. 84/616, 654, 681, 742, 84/454, DIG. 18, DIG. 30, 646, 722

[56] References Cited

U.S. PATENT DOCUMENTS 4,117,757 10/1978 Akamatu .
4,235,141 11/1980 Eventoff .
4,280,387 7/1981 Moog ............................... 84/681 X
4,321,852 4/1982 Young, Jr. .
4,336,734 6/1982 Polson .
4,377,961 3/1983 Bode ................................... 84/681
4,468,997 9/1984 Young, Jr. .
4,570,521 2/1986 Fox .
4,606,255 8/1986 Hayashi et al. .
4,627,323 12/1986 Gold .................................... 84/654
4,633,748 1/1987 Takashima et al. .
4,658,690 4/1987 Aitken et al. .
4,677,419 6/1987 Meno .
4,723,468 2/1988 Takabayashi et al. .
4,760,767 8/1988 Tsurubuchi .
4,873,904 10/1989 Norimatsu ............................ 84/722

FOREIGN PATENT DOCUMENTS 0227906 7/1987 European Pat. Off. .
0251329 1/1988 European Pat. Off. .
53-32708 3/1978 Japan .
55-87196 7/1980 Japan .
55-162132 11/1980 Japan .
55-159495 12/1980 Japan .
58-175596 11/1983 Japan .
61-26090 2/1986 Japan .
62-163099 7/1987 Japan .
62-174795 7/1987 Japan .
63-2095 1/1988 Japan .
1478722 7/1977 United Kingdom .
87/00330 1/1987 World Int. Prop. O. .

*Primary Examiner*—Stanley J. Witkowski
*Attorney, Agent, or Firm*—Frishauf, Holtz, Goodman & Woodward

[57] ABSTRACT

A plurality of strings are extended along a surface of a body, and an operation by a player with respect to the strings is detected by two detection systems. The first detection system is operated when a string vibration is started, and electrically obtains an operated fret position of the string by detecting an ON/OFF operation of a switch arranged below each fret. The second detection system is enabled after the first detection system is enabled, and directly measures a pitch period of the string vibration. The second detection system detects a change in pitch by a choking operation or an arming operation of a tremolo arm with respect to the string after tone generation is started.

20 Claims, 40 Drawing Sheets

PITCH CONTROL DEVICE FOR ELECTRONIC STRINGED INSTRUMENT

BACKGROUND OF THE INVENTION

1. Field of the Invention

The present invention relates to an electronic stringed instrument such as an electronic guitar, a guitar synthesizer, and the like and, more particularly, to a tone generation start control technique and a pitch control technique upon plucking of a string 2. Description of the Related Art In a conventional acoustic guitar or the like, a plurality of frets are provided at a plurality of positions of a body portion called a neck below an extension direction of the strings. A string is depressed against the body portion at any position between these frets, so that an effective string length of the string can be changed in accordance with the depressed position. In an electrical musical instrument called an electric guitar, a string is plucked while changing an effective string length of a string by the fret operation, a string vibration caused by the plucking operation is picked up by an electromagnetic pickup or the like and is amplified by an amplifier, thereby producing a guitar sound.

In recent years, an electronic stringed instrument in which a musical tone generator constituted by an analog or digital circuit and the like is controlled by the fret operation and the plucking operation with respect to the guitar to synthesize and produce a musical tone, has been developed.

As a first prior art of the electronic stringed instrument, mechanical or electrical fret switches or detection elements are embedded inside a neck. A fret switch or detection element at a specific position by the fret operation is operated, and a fret number is then detected and output. A start point of a string plucking operation is detected by another sensor, so that a musical tone generator is caused to generate a musical tone having a pitch corresponding to the fret number.

More specifically, the following articles are known:

(a) U.S. Pat. No. 4,235,141 (issued on Nov. 25, 1980), inventor: Eventoff (b) U.S. Pat. No. 4,336,734 (issued on Jun. 29, 1982), inventor: Polson (c) U.S. Pat. No. 4,468,997 (issued on Sep. 4, 1984), inventor: Young, Jr (d) U.S. Pat. No. 4,570,521 (issued on Feb. 18, 1986), inventor: Fox (e) U.S. Pat. No 4,658,690 (issued on Apr. 21, 1987), inventor: Aitken et al.

(f) U.S. Pat. No. 4,760,767 (issued on Aug. 2, 1988), inventor: Tsurubuchi (g) Japanese Utility Model Disclosure (Kokai) No. 58-175596 (disclosed on Nov. 24, 1983), applicant: Kashio Keisanki Kabushiki Kaisha (h) Japanese Patent Disclosure (Kokai) No. 62-174795 (disclosed on July 31, 1987), applicant: Nippon Gakki Seizo Kabushiki Kaisya (i) Japanese Patent Disclosure (Kokai) No. 63-2095 (disclosed on Jan. 7, 1988), applicant: De Dianous (j) W087-00330 (published on Jan. 15, 1987), applicant: Stepp Electronics Limited There are the following U.S. patent applications assigned to the present assignee in association with this technique:

(i) U.S. Ser. No. 069,612 (filed on July, 1, 1987), inventor: Kashio et al.

(ii) U.S. Ser. No. 094,402 (filed on Sep. 8, 1987), inventor: Murata et al.

(iii) U.S. Ser. No. 171,883 (filed on Mar. 21, 1988), inventor: Matsumoto et al.

In a second prior art, each fret is formed by an electric conductive member, and each string is formed by an electric conductive member having an electrical resistance. A current is rendered to flow through the string, so that an effective length of a string from a support portion of the string on the plucking side to a fret contacting the string upon depressing the string is detected as a voltage corresponding to the resistance of the string, thereby detecting a depressed fret position and performing pitch control of a musical tone.

More specifically, the following articles are known:

(k) U.S. Pat. No. 4,677,419 (issued on Jun. 30, 1987), inventor: Meno (l) Japanese Patent Disclosure (Kokai) No. 53-32708 (disclosed on Mar. 28, 1978), applicant: Kabushiki Kaisya Kawai Gakki Seisakusyo In a third prior art, an ultrasonic wave is transmitted from a portion near a support portion of each string at a plucking side to the string, and a time period until the ultrasonic wave is reflected by a fret contacting the string upon depressing the string and is returned is detected, thereby detecting a depressed fret position and performing pitch control of a musical tone.

More specifically, the following articles are known:

(m) U.S. Pat. No. 4,723,468 (issued on Feb. 9, 1988), inventor: Takabayashi et al.

In a fourth prior art, a string vibration itself is detected by an electromagnetic pickup or the like, and a pitch period is extracted from the string vibration waveform in real time so that a musical tone is generated to have a pitch corresponding to the pitch period, unlike in the first to third prior arts.

More specifically, the following articles are known:

(n) U.S. Pat. No. 4,117,757 (issued on Oct. 3, 1978), inventor: Akamatsu (o) U.S. Pat. No. 4,606,255 (issued on Aug. 19, 1986), inventor: Hayashi et al.

(p) U.S. Pat. No. 4,633,748 (issued on Jan. 6, 1987), inventor: Takashima et al.

(q) U.S. Pat. No. 4,688,464 (issued on Aug. 25, 1987), inventor: Gibson et al.

(r) Japanese Patent Disclosure (Kokai) No. 55-87196 (disclosed on July 1, 1980), applicant: Nippon Gakki Seizo Kabushiki Kaisya (s) Japanese Patent Disclosure (Kokai) No. 55-159495 (disclosed on Dec. 11, 1980), applicant: Nippon Gakki Seizo Kabushiki Kaisya (t) Japanese Utility Model Disclosure (Kokai) No. 55-162132 (disclosed on Nov. 20, 1980), applicant: Keio Giken Kougyo Kabushiki Kaisya (u) Japanese Patent Disclosure (Kokai) No. 61-26090 (disclosed on Feb. 5, 1986), applicant: Seikou Denshi Kougyo Kabushiki Kaisya (v) Japanese Patent Disclosure (Kokai) No. 62-163099 (disclosed on July 18, 1987), applicant: Fuji Gen Gakki Seizo Kabushiki Kaisya There are the following U.S. patent applications assigned to the present assignee in association with this technique:

(iv) U.S. Ser. No. 112,780 (filed on Oct. 22, 1987), inventor: Uchiyama et al.

(v) U.S. Ser. No. 184,099 (filed on Apr. 20, 1988), inventor: Iba et al.

(vi) U.S. Ser. No. 256,398 (filed on Oct. 7, 1988), inventor: Iba et al.

(vii) U.S. Ser. No. 252,914 (filed on Oct. 3, 1988), inventor: Uchiyama (viii) U.S. Ser. No. 256,400 (filed on Oct. 11, 1988), inventor: Matsumoto (ix) U.S. Ser. No. 282,510 (filed on Dec. 9, 1988), inventor: Obata (x) U.S. Ser. No. 290,981 (filed on Dec. 28, 1988), invention: Murata et al.

(xi) U.S. Ser. No. 329,418 (filed on Mar. 27, 1989), inventor: Obata

In the above-mentioned prior arts, the following problems are left unsolved.

In the first to third prior arts, the fret position can be detected simultaneously with the fret operation. Since the fret operation is generally performed at an earlier timing than the plucking operation of the string, pitch control corresponding to the fret position can be performed with a short response time. However, since a pitch corresponding to the fret position can only be obtained, even when a choking operation peculiar to a guitar (an operation for increasing a tension of a string by shifting a string in a direction perpendicular to an extension direction of the string while depressing it) is performed, pitch data cannot be changed as long as a depressed fret position is left unchanged. Therefore, a performance effect with poor expression can only be obtained.

In the fourth prior art, since a pitch is controlled on the basis of a pitch period extracted from a string vibration waveform in real time, a choking operation can be faithfully coped with, and a delicate nuance in string vibration can be reflected. Therefore, a performance effect with abundant expressions can be obtained. However, in order to obtain an accurate pitch period from a string vibration waveform, it must be waited until waveform data for at least one period is input from the beginning of inputting of the string vibration waveform, and a musical tone is generated thereafter. Therefore, when a vibration period of a string is short, there is no problem. However, when a vibration period is prolonged like a bass string, a delay time of 10 msec or more is generated from when a string is plucked until tone generation is started. Thus, a response time with respect to the plucking operation is prolonged, resulting in unnatural musical tone generation.

SUMMARY OF THE INVENTION

It is an object of the present invention to provide an electronic stringed instrument which has a short response time with respect $C>(\frac{3}{8})\times$a string, and can execute pitch control after the plucking operation faithfully to a string vibration, thus allowing abundant performance expressions. b, More specifically, according to the present invention, there is provided an electronic stringed instrument in which a vibration of at least one extended string is detected to generate a corresponding musical tone signal from musical tone generating means, comprising a plurality of frets which are arranged at a plurality of positions on a body portion below an extending direction of the string, and each of which is brought into contact with the string when the string is depressed against the body portion to change an effective string length of the string in accordance with the depression position, string depression position detecting means for detecting depressed position of said string, and for producing string depression data indicating depressed position of the string, string vibration waveform detecting means for detecting a string vibration waveform of the string whose effective string length is being changed, string vibration presence/ absence detecting means for detecting a presence/absence of a string vibration of the string, pitch extraction means coupled to said string vibration waveform detecting means for extracting pitch data from the string vibration waveform, and musical tone control means for, when the string vibration presence/absence detecting means detects generation of the string vibration, causing the musical tone generating means to start generation of the musical tone with a pitch according to the string depression data supplied from said string depression position detecting means, and thereafter causing the musical tone generating means to change the pitch of the musical tone, which is being generated, in accordance with the pitch data extracted by said pitch extraction means.

More specifically, the electronic musical instrument is applied to an electronic stringed instrument having at least one string extended on a main body. A plurality of frets are provided at a plurality of positions of a main body portion below an extension direction of the strings. When the string is depressed against the main body portion at any position between the frets, the string is brought into contact with the corresponding fret, and an effective string length of the string is changed in accordance with the depressed position, i.e., a fret operation can be performed.

A string depression position detection means detects string depression data indicating a fret position at which the string is depressed in a fret operation at that time. The means can be realized by e.g., fret switches, embedded in the main body in correspondence with the fret position, for detecting the depressed positions. Alternatively, the means can be realized by an effective string length detection means, using a string having an electrical resistance, for detecting a resistance from a string end to a depressed fret position to detect an effective string length, thereby detecting the depressed position. Alternatively, the means can be realized by a means wherein an ultrasonic transmission/reception means transmits an ultrasonic wave from a string end toward the depressed fret position, and receives the returning ultrasonic wave reflected from the depressed fret position to measure a turnaround time, thereby detecting the depressed position. Various other string depression position detection means based on other methods may be employed.

When a string is plucked in the depressed state, a string vibration caused by the plucking operation is detected by a string vibration waveform detection means as a string vibration waveform. The means can be realized by, e.g., an electromagnetic pickup. Alternatively, the means can be realized by commonly using the ultrasonic transmission/reception means as an embodiment of the string depression position detection means. Alternatively, the string vibration waveform detection means can be realized by an optical sensor or a piezoelectric element.

The presence/absence of the string vibration, i.e., a leading timing of a musical tone is detected by a string vibration presence/absence detection means. The means is realized by a means wherein a string vibration data detection means for converting the string vibration waveform output from the string vibration waveform detection means into digital data and sequentially detecting an effective peak value and a zero-crossing time immediately after or before the effective peak value is arranged at the output side of the string vibration waveform detection means, and when the effective peak value detected by the detection means during muting of a musical tone exceeds a predetermined threshold value, generation of the string vibration is detected.

Subsequently, a pitch extraction means extracts pitch data from a string vibration waveform detected by the string vibration waveform detection means. The means is realized as a means wherein a set of an effective peak value and a zero-crossing time immediately after or before the peak value, which are sequentially detected by the string vibration data detection means, is detected to extract pitch data, i.e., a pitch period as an interval of the zero-crossing times. Alternatively, the pitch period may be obtained from a time duration between adjacent peak points.

A musical tone is generated by a musical tone generation means. The means can employ various systems, e.g., a digital sound source means, an analog sound source means, or the like. For example, when a digital circuit is used, the means is realized by a memory for storing a digital musical tone waveform, waveform readout means for reading out the digital musical tone waveform from the memory at an address interval corresponding to a pitch on the basis of a tone generation start instruction from a musical tone control means (to be described later) and pitch control, means for converting the readout digital musical tone waveform into an analog waveform, amplifying the analog waveform, and then producing a corresponding musical sound, and the like.

Furthermore, a musical tone control means for controlling the musical tone generation means is provided.

With the above-mentioned means, a plurality of strings are extended parallel to each other above a musical instrument main body with different tensions like a conventional guitar. In this case, the string depression position detection means and the string vibration waveform detection means are arranged in units of strings.

The string vibration data detection means, the string vibration presence/absence detection means, the pitch extraction means, the musical tone generation means, and the musical tone control means time-divisionally perform operations for the plurality of strings.

The present invention can be applied to an electronic stringed instrument having no frets in addition to the electronic stringed instrument having frets. That is, at the beginning of tone generation, an effective string length is detected by the string depression position detection means to determine a pitch, and thereafter, a pitch of a tone to be generated is determined in accordance with a pitch of a string vibration.

In the electronic musical instrument with the above arrangement, when a player plucks a string and generation of a string vibration is detected by the string vibration presence/absence detection means, the musical tone control means causes the musical tone generation means to start generation of a musical tone at a pitch according to string depression data (corresponding to the depressed fret position) detected by the string depression position detection means by a string depression operation, e.g., a fret operation performed by the player immediately before or simultaneously with the plucking operation.

The presence/absence of the string vibration and the string depression data can be detected at a very early timing according to the above embodiment. Therefore, with the above operations, musical tone generation can be started with a very short response time with respect to the plucking operation of a string.

After the above-mentioned operations, the musical tone control means causes the musical tone generation means to change a pitch of a musical tone which is being generated in accordance with pitch data extracted by the pitch extraction means.

Thus, when the player intends to change a tension of the string by a choking operation or by operating a tremolo arm or the like after he plucks the string, pitch data can be extracted accordingly, and a pitch can be controlled. Therefore, a performance effect with abundant expressions can be obtained.

As described above, pitch determining data at the beginning of tone generation is obtained by the string vibration presence/absence detection means and the string depression position detection means, and subsequent pitch determining data is obtained by the pitch extraction means, so that musical tone control utilizing the characteristic features determined the above-mentioned respective pitch determining data can be performed. Thus, a natural musical tone well reflecting a player's will can be generated.

Furthermore, the above-mentioned operations are time-divisionally performed for a plurality of strings, thus enhancing the performance effect.

BRIEF DESCRIPTION OF THE DRAWINGS

Other objects and features of the present invention will be apparent for those who are skilled in the art from the description of preferred embodiments taken in conjunction with the accompanying drawings, in which.

DETAILED DESCRIPTION OF THE PREFERRED EMBODIMENTS

A plurality of embodiments of the present invention will now be described in detail.

In the following description, the embodiments are itemized in the order of underlined captions enclosed in symbols {}, (), <<>>, and <>.

{Outer Appearance of Electronic Stringed Instrument of First Embodiment}

Figure 1:
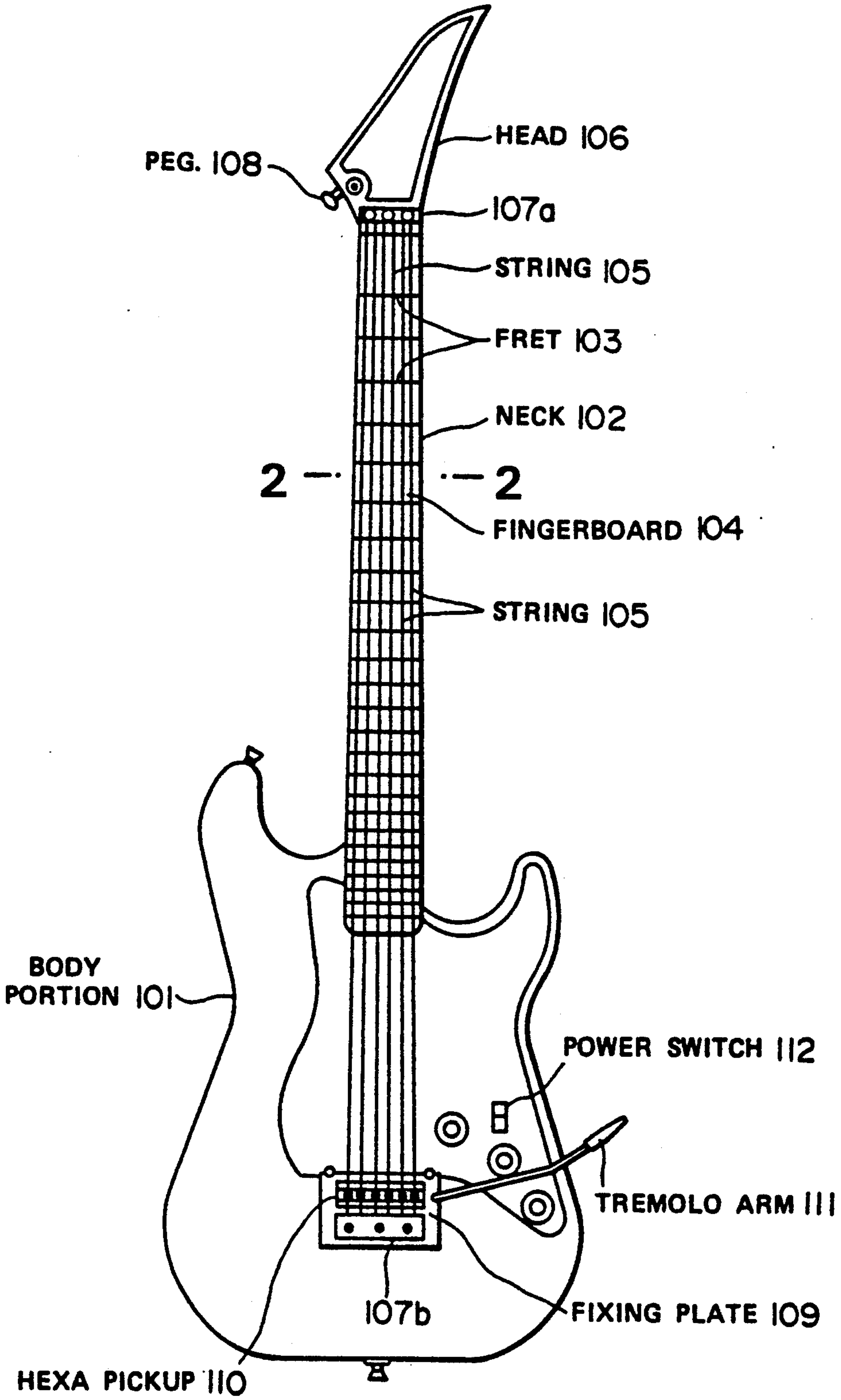
FIG. 1 is a plan view showing an outer appearance of an electronic stringed instrument according to a first embodiment of the present invention.

FIG. 1 is a plan view of an electronic stringed instrument according to a first embodiment to which the present invention is applied.

The electronic stringed instrument is constituted by a neck 102 having a fingerboard 104, and a body portion 101. Six strings 105 made of a non-expandable material are extended above the fingerboard 104. One end of each string 105 is supported by a bridge 107a provided to a head 106, so that a tension of each string can be adjusted by a peg 108 arranged for each string 105. The other end of each string 105 is supported by a shaft (not shown) in a bridge 107b on a fixing plate 109 provided on the body portion 101. The shaft in the bridge 107b can be pivoted by a tremolo arm 111. When the tremolo arm 111 is operated during performance, the tensions of the six strings can be simultaneously and arbitrarily varied.

Hexa-pickups 110, corresponding to the six strings, for detecting vibrations of the corresponding strings and outputting 6 kinds of electrical signals are arranged on the fixing plate 109 below the strings 105 above the body portion 101.

The fingerboard 104 is divided by frets 103 for designating pitches. Fret switches are embedded in the neck under the fingerboard 104 divided by the frets at the position of the strings, as will be described later. When the string 105 is depressed against a portion of the fingerboard 104 between adjacent frets 103, the corresponding fret switch is turned on, and a pitch corresponding to the string 105 and the fret position can be designated.

Figure 2:
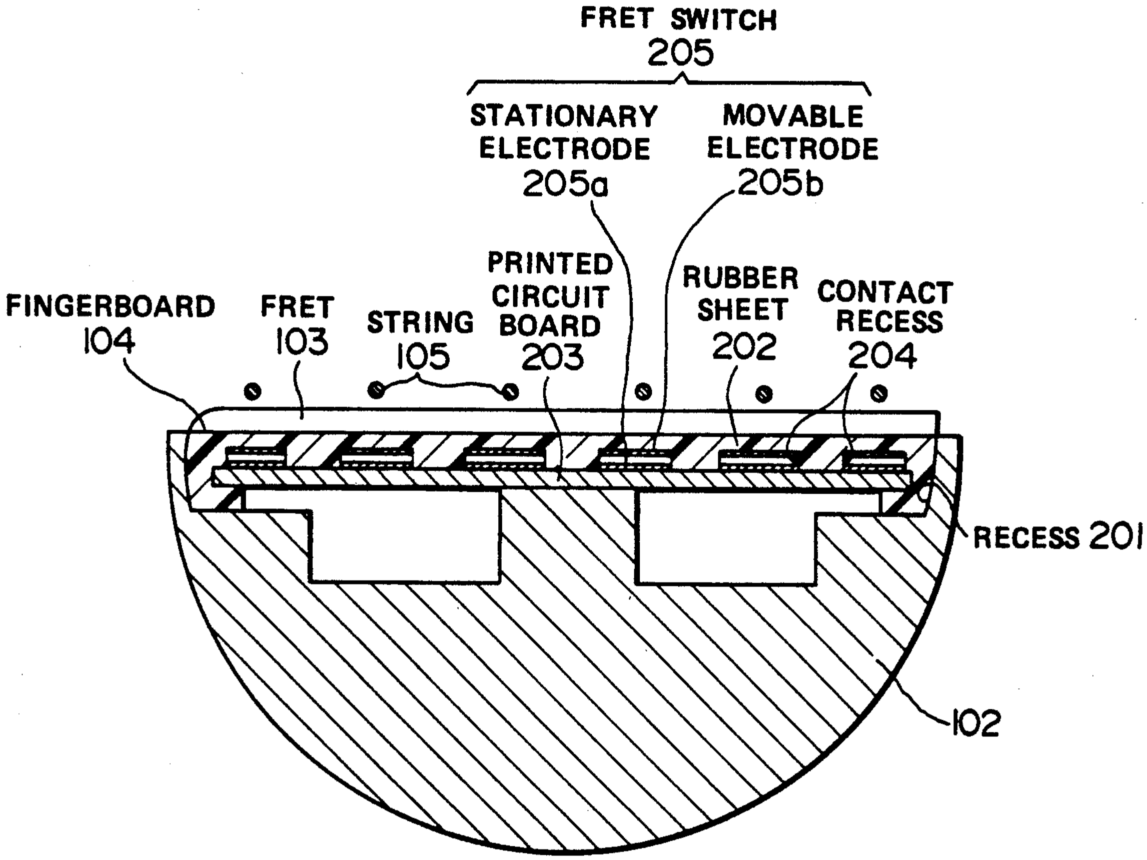
FIG. 2 is a sectional view showing an arrangement of fret switches.

FIG. 2 shows an arrangement of the fret switches embedded in the neck 102 shown in FIG. 1. FIG. 2 is a sectional view of a portion taken along a line I—I of the neck 102 shown in FIG. 1.

As shown in FIG. 2, a printed circuit board 203 and a rubber sheet 202 are fitted and fixed in a recess 201 formed on the upper surface of the neck 102. The rubber sheet 202 is stacked and adhered on the printed circuit board 203. Two ends of the rubber sheet 202 are bent in a U shape to wrap and fix the printed circuit board 203.

Six arrays of contact recesses 204 are formed at positions, corresponding to the strings 105, of the lower surface of the rubber sheet 202 contacting the upper surface of the printed circuit board 203 along the longitudinal direction of the neck 102.

A movable electrode 205b is patterned on the upper bottom surface of each contact recess 204 between two adjacent frets 103 (FIG. 1). A stationary electrode 205a is patterned on the printed circuit board 203 facing the movable electrode 205b. The stationary electrode 205a and the movable electrode 205b constitute a fret switch 205 for designating a predetermined pitch.

Therefore, when the rubber sheet 202 as the surface of the fingerboard 104 is depressed between the frets 103 together with the string 105, the movable electrode 205b is brought into contact with and electrically connected to the stationary electrode 205a, thus turning on the corresponding fret switch 205.

{Block Diagram of Electronic Stringed Instrument of This Embodiment}

Figure 3:
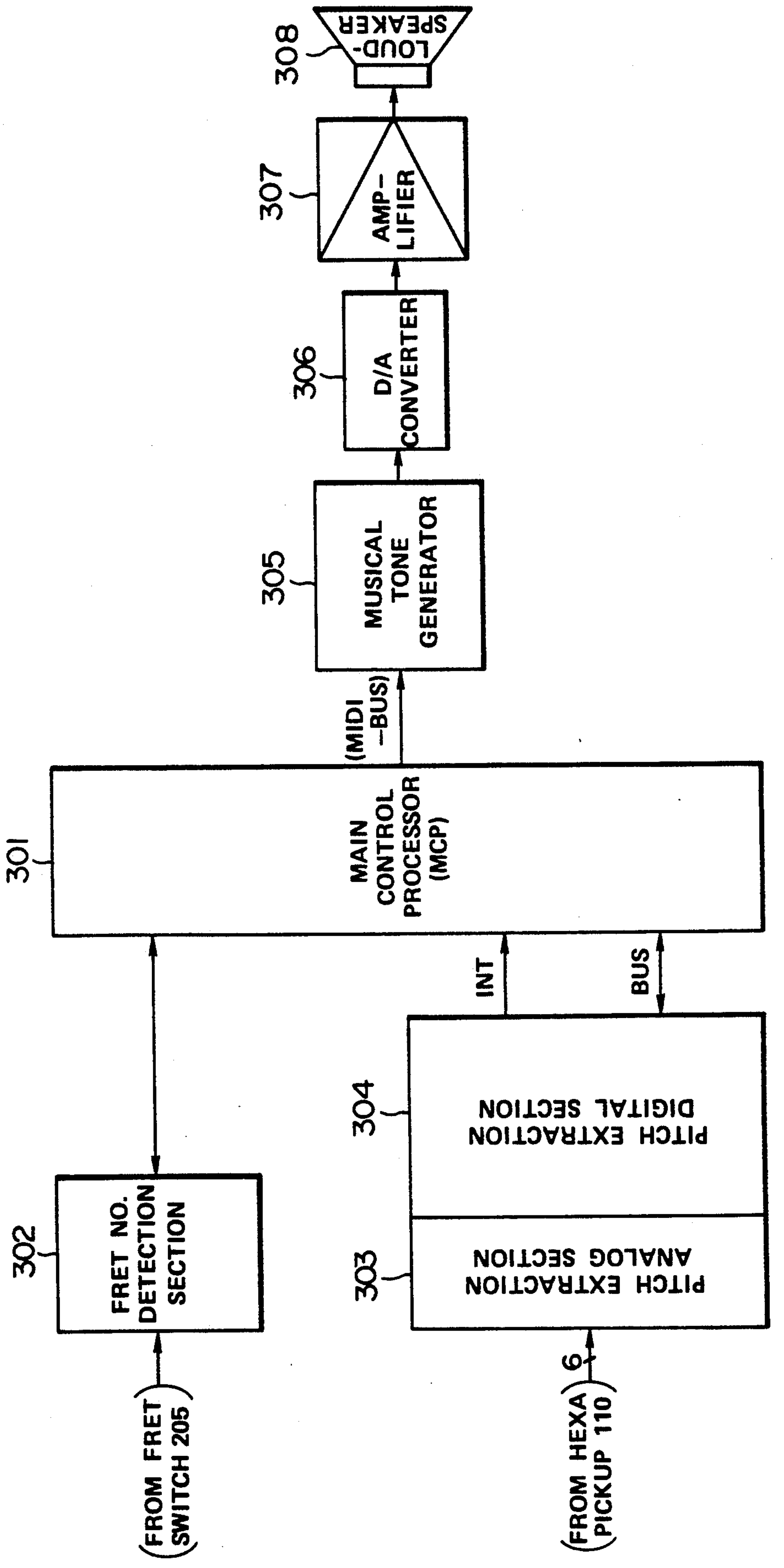
FIG. 3 is a general block diagram showing the electronic stringed instrument according to the first embodiment of the present invention.

FIG. 3 is a block diagram of an electronic stringed instrument according to this embodiment. This circuit is arranged in the body portion 101 shown in FIG. 1. A musical tone generator 305, a D/A converter 306, an amplifier 307, and a loudspeaker 308 may be separately arranged outside the electronic stringed instrument shown in FIG. 1.

In FIG. 3, a fret No. detection section 302 is a decoder circuit (not shown) for detecting the depressed fret switch 205 shown in FIG. 2 (a plurality of switches 205 are arranged in correspondence with portions between adjacent frets and strings). The section 302 scans the fret switches 205 on the basis of a fret scan signal (not shown) from a main control processor (to be referred to as an MCP hereinafter) 301, and outputs a fret No. corresponding to the presently ON fret switch to the MCP 301.

On the other hand, a pitch extraction analog section 303 is a circuit for generating various digital signals (to be described later) on the basis of waveform signals corresponding to the respective strings (6 strings) output from the hexa-pickups 110 shown in FIG. 1.

A pitch extraction digital section 304 generates various parameters (to be described later) such as a peak value for pitch extraction, zero-crossing time, and the like on the basis of the signals output from the pitch extraction analog section 303, and interrupts the MCP 301 using an interruption signal INT to output the various parameters to the MCP 301 through a bus BUS.

The MCP 301 shown in FIG. 3 detects a plucked one of the strings 105 in FIG. 1 on the basis of the various data output from the fret No. detection section 302 and the pitch extraction digital section 304. The MCP 301 also detects the fret No. (or ON fret switch 205) of the plucked string, and outputs data indicating start of tone generation having a pitch corresponding to the fret No. to the musical tone generator 305.

After the tone generation is started, when a player performs a choking operation (an operation of shifting the string 105 in the widthwise direction of the neck 102 on the fingerboard 104 (FIG. 1) while depressing it) or operates the tremolo arm 111 shown in FIG. 1 so as to change a tension of the plucked string, a change in pitch period of a vibration of the plucked string is extracted on the basis of data from the pitch extraction digital section 304, and data indicating a change in pitch based on the extracted change is output to the musical tone generator 305.

The above-mentioned control operation is executed on the basis of a control program stored in a ROM (read-only memory: not shown) in the MCP 301.

The musical tone generator 305 shown in FIG. 3 reads out a digital musical tone waveform stored in a waveform ROM (not shown) on the basis of various musical tone control data from the MCP 301, and outputs the readout data. In this case, a waveform readout means (not shown) reads out the digital musical tone waveform from the waveform ROM at address intervals according to a pitch indicated by the MCP 301, thereby performing pitch control of a musical tone.

The D/A converter 306 converts the digital musical tone waveform output from the musical tone generator 305 into an analog musical tone waveform. The analog musical tone waveform is amplified by the amplifier 307, and a corresponding sound is produced by the loudspeaker 308.

When the musical tone generator 305, the D/A converter 306, the amplifier 307, the loudspeaker 308, and the like are arranged outside the electronic stringed instrument shown in FIG. 1 as a separate sound source, as has been described at the beginning, the MCP 301 and the musical tone generator 305 can be connected through a special-purpose bus MIDI-BUS (MIDI: Musical Instrument Digital Interface) for transferring musical tone control data, as shown in parentheses in FIG. 3.

{General Operation of Electronic Stringed Instrument of This Embodiment}

The general operation of the block arrangement shown in FIG. 3 will now be described.

Figure 4:
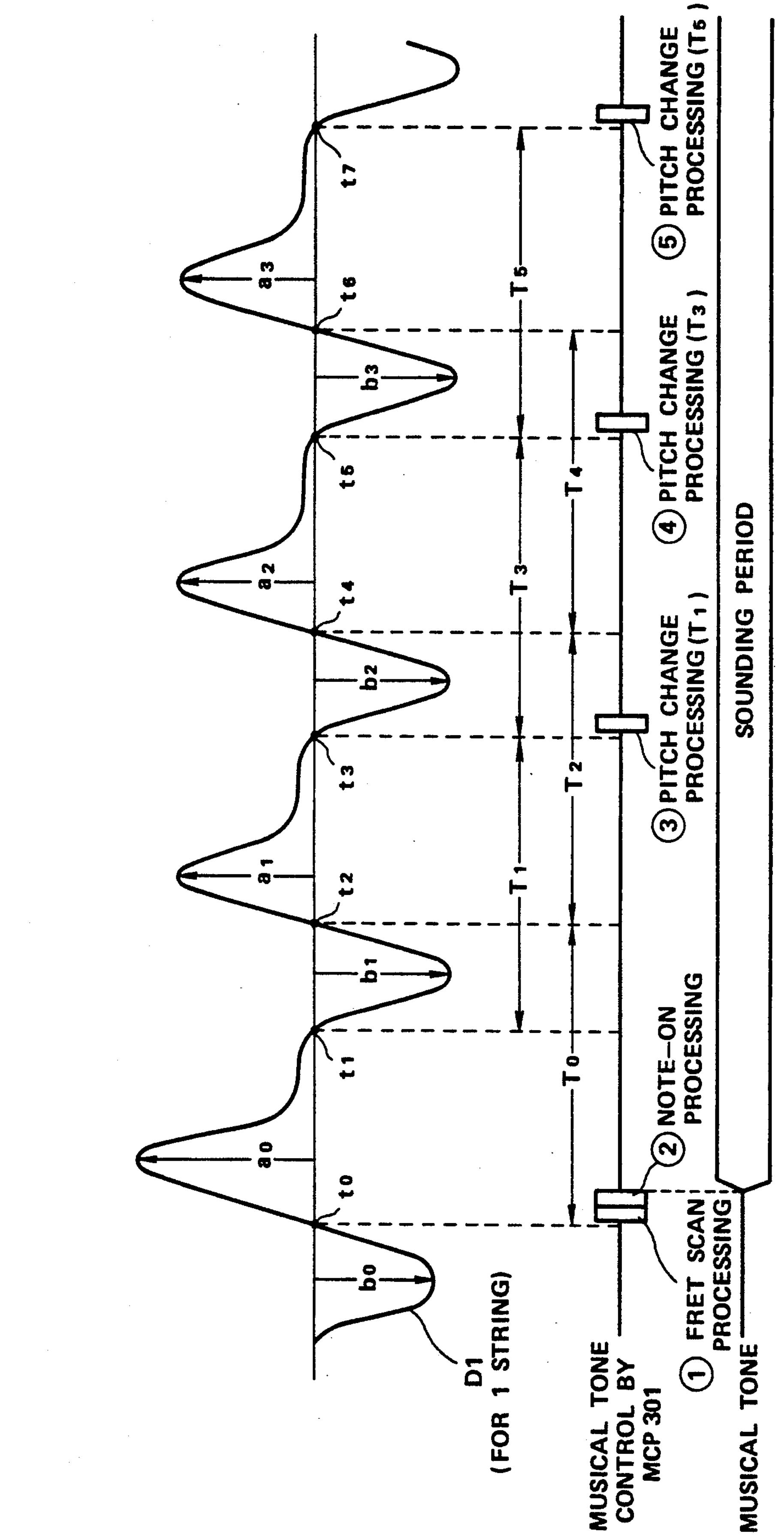
FIG. 4 is a chart for explaining a general operation of this embodiment.

Reference symbol D1 in FIG. 4 indicates a digital waveform signal D1 for one string output from the pitch extraction analog section 303 to the pitch extraction digital section 304 in an analog manner. This waveform is obtained as follows. When one of the strings 105 of the electronic stringed instrument shown in FIG. 1 is plucked, an electrical signal detected by the corresponding hexa-pickup 110 is filtered through a low-pass filter (to be described later), and is then output as a digital signal. When the string is plucked while depressing it against the fingerboard 104 portion between the two adjacent frets 103 in FIG. 1, a vibration waveform having pitch periods $T_0$ to $T_5$ in FIG. 4 is generated.

In this embodiment, the pitch extraction digital section 304 shown in FIG. 3 extracts peak values $a_0$ to $a_3$ and the like or $b_0$ to $b_3$ and the like from the digital waveform signal D1 in FIG. 4, and at the same time, extracts zero-crossing times $t_1$ to $t_7$ and the like immediately after the corresponding peak values. The section 304 sequentially transfers these data through the bus BUS by interrupting the MCP 301 in FIG. 3 using the interruption signal INT.

With the above operation, when the first pair of data ($b_0$, $t_0$) is input, the MCP 301 determines that the corresponding string 105 (FIG. 1) is plucked, and immediately outputs a scan signal of the fret switches 205 (FIG. 2) to the fret No. detection section 302, thereby performing fret scan processing for inputting a fret No. indicating the ON fret switch 205 ((1) in FIG. 4).

When the fret No. is detected in this processing, note-ON processing for generating corresponding pitch data and outputting it to the musical tone generator 305 together with key-ON (tone generation start) data is executed ((2) in FIG. 4).

In accordance with these data, the musical tone generator 305 starts generation of a musical tone with the designated pitch, and after the generated waveform is converted to an analog signal by the D/A converter 306, a corresponding sound is produced through the amplifier 307 and the loudspeaker 308.

Figure 5:
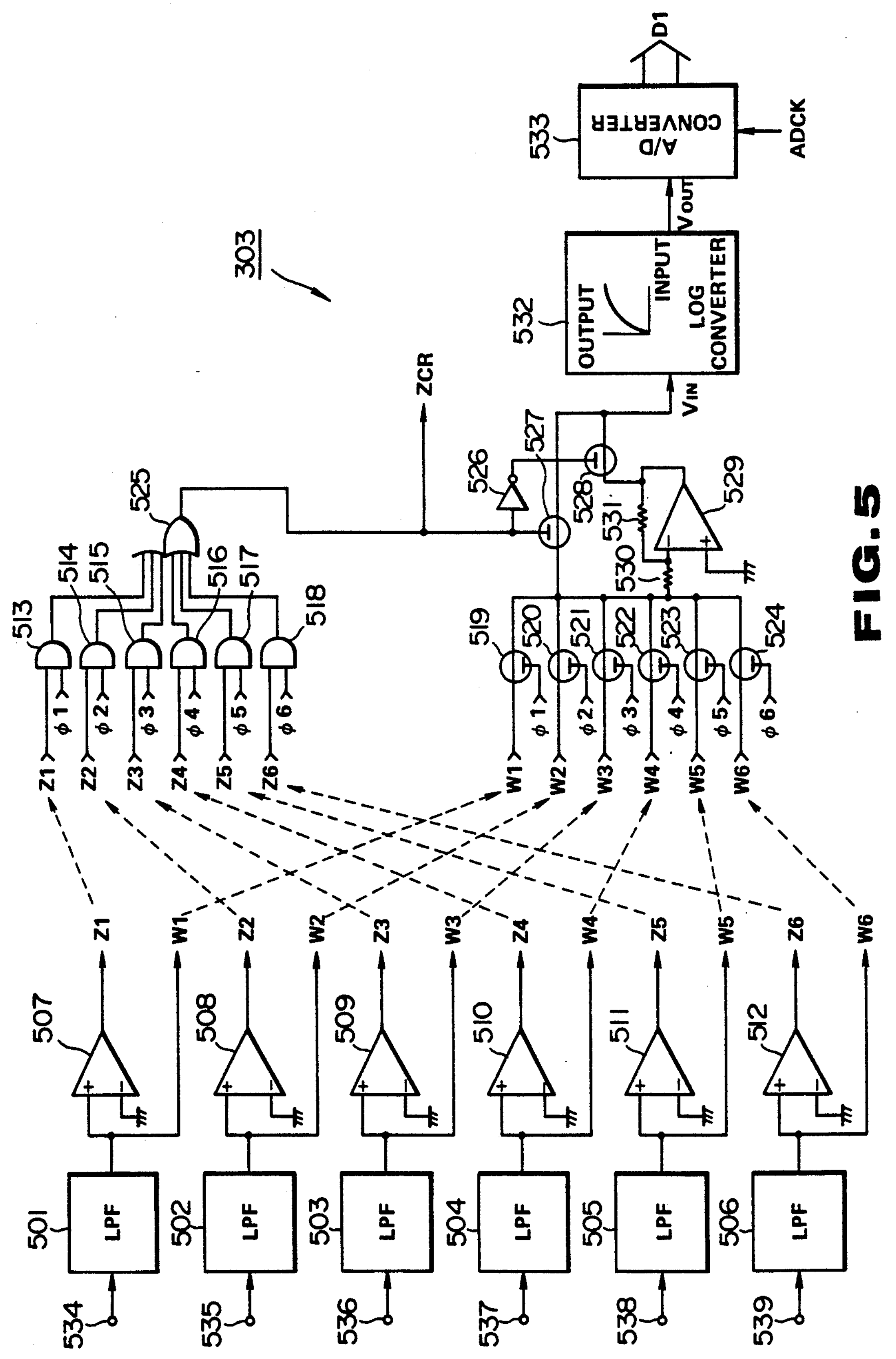
FIG. 5 is a circuit diagram of a pitch extraction analog section.

The MCP 301 in FIG. 3 extracts the pitch periods $T_0$ to $T_5$ in FIG. 5 in real time from data pairs ($a_0$, $t_1$), ($b_1$, $t_2$), ($a_1$, $t_3$), . . . which are input every time the interruption signal INT is input from the pitch extraction digital section 304 and an interruption is made. In (3), (4), (5), and the like in FIG. 4, pitch change processing for generating pitch data based on latest pitch periods $T_1$, $T_3$, $T_5$, and the like, and changing the pitch of a musical tone which is being generated on the basis of the pitch data, is executed.

Therefore, when the player performs the choking operation or operates the tremolo arm 111 in FIG. 1 after start of tone generation so as to change a tension of a plucked string, the pitch periods $T_0$ to $T_5$ of the digital waveform signal D1 in FIG. 4 are changed accordingly, and the pitch data is also changed in real time, thus adding abundant expressions to the musical tone.

When pitch data is obtained from only the digital waveform signal D1 in FIG. 4 to start tone generation, it must be waited for about at least 1.5 pitch periods, as shown in FIG. 4, until pitch periods $T_0$, $T_1$, and the like near the leading edge of the waveform are obtained. For this reason, when a bass string having a long pitch period is plucked, a tone generation start timing is delayed, resulting in a long response time.

In this embodiment, taking into account the fact that a fundamental pitch period of a string vibration is determined by the position of the fret where the player depresses the string, only pitch data at the beginning of tone generation is generated on the basis of a fret No. obtained by the fret No. detection section 302 (FIG. 3) by the fret scan processing in (1) in FIG. 4, thus realizing an electronic stringed instrument which can perform note-ON (tone generation start) processing at a very early timing. Note that the tension of each string 105 in FIG. 1 can be tuned in advance by the peg 108 (FIG. 1) in correspondence with pitch data to be obtained from corresponding positions of the frets 103.

The above-mentioned operation is time-divisionally performed for the outputs from the hexa-pickups 110 (FIG. 1) for six strings of the guitar (and hence, the digital waveform signal D1 is a time-divisional signal for six strings, as will be described later). Therefore, the musical tone generator 305 can aurally simultaneously generate musical tones for six strings. These musical tones can be set to have desirable tone volumes and timbres, and can be electronically added with various effects. As a result, an extremely large performance effect can be obtained.

{Description of Pitch Extraction Analog Section}

An operation of this embodiment for realizing the above operation will be described in detail below.

(General Description)

The pitch extraction analog section 303 in FIG. 3 will be described below. In this section, six kinds (corresponding to the strings) of outputs from the hexa-pickups 110 in FIG. 1 are filtered through the low-pass filters to remove harmonic components therefrom, thereby obtaining six kinds of waveform signals Wi ($i = 1$ to 6). The section 303 generates a zero-crossing signal pulse Zi ($i = 1$ to 6) which goes to H (high) or L (low) level every time the sign of the amplitude of each waveform signal Wi changes to positive or negative. These six kinds of waveform signals Wi and zero-crossing signals Zi are converted to the time-divisional digital waveform signal D1 and a time-divisional serial zero-crossing signal ZCR by gate circuits or A/D converters. These signals are output together with the pulse Zi.

(Arrangement)

FIG. 5 is a circuit diagram showing in detail the pitch extraction analog section 303 in FIG. 3. Input waveform signals corresponding to the respective strings from the hexa-pickups 110 in FIG. 1 are input to input terminals 534 to 539 of low-pass filters (LPFs) 501 to 506. The input signals are amplified by the LPFs 501 to 506 and harmonic components are removed therefrom, thereby extracting fundamental waveforms W1 to W6. These LPFs 501 to 506 are set to have different cut-off frequencies in units of strings since the frequency of an output tone of each string falls in the range of 2 octaves.

The outputs from the LPFs 501 to 506, i.e., the waveform signals (peak values) W1 to W6 are directly output or are input to zero-crossing comparators 507 to 512. The input waveforms signals are compared with a ground potential as a reference signal by the corresponding comparators, thereby generating zero-crossing signals Z1 to Z6.

These zero-crossing signals Z1 to Z6 are supplied to inputs of a zero-crossing parallel-to-serial (P/S) conversion section composed AND gates 513 to 518 and an OR gate 525, i.e., to the AND gates 513 to 518 in correspondence with sequential pulses $\phi 1$ to $\phi 6$ (to be described later), and are converted to the serial zerocrossing signal ZCR. When the zero-cross signals Z1 to Z6 are positive, data of logic "1" is output as the serial zero-crossing signal, and when the zero-crossing signals Z1 to Z6 are negative, data of logic "0" is output as the serial zero-crossing signal ZCR.

On the other hand, the waveform signals W1 to W6 from the LPFs 501 to 506 are supplied to inputs of an analog parallel-to-serial (P/S) conversion section composed of analog gates 519 to 524, and the like, i.e., to the analog gates 519 to 524 in correspondence with the sequential pulses $\phi 1$ to $\phi 6$, and are converted to an analog serial signal. When the sequential pulses $\phi 1$ to $\phi 6$ are positive, the corresponding analog gates 519 to 524 are opened, and when the sequential pulses $\phi 1$ to $\phi 6$ are negative, the corresponding analog gates 519 to 524 are closed. Outputs of these gates are input to an inverting input terminal of an inverting amplifier 529 via a resistor 530 whose output is fed back to the inverting terminal via a resistor 531, so that all the positive and negative waveforms are inverted to positive waveforms. More specifically, the serial zero-crossing signal ZCR from the OR gate 525 is directly input to a gate terminal of an analog gate 527, and is also input to a gate terminal of an analog gate 528 through an inverter 526. The input terminal of the analog gate 528 receives the output from the inverting amplifier 529, and the output from the analog gate 528 is always a positive value. On the other hand, the analog gate 527 is turned on when the serial zero-crossing signal ZCR is at logic "1", and transfers the outputs from the analog gates 519 to 524 to its output terminal. As a result, the output from the gate 527 is always a positive value.

The outputs from the analog gates 527 and 528 are input to a log converter 532 as data $V_{IN}$. The data is log-converted by the converter 532 so as to be logarithmically compressed and to be reduced to a necessary number of memory bits. An output $V_{OUT}$ from the log converter 532 is converted to the time-divisional digital waveform signal D1 by an analog-to-digital converter (to be referred to as an A/D converter hereinafter) 533 in accordance with the state of an A/D conversion clock signal ADCK.

(Detailed Operation)

Figure 6:
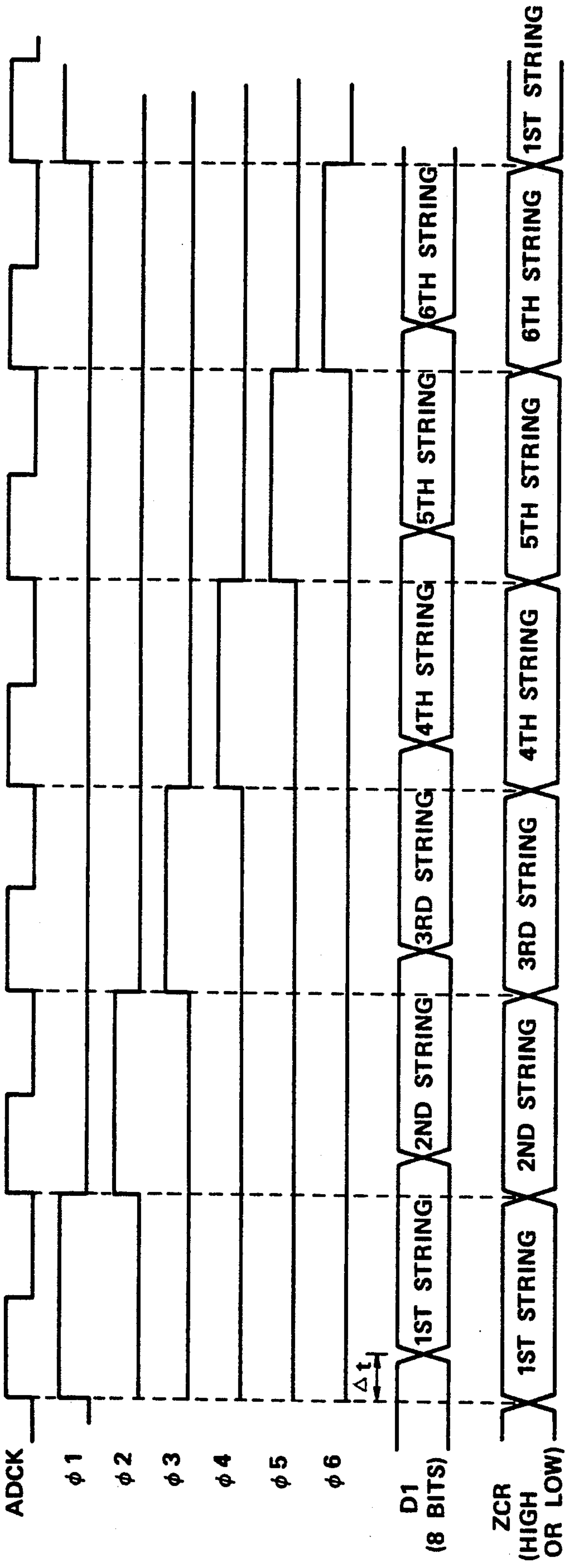
FIG. 6 is an operation timing chart of the pitch extraction analog section.
Figure 9:
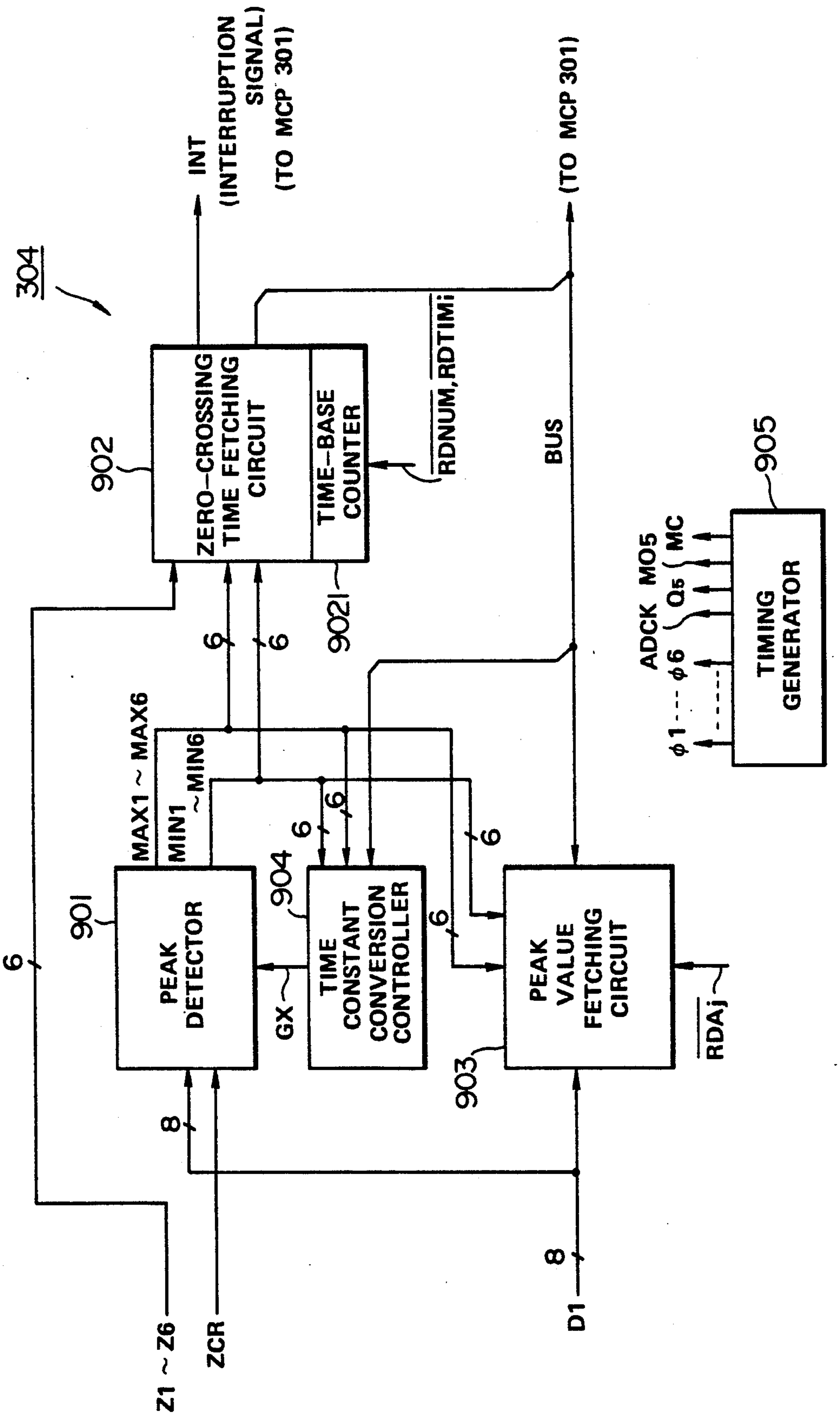
FIG. 9 is a general block diagram of a pitch extraction digital section.

FIG. 6 is an operation timing chart for explaining the operation of the pitch extraction analog section 303 shown in FIG. 5 (also refer to FIG. 3). The sequential pulses $\phi 1$ to $\phi 6$ are sampling clocks corresponding to the respective strings (six strings) output from a timing generator 905 (to be described later; FIG. 9), and each has a period six times that of the A/D conversion clock signal ADCK, generated by the timing generator 905, for operating the A/D converter 533. The sequential pulses $\phi 1$ to $\phi 6$ are generated while their phases are shifted by one period of the A/D conversion clock signal ADCK.

Therefore, when the sequential pulses $\phi 1$ to $\phi 6$ sequentially control the AND gates 513 to 518, the zero-crossing signals corresponding to the waveform signals W1 to W6 for six strings are sampled, and are time-divisionally multiplexed by the OR gate 525, thus outputting the serial zero-crossing signal ZCR shown in FIG. 6.

Figure 7:
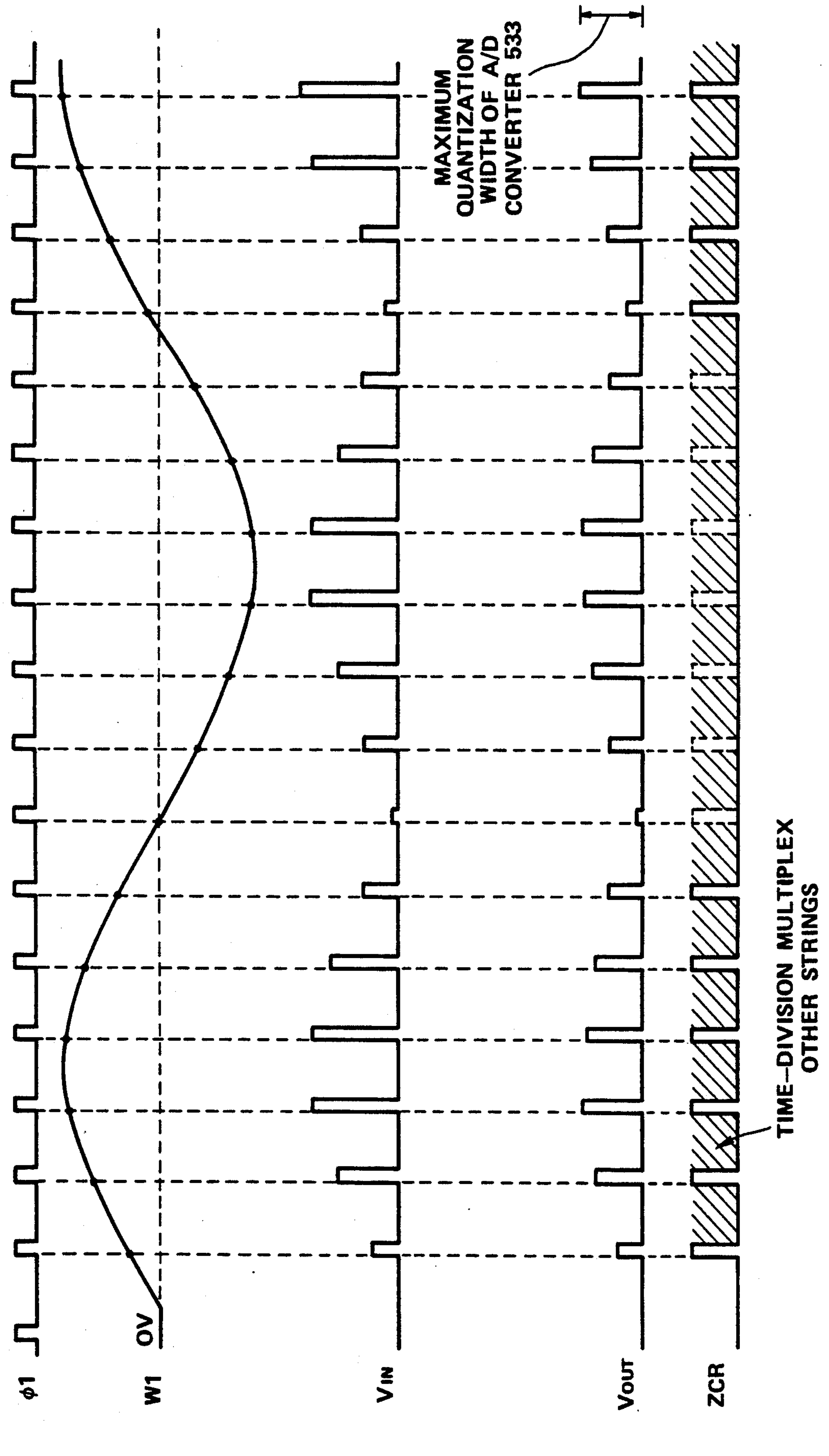
FIG. 7 is a chart showing the relationship among $\phi$1, W1, $V_{IN}$, $V_{OUT}$, and ZCR.

FIG. 7 is a timing chart of the sequential pulse $\phi 1$, the waveform signal W1, an input voltage $V_{IN}$ and an output voltage $V_{OUT}$ of the log converter 532, and the serial zero-crossing signal ZCR when the first string is plucked. As can be seen from FIG. 7, data is logarithmically compressed by the log converter 532, and the number of bits used when quantization is performed by the A/D converter 533 can be reduced (this will be described later).

Note that waveform signals W2 to W6 corresponding to the remaining strings are time-divisionally processed in accordance with the sequential clocks $\phi 2$ to $\phi 6$. In this case, the signals $V_{IN}$, $V_{OUT}$, and ZCR are time-divisionally multiplexed in hatched portions in FIG. 7.

The time-divisionally multiplexed signals $V_{OUT}$ are quantized to 8 bits (256 levels) on the basis of the A/D conversion clock signal ADCK by the A/D converter 533 (FIG. 5). The 8-bit data is output as the time-divisionally multiplexed 8-bit digital waveform signal D1 for six strings.

Figure 8A:
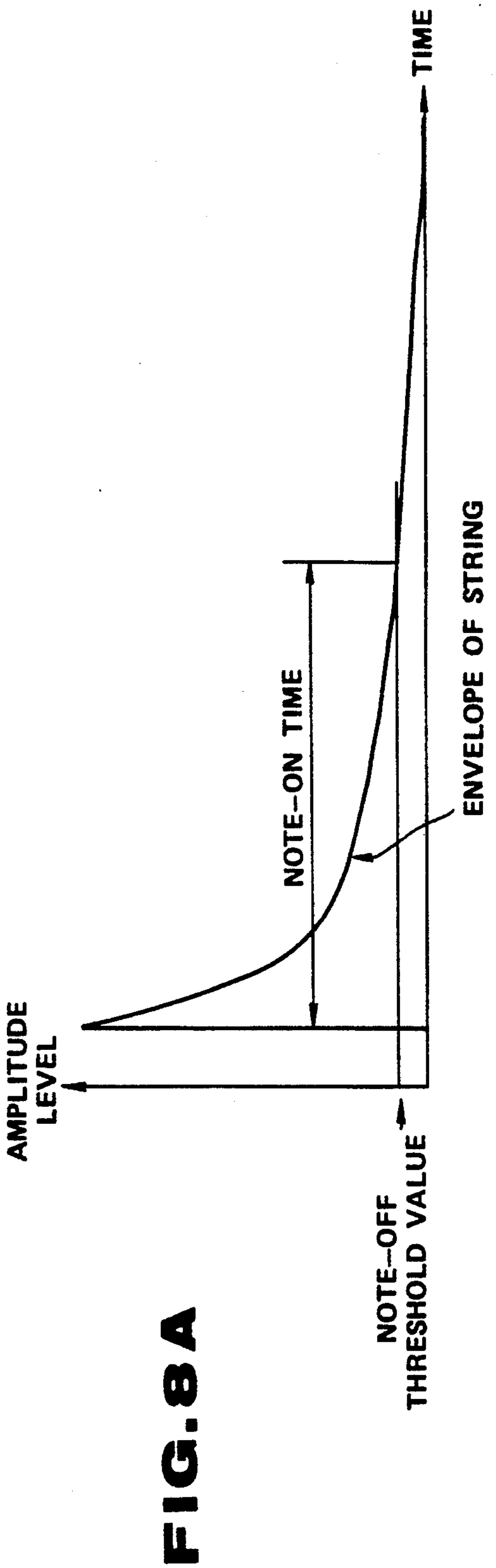
FIGS. 8A and 8B are graphs showing the relationship between an envelope of a signal obtained by a string vibration and a note-ON time.
Figure 8B:
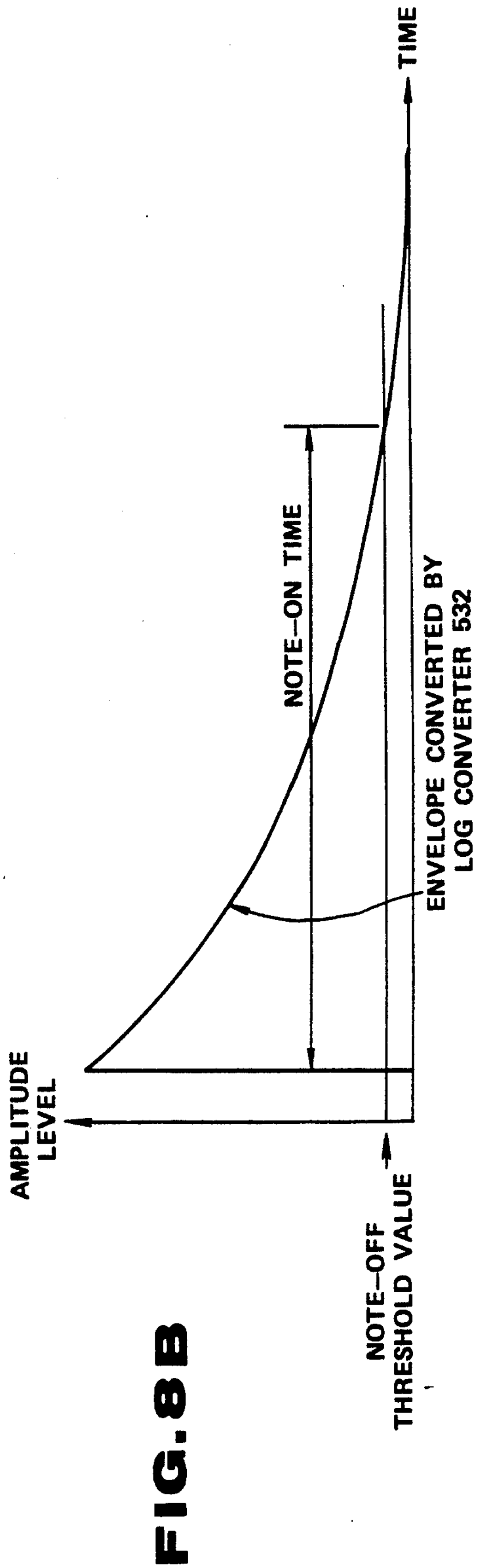

FIGS. 8A and 8B show an envelope of the input $V_{IN}$ to the log converter 532 in FIG. 5 and an envelope of the output $V_{OUT}$ of the converter 532. Since the data $V_{IN}$ and $V_{OUT}$ are signals based on one of the waveform signals W1 to W6 obtained by the hexa-pickups 110, the envelope of the string vibration of each string 105 is illustrated in FIGS. 8A and 8B.

In this case, a note-ON time must be taken into account. In this embodiment, as will be described later, when an amplitude level at the leading edge of a string vibration exceeds a predetermined threshold value, it is detected so as to perform note-ON processing (start tone generation) of a musical tone, and when the string vibration is attenuated and the amplitude level is decreased below the threshold value, it is detected so as to perform note-OFF processing (mute a tone). During a note-ON time from note-ON processing to note-OFF processing, pitch control, and the like, based on pitch extraction, are executed. In order to reflect delicate nuance of a string vibration obtained by plucking a string in generation of a musical tone, the threshold value (to be referred to as a note-OFF threshold value hereinafter) is preferably set to be an amplitude level as low as possible.

The note-ON and note-OFF processing operations are performed by setting a note-OFF threshold value of a digital value with respect to the output digital waveform signal D1 of the A/D converter 533 in FIG. 5 in order to guarantee a stable operation.

Therefore, when the A/D converter 533 quantizes the amplitude level of the input $V_{OUT}$, a low-amplitude level range should be quantized with a number of levels as large as possible, so that the note-OFF threshold value can be easily set to be a low amplitude level.

In order to realize the above operation, the A/D converter 533 having a larger number of quantization bits [e.g., 10 bits (1024 levels) or more] can be used. However, since such an A/D converter is expensive, an 8-bit (=256 levels) A/D converter can only be used to decrease cost in practice.

In this embodiment, an inexpensive log converter 532 is connected to the input of the A/D converter 533, so that the input $V_{IN}$ is converted to the output $V_{OUT}$ in which the low-amplitude level range is logarithmically amplified, and the data $V_{OUT}$ is input to the A/D converter 533, thus realizing the above operation. Thus, the threshold value with a considerably lower amplitude level can be equivalently set with respect to an original string vibration waveform as shown in FIG. 8B although the note-OFF threshold value (digital value) shown in FIG. 8A remains the same. Thus, an essential note-ON time can be prolonged relative to FIG. 8A, thus allowing more delicate musical tone control.

As described above, the pitch extraction analog section 303 shown in FIG. 3 or 5 generates the 8-bit digital waveform signal D1 obtained by time-divisionally multiplexing the outputs for six strings from the hexa-pickup 110 (FIG. 1) (a signal obtained by quantizing the amplitude levels of $V_{OUT}$ in FIG. 7), the similarly time-divisionally multiplexed 1-bit serial zero-crossing signal ZCR (FIG. 7), and the zero-crossing signals Z1 to Z6 for six strings, and supplies these signals to the pitch extraction digital section 304 in FIG. 3.

{Description of Pitch Extraction Digital Section}

FIG. 9 is a block diagram showing a schematic arrangement of the pitch extraction digital section 304 shown in FIG. 3. The section 304 comprises a peak detector 901 for receiving the serial zero-crossing signal ZCR and outputting position or negative peak value detection signals MAX1 to MAX6 or MIN1 to MIN6 corresponding to the strings, a time constant conversion controller 904 for converting a time constant of the peak detector 901, a zero-crossing time fetching circuit 902, a peak value fetching circuit 903, and the timing generator 905 for generating various timing signals, i.e., the sequential pulses $\phi 1$ to $\phi 6$, and timing signals ADCK, Q5, M05, and MC. These components will be described in detail below.

(Description of Peak Detector)

The peak detector 901 shown in FIG. 9 will be described below.

<<General Description>>

Timings of maximum peak points (peak points at the positive side) and minimum peak points (peak points at the negative side) of the time-divisional signals (corresponding to the strings) of the digital waveform signal D1 are detected by time-divisional processing on the basis of the digital waveform signal D1 and the serial zero-crossing signal ZCR obtained by time-divisionally multiplexing data for six strings from the pitch extraction analog section 303 shown in FIG. 3 or 5, thereby outputting the maximum peak value detection signals MAX1 to MAX6 and minimum peak value detection signals MIN1 to MIN6 corresponding to the six strings.

For this purpose, the peak detector 901 includes a circuit for storing previous peak values in units of strings while decrementing (attenuating) them, as will be described later. After an immediately preceding peak value for each string is detected, an output signal for each string output from the storing circuit is used as a threshold value, and a timing of a peak value for each string is detected as an input timing of a peak value immediately after the time-divisional signal, corresponding to each string, of the digital waveform signal D1 exceeds this threshold value for the next time.

In this case, as has been described above with reference to FIG. 7, negative portions of the original waveform signals W1 to W6 (FIG. 5) are input as the digital waveform signal D1 while their polarities are inverted to a positive level. Therefore, the peak detector 901 judges the serial zero-crossing signal ZCR, so that peak detection is separately performed for the positive and negative portions.

The maximum peak value detection signal MAXi ($i = 1$ to 6) on the positive side and the minimum peak value detection signal MINi ($i = 1$ to 6) on the negative side are output at the detection timing of a peak value for each string.

<<Arrangement>>

Figure 10:
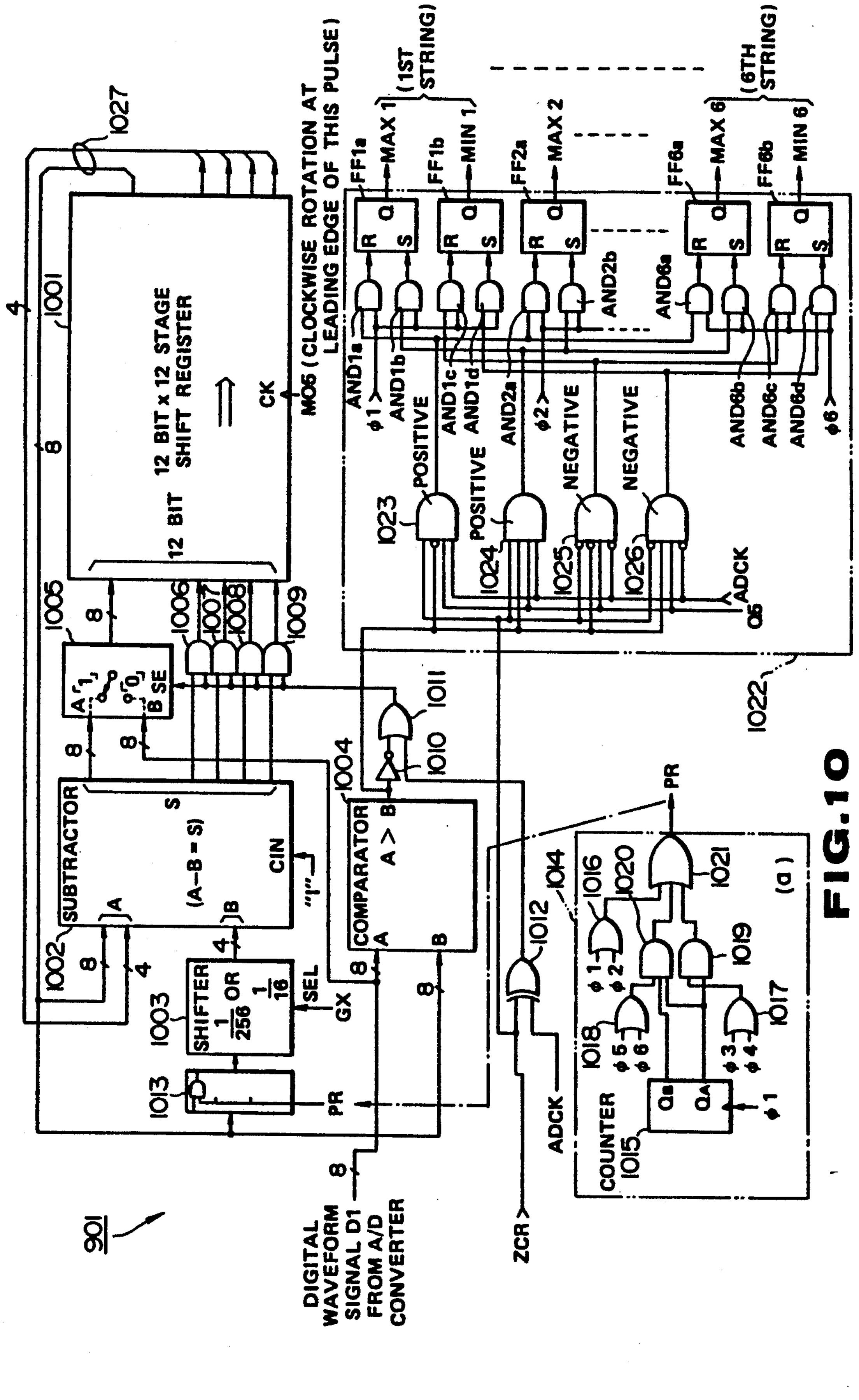
FIG. 10 is a detailed circuit diagram of a peak detector.

FIG. 10 is a detailed circuit diagram of the peak detector 901 shown in FIG. 9. This circuit performs time-divisional processing for positive and negative components of the digital waveform signal D1 in units of six strings, as has been described above, and outputs the maximum peak value detection signals MAX1 to MAX6 and the minimum peak value detection signals MIN1 to MIN6. Therefore, this circuit performs 12-time-divisional processing as a whole.

In FIG. 10, a shift register 1001 has a 12-bit arrangement and executes 12-time-divisional processing, i.e., is constituted by 12 bits ×12 stages. Of 12 bits, upper 8 bits correspond to an integral part, and lower 4 bits correspond to a decimal part. The decimal part is provided to assure accuracy of subtraction processing (to be described later). A clock terminal CK of the shift register 1001 receives a timing signal M05 (having a period ½ that of the A/D conversion clock signal ADCK) from the timing generator 905 shown in FIG. 9. The content of the shift register 1001 is shifted clockwise at the leading edge of the timing signal M05.

Upper 8 bits of a value 1027 stored in the shift register 1001 are input to a gate 1013. The gate 1013 is controlled by a control signal PR from a gate controller 1014.

The gate controller 1014 composed a 2-bit counter 1015, OR gates 1016 to 1018 and 1021, and AND gates 1019 and 1020. The sequential pulse $\phi 1$ or $\phi 2$ input to the OR gate 1016 passes through the OR gate 1021 and is output as a control signal PR. Since the sequential pulse $\phi 3$ or $\phi 4$ input to the OR gate 1017 is output through the AND gate 1019, it is output only during a period wherein a lower bit output terminal $Q_A$ of the counter 1015 is at logic "1". Since the sequential pulse $\phi 5$ or $\phi 6$ input to the OR gate 1018 is output through the AND gate 1020, it is output only during a period wherein both an upper bit output terminal QB and the lower bit output terminal QA of the counter 1015 are at logic "1". The outputs QA and QB of the counter 1015 are cyclically changed like (0, 0), (0, 1), (1, 0), (1, 1), (0, 0), . . . in synchronism with the sequential pulse $\phi 1$. The gate 1013 is enabled at a timing at which the control signal PR output as described above goes to H level.

The output from the gate 1013, i.e., data read out from the shift register 1001 is input to a shifter 1003. The shifter 1003 shifts the input signal by 8 or 4 bits to execute division of 1/256 or 1/16. Note that the two types of shift operations are switched by a time constant change signal GX input from the time constant conversion controller 904 in FIG. 9 to a terminal SEL, as will be described later.

A 4-bit output of the shifter 1003 is input to a second input terminal B of a subtractor 1002. A first input terminal A of the subtractor 1002 receives the 12-bit storage value 1027 from the shift register 1001. As will be described later, the subtractor 1002 calculates (A input - B input) and outputs the difference from a 12-bit output terminal S. In this case, a carry-in input terminal CIN receives data of logic "1". This will be described later.

When data of logic "1" is output from the OR gate 1011, upper 8-bits (integral part) of the 12-bit output from the output terminal S of the subtractor 1002 are input to the shift register 1001 through a data switch 1005, and lower 4 bits thereof are input to the shift register 1001 through AND gates 1006 to 1009. When the output from the OR gate 1011 is at logic "0", a new 8-bit digital waveform signal D1 is input from the A/D converter 533 (FIG. 5) in the pitch extraction analog section 303 in FIG. 3 to the shift register 1001 through the data switch 1005. In this case, since the AND gates 1006 to 1009 are disabled, lower 4 bits, i.e., the decimal part, are zero inputs.

A first input terminal A of a comparator 1004 receives the 8-bit digital waveform signal D1, and a second input terminal B receives upper 8 bits (integral part) of the storage value 1027 of the shift register 1001. The output from the comparator 1004 is input to the first input terminal of the OR gate 1011 through an inverter 1010. The second input terminal of the OR gate 1011 receives an output from an exclusive OR gate 1012. Input terminals of the exclusive OR gate 1012 receive the serial zero-crossing signal ZCR from the pitch extraction analog section 303 (FIG. 3 or 5) and the A/D conversion clock signal ADCK from the timing generator 905 (FIG. 9).

The serial zero-crossing signal ZCR is input to AND gates 1023 to 1026 in a serial-to-parallel (S/P) converter 1022 together with the timing signal Q5 and the A/D conversion clock signal ADCK from the timing generator 905 in FIG. 9. The outputs from the AND gates 1023 to 1026 are input to AND gates ANDia to ANDid (i =1 to 6) together with the sequential pulses $\phi 1$ to $\phi 6$ from the timing generator 905. The outputs from these AND gates are input to flip-flops FFia and FFib (i =1 to 6). Thus, parallel maximum peak detection signals MAXi (i =1 to 6) and minimum peak value detection signals MINi (i =1 to 6) for six strings are output.

(Operation)

The operation of the peak detector 901 shown in FIG. 9 or 10 with the above arrangement will now be described.

Figure 11:
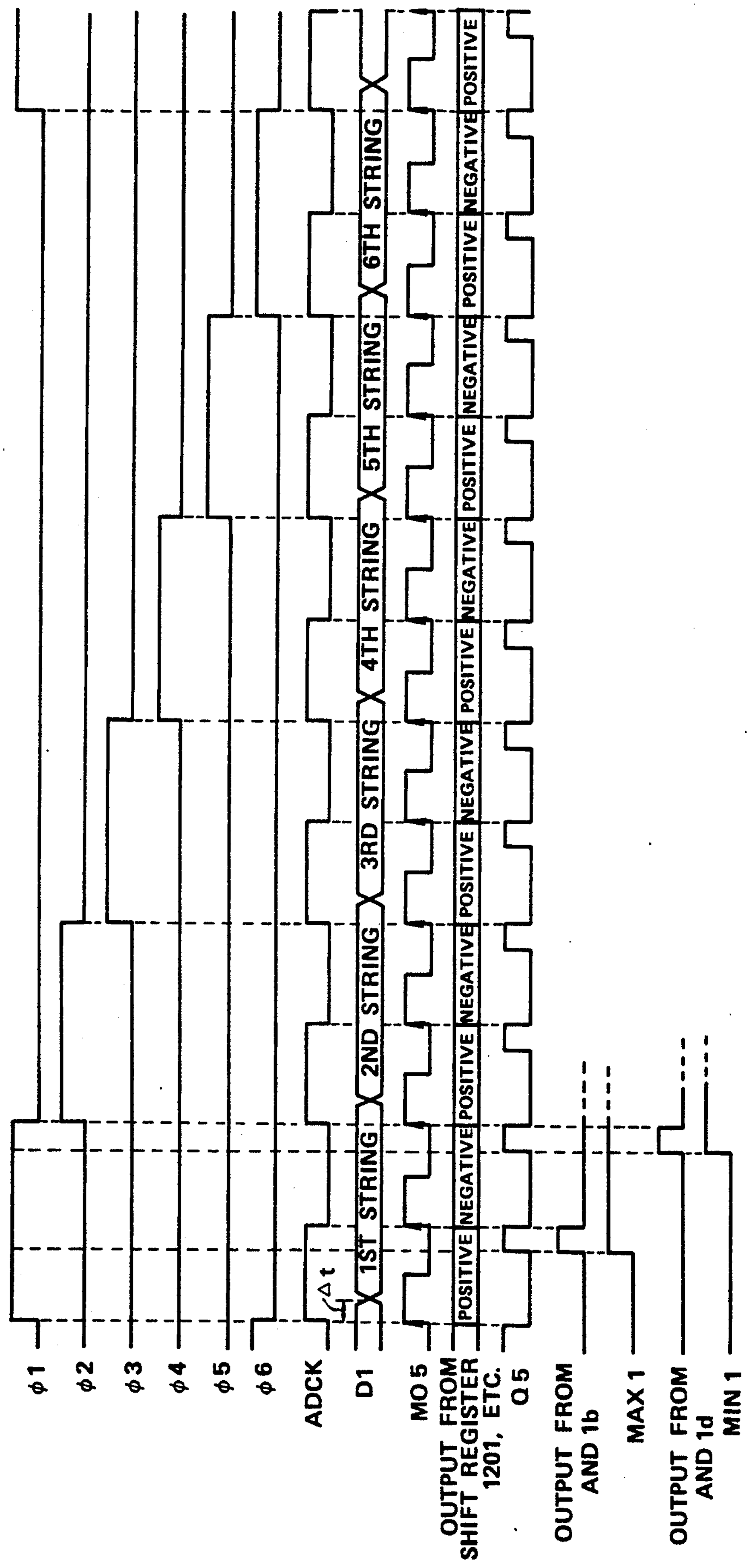
FIG. 11 is a timing chart showing in detail an operation of the peak detector.

The digital waveform signal D1 output from the A/D converter 533 (FIG. 5) in the pitch extraction analog section 303 in FIG. 3 includes time-divisionally multiplexed digital data of waveform signals W1 to W6 for six strings (FIG. 5) which are obtained when six kinds of sequential pulses $\phi 1$ to $\phi 6$ synchronous with the A/D conversion clock signal ADCK go to logic "1", as shown in FIG. 11. Each of the waveform signals W1 to W6 has a delay time Δt of the A/D converter 533 (FIG. 5) with respect to a corresponding one of the sequential pulses $\phi 1$ to $\phi 6$ as in FIG. 6. This will be described later.

In contrast to this, the shift register 1001 in FIG. 10 is operated in response to the leading edge of the timing signal M05 having a period ½ that of the A/D conversion clock signal ADCK. Therefore, the output operation of the storage value 1027 of the shift register 1001 and the operations of the subtractor 1002, the shifter 1003, the comparator 1005, and other gates are performed at a speed twice that of input operations of the time-divisional signals corresponding to the strings of the digital waveform signal D1. As shown in FIG. 11, in the first half of the time-divisional period corresponding to each string, processing for the positive portion of the time-divisional signal corresponding to the string is performed, and in the second half, processing for the negative portion is performed.

<Processing for First String>

Processing for the first string synchronous with the sequential pulse $\phi 1$ is considered first. The waveform signal W1 corresponding to the first string is converted to digital data in synchronism with the sequential pulse $\phi 1$ by the pitch extraction analog section 303 in FIG. 3 or 5, as has been described in the section "Detailed Operation" in "Description of Pitch Extraction Analog Section" with reference to FIG. 7. The waveform signal W1 is output while the polarity of its negative component is inverted to positive. At the same time, the serial zero-crossing signal ZCR which goes to logic "1" when the waveform signal W1 is positive and goes to logic "0" when it is negative is output. Note that this signal is also obtained by time-divisionally multiplexing data for six strings, and a portion synchronous with the sequential pulse $\phi 1$ corresponds to the first string.

The peak detector 901 shown in FIG. 9 or 10 separately performs processing for positive and negative portions at different timings shown in FIG. 11 by checking the serial zero-crossing signal ZCR for the digital waveform signal D1 in which both the positive and negative portions are input as positive portions.

Figure 12:
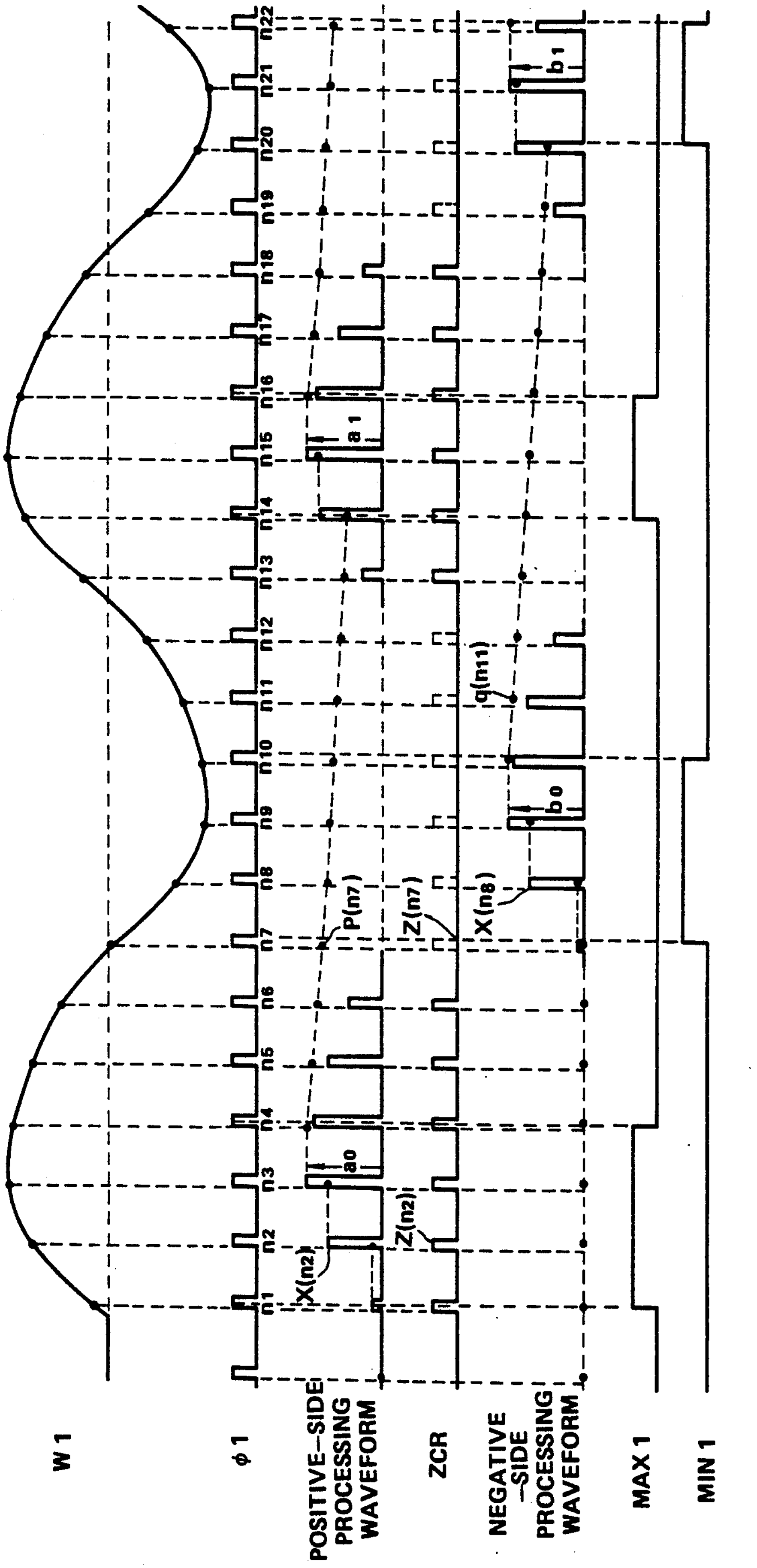
FIG. 12 is a chart for explaining in detail an operation of the peak detector.

For this purpose, as shown in FIG. 12, discrete times represented by integers n =n1, n2, n3, . . . which are incremented by one in synchronism with the leading edge of the sequential pulse $\phi 1$ will be considered. Note that actual time is obtained by multiplying the integer with the period of the sequential pulse $\phi 1$.

Of the digital waveform signal D1, the time-divisional signal corresponding to the first string input every discrete time n is represented by x(n), and is illustrated in positive and negative processing waveforms as shown in FIG. 12 for the purpose of descriptive convenience Note that in FIG. 12, $x(n_2)$ (positive waveform) and $x(n_8)$ (negative waveform) are illustrated as representatives. However, this also applies to other bar-graph like portions. A serial zero-crossing signal corresponding to the first string synchronous with the sequential pulse $\phi 1$ is represented by z(n). In FIG. 12, $z(n_2)$ (positive waveform) and $z(n_7)$ (negative waveform) are illustrated as representatives. However, this also applies to other bar-graph like portions.

Furthermore, of the storage value 1027 corresponding to the first string output from the shift register 1001 every discrete time n, a storage value corresponding to the positive component output in synchronism with the first half portion where the sequential pulse $\phi 1$ goes to logic "1" is represented by p(n), and a storage value corresponding to a negative component output in synchronism with the second half portion is represented by q(n). In FIG. 12, $p(n_7)$ (positive waveform) and $q(n_{11})$ (negative waveform) are illustrated as representatives. However, this also applies to other portions indicated by plots ".".

<Processing of Positive Portion of First String>

Processing for the positive portion of the digital waveform signal x(n) will be described below with reference to FIG. 12. This processing is performed in the first half portion of the period wherein the sequential pulse $\phi 1$ goes to logic "1", as shown in FIG. 11. The processing in this period will be described below unless otherwise specified.

Assume that the storage value 1027 of the shift register 1001 in FIG. 10 is initially all "0"s, and a positive digital waveform signal $x(n_1)$ shown in FIG. 12 is input at the discrete time $n_1$. Thus, since the A input > the B input in the comparator 1004 in FIG. 10, the output from the comparator goes to logic "1", and the output from the inverter 1010 goes to logic "0". In this case, a serial zero-crossing signal $z(n_1)$ is at logic "1", and in the first half portion in the period wherein the sequential pulse $\phi 1$ is at logic "1", the A/D conversion clock ADCK is also at logic "1". Therefore, the output from the exclusive OR gate 1012 shown in FIG. 10 is at logic "0".

Thus, the output from the OR gate 1011 goes to logic "0", and the data switch 1005 is connected to the terminal B side, so that the AND gates 1006 to 1009 are disabled. Therefore, the digital waveform signal x(n) at time n1 in FIG. 12 is stored in upper 8 bits (integral part) of the shift register 1001 through the switch 1005.

Note that this storage operation is performed in synchronism with the leading edge of the timing signal M05 at a boundary between the first and second half portions of the period wherein the sequential pulse $\phi 1$ is at logic "1" shown in FIG. 11. Therefore, there is no problem if the digital waveform signal D1 $=x(n_1)$ is input while being delayed by the conversion time At of the A/D converter 533 (FIG. 5).

At the same time, the output from the comparator 1004 and the serial zero-crossing signal $z(n_1)$ (ZCR) go to logic "1". Therefore, the AND gate 1024 is enabled at a timing at which the A/D conversion clock signal ADCK and the timing signal Q5 shown in FIG. 11 simultaneously go to logic "1". Furthermore, since the sequential pulse $\phi 1$ is at logic "1", the output from the AND gate ANDlb goes to logic "1", as shown in FIG. 11, thus setting the flip-flop FFla. At the end of the first half portion in the period wherein the sequential pulse $\phi 1$ at the discrete time $n_1$ is at logic "1", the maximum peak value detection signal MAX1 corresponding to the first string as the output of the flip-flop FFla goes to logic "1", as shown in FIG. 12.

Subsequently, assume that the shift register 1001 is shifted by 12 clocks of the timing signal M05, and receives a digital waveform signal $x(n_2)$ having a larger value than an immediately preceding one (at the discrete time $n_1$) at discrete time $n_2$ in FIG. 12. At this time, the storage value $p(n_2)$ output from the shift register 1001 is equal to the immediately preceding digital waveform form signal $x(n_1)$. That is, $p(n_2)=x(n_1)$. Therefore, in this case, the output of the comparator 1004 in FIG. 10 is at logic "1", and the output of the exclusive OR gate 1012 is also at logic "0" as the immediately preceding signal. Thus, the digital waveform signal $x(n_2)$ is stored in the shift register 1001 through the data switch 1005 in the same manner as the immediately preceding signal.

The same operation as described above is also formed at discrete time $n_3$, and a digital waveform signal $x(n_3)$ is stored in the shift register 1001. At discrete time $n_4$, a digital waveform signal $x(n_4)$ is input, and at the same time, the shift register 1001 outputs a storage value $p(n_4) = x(n_3) = a_0$. In this case, since $x(n_4) < p(n_4)$, the output from the comparator 1004 goes to logic "0". This output is input to the AND gate 1023 in negative logic, and the serial zero-crossing signal $z(n_1)$ (ZCR) of logic "1" is input to the AND gate 1023. Thus, the AND gate 1023 is enabled at a timing at which the A/D conversion clock ADCK and the timing signal Q5 shown in FIG. 11 simultaneously go to logic "1". Furthermore, since the sequential pulse $\phi 1$ is at logic "1", the output from the AND gate ANDla goes to logic "1", thus resetting the flip-flop FFla. As a result, at the end of the first half portion in the period wherein the sequential pulse $\phi 1$ at the discrete time $n_4$ is at logic "1", the maximum peak value detection signal MAXl corresponding to the first string as the output from the flip-flop FFla goes to logic "0".

At time $n_4$ one discrete time after the time when the maximum peak value $x(n_3)=a_0$ is input as the digital waveform signal x(n) of the first string, as shown in FIG. 12, the maximum peak value detection signal MAX1 of the first string goes to logic "0", and the input timing of the maximum peak value $a_0$ can be detected. Note that the detection timing is delayed by one discrete time since this time interval is necessary for the peak value fetching circuit 903 shown in FIG. 9 to fetch the maximum peak value $a_0$, and this will be described later in the section "Description of Peak Value Fetching Circuit".

Simultaneously with the above operation, the output from the comparator 1004 goes to logic "0" at the discrete time $n_4$ in FIG. 12, and the OR gate 1011 outputs data of logic "1" through the inverter 1010. AS a result, the data switch 1005 is connected to the terminal A side, and the AND gates 1007 to 1009 are enabled. Therefore, the 12-bit output from the output terminal S of the subtractor 1002 is stored in the shift register 1001.

Assume that an input value at the input terminal A of the subtractor 1002 with respect to a storage value p(n) output from the shift register 1001 at given discrete time n is p(n). If the shifter 1003 performs division of 1/256 (the case of 1/16 will be described later), an input value at the input terminal B of the subtractor 1002 is p(t)/256, and the output value from the output terminal S is given by:

$$p(n)-p(n)/256=(1-1/256).p(n) \quad (1)$$

Note that in practice, in the subtractor 1002, data "1" is always supplied to the carry input terminal CIN of the subtractor 1002, and the value at the input terminal B is subtracted from the value at the input terminal A, and "1" is further subtracted from the difference. After the value at the input terminal B becomes 0, the value of the shift register 1001 must be decreased. For this purpose, "1" is always subtracted from the difference to solve this problem. Therefore, equation (1) and an equation presented below have a difference of "−1". However, this difference is small, and is not taken into account in the following description. The output value of the subtractor 1002 is input to the shift register 1001 through the data switch 1005 and the AND gates 1006 to 1009, and appears as an output value p(n+1) at its output terminal at time (n+1) after the lapse of one discrete time. Therefore, from equation (1), the following relationship is established:

$$p(n+1)=(1-1/256).p(n) \quad (2)$$

As described above, if the 12-bit output from the output terminal S of the subtractor 1002 is stored in the shift register 1001 at discrete time $n_4$, the storage value is $(1-1/256).a_0$ by substituting $p(n_4)=x(n_3)=a_0$ in equation (1). Therefore, if the above operation of the subtractor 1002 and the shifter 1003 is repeated every discrete time n after $n_4$, each output value p(n) from the shifter 1001 at that time is expressed as follows from equation (2):

$$p(n)=(1-1/256)^{n-n3}.a_0 \quad (3)$$

The gate 1013 inputs the output x(n) from the shifter 1001 to the shifter 1003 every discrete time n in response to the control signal PR which goes to logic "1" every time the sequential pulse $\phi$1 goes to logic "1" through the OR gates 1016 and 1021 in the gate controller 1014. Thus, equation (3) described above is established. The operation of the gate 1013 and the gate controller 1014 will be described later.

The output value p(n) calculated by equation (3) is sequentially input to the input terminal B of the comparator 1004 as $p(n_4)$, $p(n_5)$, and $p(n_6)$ at corresponding discrete times $n_4$, $n_5$, and $n_6$ in FIG. 12, and is compared with a corresponding one of the digital waveform signals $x(n_4)$, $x(n_5)$, and $x(n_6)$ sequentially input to the input terminal A. When these digital waveform signals are smaller than the corresponding output values from the shift register 1001, as shown in FIG. 12, the comparator 1004 outputs data of logic "0" at each discrete time, and the output from the subtractor 1002 is repetitively input to the shift register 1001 through the data switch 1005 and the AND gates 1006 to 1009. Thus, the output value p(n) of the shift register 1001 has characteristics which change according to equation (3), and are exponentially attenuated from the maximum peak value $a_0$, as shown in FIG. 12.

The output value p(n) of the shift register 1001, having characteristics which are exponentially attenuated after the discrete time $n_4$, serves as a threshold value signal for detecting the maximum peak value of the positive digital waveform signal x(n).

When the original waveform signal W1 of the first string becomes negative at discrete times $n_7$ to $n_{12}$, as shown in FIG. 12, a positive signal having a waveform obtained by folding a negative signal to the positive side is input as input digital waveform signals $x(n_7)$ to $x(n_{12})$, as shown in FIG. 12. The negative waveform is processed in the second half portion of a period wherein the sequential pulse $\phi$1 is at logic "1" (FIG. 11), as will be described later. Therefore, positive threshold value signals p(n) output from the shift register 1001 in the first half portion in the period wherein the sequential pulses $\phi$1 at the discrete times $n_7$ to $n_{12}$ are at logic "1" are not compared with the digital waveform signal x(n), only the attenuation operation in the subtractor 1002 and the shifter 1003 must be performed, and a storage operation to the shift register 1001 must be repeated. In the first half portion in the period wherein the sequential pulses $\phi$1 at the discrete times $n_7$ to $n_{12}$ are at logic 1, serial zero-crossing signals $z(n_7)$ to $z(n_{12})$ corresponding to the first string go to logic "0" indicating a negative component, and the A/D conversion clock signal ADCK goes to logic "1" (FIG. 11). Thus, the output from the exclusive OR gate 1012 and the output from the OR gate 1011 go to logic "1". Thus, the data switch 1005 is connected to the terminal A side, and the AND gates 1006 to 1009 are enabled. As a result, the output from the subtractor 1002 is stored in the shift register 1001.

As described above, while the negative digital waveform signals $x(n_7)$ to $x(n_{12})$ are input, the positive threshold value signals $p(n_7)$ to $p(n_{12})$ output from the shift register 1001 are kept attenuated, and positive digital waveform signals $x(n_{13})$, . . . begin to input again from discrete time $n_{13}$.

When a digital waveform signal $x(n_{14})$ becomes larger than a threshold value signal $p(n_{14})$ from the shift register 1001 at discrete time $n_{14}$, the output from the comparator 1004 goes to logic "1", and the digital waveform signal $x(n_{14})$ is input to the shift register 1001 through the data switch 1005 to serve as a storage value $p(n_{15})$ at the next discrete time $n_{15}$ in the same manner as at the discrete time $n_1$. At the same time, the flip-flop FFla is set in the same manner as at the discrete time $n_1$, and the maximum peak value detection signal MAX1 of the first string goes to logic "1", as shown in FIG. 12.

Thereafter, in FIG. 12, a new digital waveform signal $x(n_{15})$ becomes a storage value $p(n_{16})$ at discrete time $n_{15}$.

At discrete time $n_{16}$ in FIG. 12, since the digital waveform signal $x(n_{16})$ is decreased below an output value $p(n_{16})=x(n_{15})$ =al of the shift register 1001, the output from the comparator 1004 goes to logic "0", and the output from the subtractor 1002 becomes a storage value to the shift register 1001 in the same manner as at the discrete time $n_4$. At the same time, the flip-flop FFla is reset in the same manner as at the discrete time $n_4$, and the maximum peak value detection signal MAX1 of the first string goes to logic "0", as shown in FIG. 12. Thus, the input timing of the maximum peak value $a_1$ can be detected.

After the discrete time $n_{16}$ in FIG. 12, threshold value signals $p(n_{17})$, $p(n_{18})$, . . . which are exponentially attenuated from the maximum peak value $a_1$ are obtained from the shift register 1001. In this case, p(n) is given as follows according to equation (3):

$$p(n)=(1-1/256)^{n-n_{15}}\cdot a_1 \qquad (4)$$

The above operation is repeated in the first half portion in a period wherein the sequential pulse $\phi 1$ is at logic "1" (FIG. 11), so that the input timings of the maximum peak values $a_0$, $a_1$, . . . can be detected as falling timings of the maximum peak value detection signal MAX1 from logic "1" to logic "0" on the basis of the positive digital waveform signal x(n) corresponding to the first string.

<Processing of Negative Portion of First String>

Processing for detecting an input timing of a minimum peak value of a negative portion of the digital waveform signal of the first string shown in FIG. 12 will be described below. As has been already shown in FIG. 11, this processing is performed in the second half portion of the period wherein the sequential pulse $\phi 1$ is at logic "1". The processing in this period will be described below unless otherwise specified.

Since the positive digital waveform signals $x(n_1)$ to $x(n_6)$ are input at the discrete times $n_1$to $n_6$ in FIG. 12, the serial zero-crossing signals $z(n_1)$ to $z(n_6)$ are at logic "1", and in the second half portion of the period wherein the sequential pulse $\phi 1$ is at logic "1", the A/D conversion clock signal ADCK is at logic "0", as shown in FIG. 11. Therefore, the output from the exclusive OR gate 1012 and the output from the OR gate 1011 go to logic "1", the data switch 1005 is connected to the terminal A side, and the AND gates 1001 to 1009 are enabled. As a result, the output from the subtractor 1002 is input to the shift register 1001. Assuming that the storage value p(n) of the shift register 1001 is initially "0", the output from the subtractor 1002 is also "0", and hence, negative output values $q(n_1)$ to $q(n_6)$ from the shift register 1001 at the discrete times $n_1$to $n_6$ are "0", as shown in FIG. 12.

Subsequently, a negative digital waveform signal $x(n_7)$ is input at discrete time $n_7$. Thus, since the A input > the B input is established in the comparator 1004 in FIG. 10, its output goes to logic "1", and the output from the inverter 1010 goes to logic "0". In this case, the serial zero-crossing signal $z(n_1)$ is at logic "0", and in the second half portion of the period wherein the sequential pulse 1 is at logic "1", the A/D conversion clock signal ADCK is also at logic "0", as shown in FIG. 11. Therefore, the output from the exclusive OR gate 1012 shown in FIG. 10 is at logic "0".

The output from the OR gate 1011 goes to logic "0", the data switch 1005 is connected to the terminal B side, and the AND gates 1006 to 1009 are disabled. Therefore, the digital waveform signal $x(n_7)$ at time $n_7$ in FIG. 12 is stored in upper 8 bits (integral part) of the shift register 1001 through the switch 1005.

This storage operation is performed in synchronism with the leading edge of the timing signal M05 at a boundary where the sequential pulse $\phi 1$ changes from logic "1" to logic "0". At this timing, since the digital waveform signal D1 $=x(n_7)$ is input while being delayed by the conversion time $\Delta t$ of the A/D converter 533 (FIG. 5), as shown in FIG. 11, the storage operation to the shift register 1001 can be performed with a sufficient margin even at the boundary of the sequential pulse $\phi 1$.

At the same time, the AND gate 1026 is enabled at a timing at which the logic-"1" output of the comparator 1004 and the logic-"1" timing signal Q5 in FIG. 11 are input to the AND gate 1026 in positive logic, and the logic-"0" output of the serial zero-crossing signal $z(n_7)$ (ZCR) and the logic-"0" of A/D conversion clock signal ADCK in FIG. 11 are input in negative logic. Furthermore, since the sequential pulse $\phi 1$ is at logic "1", the output from the the AND gate AND1d goes to logic "1", as shown in FIG. 11, thus setting the flip-flop FFlb. Thus, at the end of the second half portion in the period wherein the sequential pulse $\phi 1$ at discrete time $n_7$ is at logic "1", a minimum peak value detection signal MIN1 corresponding to the first string as an output of the flip-flop FFlb goes to logic "1", as shown in FIG. 12.

Subsequently, assume that a digital waveform signal $x(n_8)$ larger than an immediately preceding signal (discrete time $n_7$) is input at discrete time $n_8$. A storage value $q(n_8)$ output from the shift register 1001 is equal to the immediately preceding digital waveform signal $x(n_7)$. That is, $q(n_8)=x(n_7)$. Therefore, in this case, the comparator 1004 shown in FIG. 10 outputs data of logic "1", and the exclusive OR gate 1012 also outputs data of logic "0" as in the immediately preceding cycle. The digital waveform signal $x(n_8)$ is stored in the shift register 1001 through the data switch 1005 as in the immediately preceding cycle.

The same operation as described above is performed at discrete time $n_9$, and a digital waveform signal $x(n_9)$ is stored in the shift register 1001.

A digital waveform signal $x(n_{10})$ is input at discrete time $n_{10}$, and at the same time, a storage value $q(n_{10})$ $=x(n_9)=b_0$ is output from the shift register 1001. In this case, since $n(n_{10})<q(n_{10})$, the output from the comparator 1004 goes to logic "0". The AND gate 1025 is enabled at a timing at which three signals, i.e., the output from the comparator 1004, the serial zero-crossing signal $z(n_{10})$ (ZCR) of logic "0", and the A/D conversion clock signal ADCK of logic "0" in FIG. 11 are input to the AND gate 1025 in negative logic, and the timing signal Q5 of logic "1" shown in FIG. 11 is input to the AND gate 1026 in negative logic. Furthermore, since the sequential pulse $\phi 1$ is at logic "1", the output from the AND gate ANDlc is at logic "1", thus resetting the flip-flop FFlb. At the end of the second half portion in the period wherein the sequential pulse $\phi 1$ at discrete time $n_{10}$ is at logic "1", the minimum peak value detection signal MIN1 corresponding to the first string goes to logic "0".

As described above, at time $n_{10}$ one discrete time after the minimum peak value $x(n_9)=b_0$ is input as the digital waveform signal x(n) of the first string, as shown in FIG. 12, the minimum peak value detection signal MIN1 of the first string goes to logic "0", and the input timing of the minimum peak value $b_0$ can be detected. Note that the detection timing is delayed by one discrete time for the same reason as in the maximum peak value detection signal MAX1, and this will be described later in the section "Description of Peak Value Fetching Circuit".

Simultaneously with the above operation, the output from the comparator 1004 goes to logic "0" at discrete time $n_{10}$ in FIG. 12, and the OR gate 1011 outputs data of logic "1" through the inverter 1010. Thus, the data switch 1005 is connected to the terminal A side and the AND gates 1007 to 1009 are enabled. Therefore, the 12-bit output from the output terminal S of the subtractor 1002 is stored in the shift register 1001.

Subsequently, at times $n_{11}$ and $n_{12}$ after discrete time $n_{10}$ in FIG. 12, the same operation as for the positive portion is performed by the subtractor 1002 and the shift register 1003, and threshold value signals $q(n_{11})$ and $q(n_{12})$ which are exponentially attenuated from the minimum peak value $b_0$ are obtained from the shift register 1001. In this case, q(n) is expressed as follows according to equations (3) and (4);

$$q(n)=(1/256)^{n-n9}.b_0 \quad (5)$$

When the original waveform signal W1 of the first string is positive at discrete times $n_{13}$ to $n_{18}$, as shown in FIG. 12, processing is opposite to the case wherein the waveform signal W1 becomes negative in the positive portion processing. Therefore, negative threshold value signal q(n) output from the shift register 1001 in the second half portion in the period wherein the sequential pulses $\phi$1 at discrete times $n_{13}$ to $n_{18}$ are at logic "1" are not compared with digital waveform signals x(n), only the attenuation operation described above must be performed by the subtractor 1002 and the shifter 1003, and the storage operation to the shift register 1001 must be repeated. In the second half portion in the period wherein the sequential pulses $\phi$1 at discrete times $n_{13}$ to $n_{18}$ are at logic "1", serial zero-crossing signals $z(n_{13})$ to $z(n_{18})$ corresponding to the first string go to logic "1" indicating a positive component, and the A/D conversion clock ADCK goes to logic "0" (FIG. 11). Thus, the output from the exclusive OR gate 1012 and the output from the OR gate 1011 go to logic "1". Thus, the data switch 1005 is connected to the terminal A side, and the AND gates 1006 to 1009 are enabled, so that the output from the subtractor 1002 is stored in the shift register 1001.

As described above, while the positive digital waveform signals $x(n_{13})$ to $x(n_{18})$ are input, the negative threshold value signals $q(n_{13})$ to $q(n_{18})$ output from the shift register 1001 are kept attenuated, and negative digital waveform signals $x(n_{19})$, . . . begin to be input again from discrete time $n_{19}$.

When a digital waveform signal $x(n_{20})$ becomes larger than a threshold value signal $p(n_{20})$ from the shift register 1001 at discrete time $n_{20}$ in FIG. 12, the output from the comparator 1004 goes to logic "1", and the digital waveform signal $x(n_{20})$ is input to the shift register 1001 through the data switch 1005 to serve as a storage value $q(n_{21})$ at the next discrete time $n_{21}$ in the same manner as at the discrete time $n_7$. At the same time, the flip-flop FFlb is set in the same manner as at the discrete time $n_7$, and the minimum peak value detection signal MIN1 of the first string goes to logic "1", as shown in FIG. 12.

Thereafter, in FIG. 12, a new digital waveform signal $x(n_{21})$ becomes a storage value $q(n_{22})$ at discrete time $n_{21}$.

At discrete time $n_{22}$ in FIG. 12, since the digital waveform signal $x(n_{22})$ is decreased below an output value $q(n_{22})=x(n_{21})=b_1$ of the shift register 1001, the output from the comparator 1004 goes to logic "0", and the output from the subtractor 1002 becomes a storage value to the shift register 1001 in the same manner as at the discrete time $n_{10}$. At the same time, the flip-flop FFlb is reset in the same manner as at the discrete time $n_{10}$, and the minimum peak value detection signal MIN1 of the first string goes to logic "0", as shown in FIG. 12. Thus, the input timing of the minimum peak value $b_1$ can be detected.

After the discrete time $n_{22}$ in FIG. 12, threshold value signal q(n) which is exponentially attenuated from the maximum peak value $b_1$ is obtained from the shift register 1001. In this case, q(n) is given as follows according to equations (3) to (5):

$$q(n)=(1-1/256)^{n-n21}.b_1 \quad (6)$$

The above operation is repeated in the second half portion in a period wherein the sequential pulse $\phi$1 is at logic "1" (FIG. 11), so that the input timings of the minimum peak values $b_0$, $b_1$, . . . can be detected as falling timings of the minimum peak value detection signal MIN1 from logic "1" to logic "0"on the basis of the negative digital waveform signal x(n) corresponding to the first string.

As described above, separate processing operations are performed for the digital waveform signal of the first string which includes positive and negative portions in a positive polarity in the first and second half portions of a period wherein the sequential pulse $\phi$1 is at logic "1". Thus, the input timings of the maximum peak values $a_0$, $a_1$, . . . as the positive peak values and the minimum peak values $b_0$, $b_1$, . . . as negative peak values shown in FIG. 12 can be detected as the maximum and minimum peak value detection signals MAX1 and MIN1 of the first string.

Figure 13A:
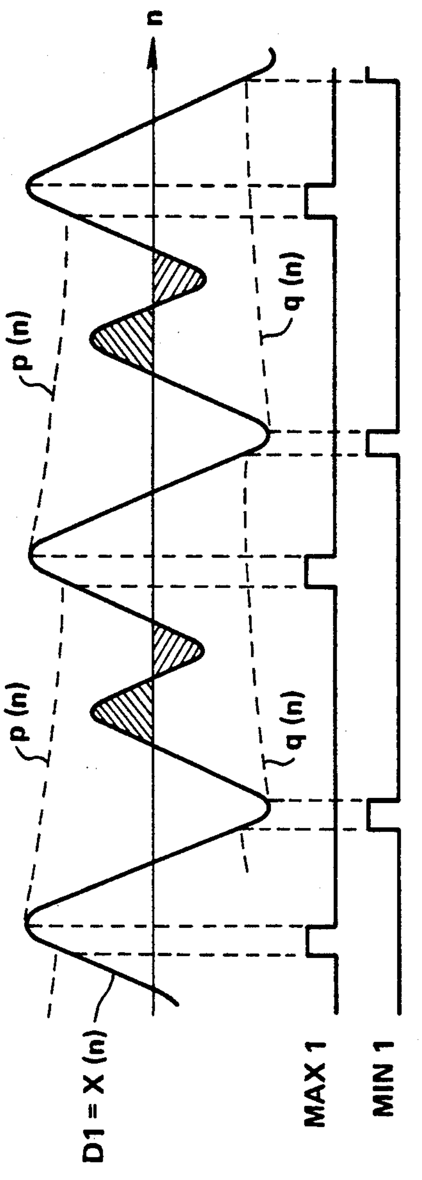
FIGS. 13A and 13B are charts showing the relationship between the amplitude and the operation of the peak detector.

As shown in FIG. 13A, the digital waveform signal D1 =x(n) corresponding to the first string (illustrated as a continuous waveform in FIG. 13A for the sake of simplicity) includes peak components of a second harmonic overtone indicated by hatched portions in FIG. 13A. In this case, since the positive threshold value p(n) and the negative threshold value q(n) of the first string as the output 1027 of the shift register 1001 are slowly and exponentially attenuated, peak timings of only respective periods can be accurately extracted without extracting timings of the pseudo peak components described above.

Figure 13B:
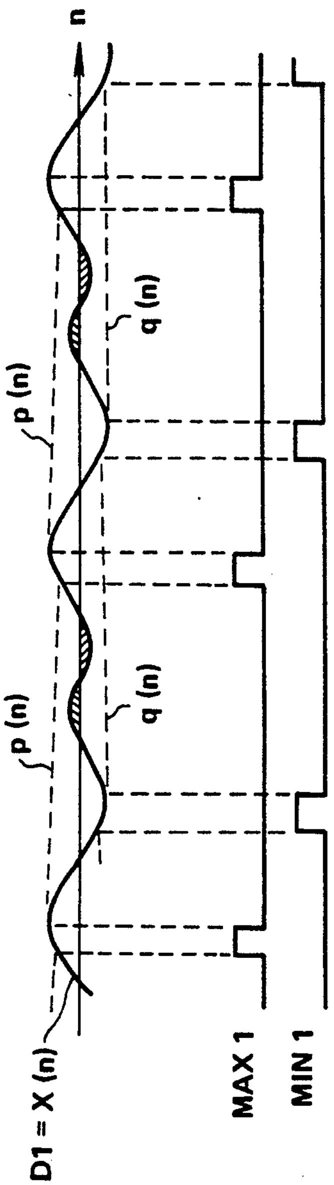

When the digital waveform signal D1 =x(n) has a small amplitude, as shown in FIG. 13B, the threshold values p(n) and q(n) can be determined on the basis of corresponding amplitude values according to equations (1) to (6), and peak timings of the pitch periods can be accurately extracted.

<Processing for Other Strings>

As described above, a component corresponding to the first string of the digital waveform signal D1 is processed at a timing at which the sequential pulse $\phi 1$ goes to logic "1", as shown in FIG. 11. In the first portion of the period where the pulse $\phi 1$ is at logic "1", processing for a positive portion is performed, and in the second half portion, processing for a negative portion is performed.

On the other hand, components corresponding to the second to sixth strings of the digital waveform signal D1 are time-divisionally processed at timings where the sequential pulses $\phi 2$ to $\phi 6$ go to logic "1". The same processing as that for the first string is performed, excluding detailed processing timings. In the first half portion of each time-divisional period, processing for a positive portion of the digital waveform signal corresponding to a string of interest is performed, and in the second half portion, processing for a negative portion is performed.

In this case, detection operations of maximum peak value detection signals MAX2 to MAX6 corresponding to the second to sixth strings can be realized in such a manner that the flip-flops FFia, the reset AND gates ANDia, and the set AND gates ANDib ($i = 2$ to 6) are operated in the same manner as the FFla, AND1a, and AND1b corresponding to the first string. Similarly, the detection operations of minimum peak value detection signals MIN2 to MIN6 can be realized in such a manner that the flip-flops FFib, the reset AND gates ANDic, and the set AND gates ANDid are operated in the same manner as the FFla, ANDlc, and AND1d corresponding to the first string.

In the above operations, the subtraction operations shown in equations (1) and (6) by the subtractor 1002 and the shifter 1003 in FIG. 10 are slightly varied in units of strings. This is achieved by the gate 1013 and the gate controller 1014, and the operations of these components will be described below.

Figure 14:
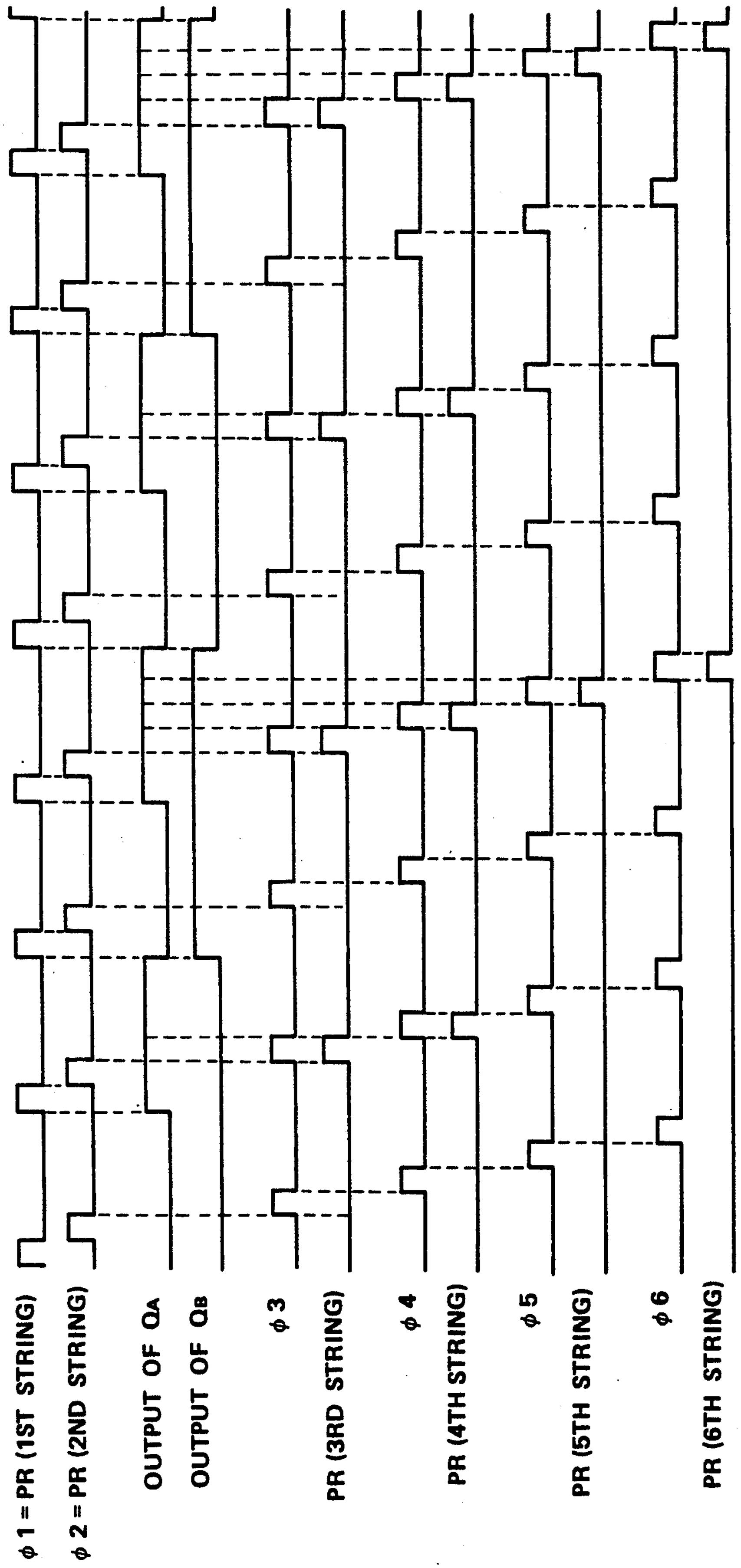
FIG. 14 is a timing chart of a subtraction operation of the peak detector in units of strings.

In the gate controller 1014 in FIG. 10, the sequential pulses $\phi 1$ and $\phi 2$ directly control the gate 1013 as the control signal PR through the OR gates 1016 and 1021. Timings PR(first string) and PR(second string) of the control signal PR for enabling the gate 1013 are the same as cycles wherein the sequential pulses $\phi 1$ and $\phi 2$ go to logic "1", as shown in FIG. 14.

On the other hand, the sequential pulses $\phi 3$ and $\phi 4$ input to the OR gate 1017 are output through the AND gate 1019 only when the output from the lower bit output terminal $Q_A$ of the counter 1015 is at logic "0". The logic levels of the outputs from the output terminals $Q_A$ and $Q_B$ of the counter 1015 are cyclically changed like (0, 0), (0, 1), (1, 0), (1, 1), (0, 0),... in synchronism with the leading edge of the sequential pulse $\phi 1$. Therefore, timings PR(third string) and PR(fourth string) for the third and fourth strings of the control signal PR for enabling the gate 1013 appear every other cycles with respect to a cycle wherein the sequential pulses $\phi 3$ and $\phi 4$ go to logic "1", as shown in FIG. 14.

Furthermore, the sequential pulses $\phi 5$ and $\phi 6$ input to the OR gate 1018 are output through the AND gate 1020 only when both the outputs from the upper bit output terminal $Q_B$ and the lower bit output terminal $Q_A$ are at logic "1". Therefore, timings PR(fifth string) and PR(sixth string) for the fifth and sixth strings of the control signal PR for enabling the gate 1013 appear once in four cycles with respect to a cycle wherein the sequential pulses $\phi 5$ and $\phi 6$ go to logic "1", as shown in FIG. 14.

With the above operation, for the first and second strings, the division operation by the shifter 1003 and the subtraction operation by the subtractor 1002 are executed in cycles synchronous with the sequential pulses $\phi 1$ and $\phi 2$, and threshold value calculations are made according to equations (1) to (6). For the third and fourth strings, the threshold value calculation is performed once in two cycles synchronous with the sequential pulses $\phi 3$ and $\phi 4$. In a cycle wherein the gate 1013 is disabled, since the output from the shifter 1003 becomes zero, the output 1027 of the shift register 1001 passes through the subtractor 1002, and the threshold value is left unchanged. Furthermore, for the fifth and sixth strings, the threshold value calculation is performed once in four cycles synchronous with the sequential pulses $\phi 5$ and $\phi 6$, and in a cycle wherein the gate 1013 is disabled, the threshold value is left unchanged.

Therefore, an attenuation factor of the threshold value signal as the output 1027 of the shift register 1001 indicated by p(n), q(n), and the like is large for the first and second strings, is medium for the third and fourth strings, and small for the fifth and sixth strings. Since a string vibration period of a high-tone side, i.e., the first string side is short, and a string vibration period of a bass-tone side, i.e., sixth string side is long, the threshold value signal is attenuated in correspondence with a string vibration period.

(Description of Time Constant Conversion Controller)

The time constant conversion controller 904 shown in FIG. 9 constituting the pitch extraction digital section 304 in FIG. 3 will be described below.

<<General Description>>

The time constant change signal GX for changing a division ratio in the shifter 1003 (FIG. 10) in the peak detector 901 in FIG. 9 is generated, thereby changing an attenuation factor (time constant) of the threshold value signals p(n) and q(n) described with reference to FIGS. 12 and 13. More specifically, the attenuation factor of the threshold value signals p(n) and q(n) is changed depending on situation, so that maximum and minimum peak timings in the peak detector 901 in FIG. 9 can be accurately extracted.

<<Arrangement>>

Figure 15:
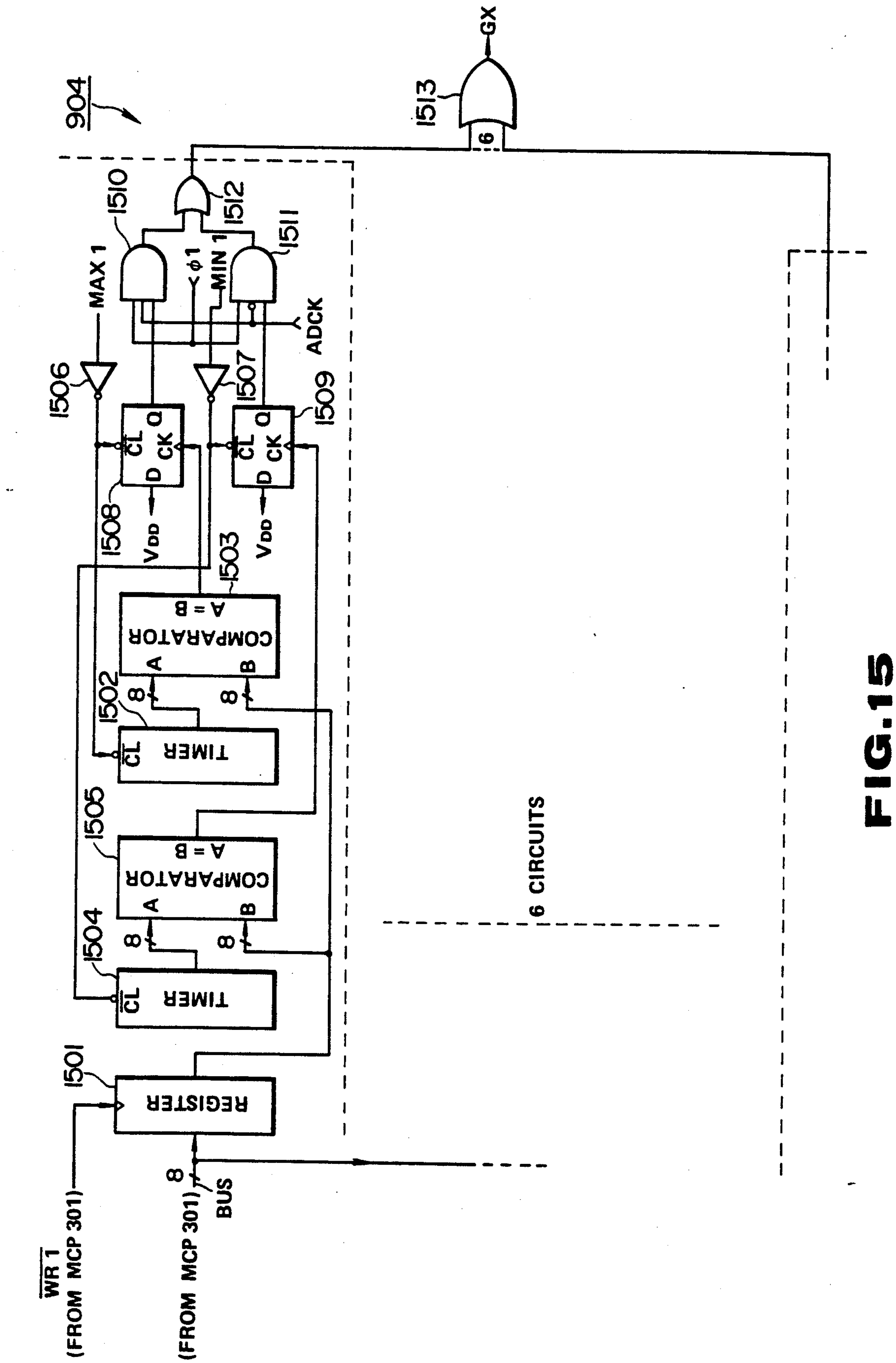
FIG. 15 is a detailed circuit diagram of a time constant conversion controller.

FIG. 15 is a detailed circuit diagram of the time constant conversion controller 904 in FIG. 9. FIG. 15 illustrates only one circuit portion corresponding to the first string. In practice, a total of six circuits same as that shown in FIG. 15 are provided.

A write signal $\overline{WR1}$ is input from the MCP 301 in FIG. 3 to a register 1501 through a control line (not shown), so that period data (to be described later) from the MCP 301 is written in the register 1501 through the bus BUS (FIG. 3 or 9).

The maximum and minimum peak value detection signals MAX1 and MIN1 from the peak detector 901 (FIGS. 9 and 10) are input to clear terminals $\overline{CL}$ of latches 150B and 1509 and timers 1502 and 1504 through inverters 1506 and 1507. These latches and timers are cleared when the signals MAX1 and MIN1 are changed from logic "1" to "0".

Eight-bit count outputs of the timers 1502 and 1504 are input to terminals A of comparators 1505 and 1503, respectively. These comparators receive the period data from the register 1501 at their terminals B and compare the input values at the terminals A and B with each other. When the inputs at the terminals A and B coincide with each other, the comparators output data of logic "1", and input it to clock terminals CK of the D flip-flops (latches) 1508 and 1509.

The D input terminals of the D flip-flops 1508 and 1509 are applied with a voltage $V_{DD}$ of logic level "1". At a timing at which the input to the clock terminal CK goes to logic "1", a Q output of the corresponding flip-flop goes to logic "1".

The Q output of the D flip-flop 1508 is input to an AND gate 1510. The output from the AND gate 1510 goes to logic "1" in the first half portion in a period wherein the sequential pulse $\phi$1 from the timing generator 905 in FIG. 9 goes to logic "1", i.e., at a timing at which the A/D conversion clock signal ADCK from the timing generator 905 goes to logic "1" (FIG. 11). The output of logic "1" is supplied as the time constant change signal GX to the shifter 1003 in FIG. 10 through OR gates 1512 and 1513.

The Q output of the D flip-flop 1509 is input to an AND gate 1511. The output from the AND gate 1511 goes to logic "1" in the second half portion in a period wherein the sequential pulse $\phi$1 goes to logic "1", i.e., at a timing at which the A/D conversion clock signal ADCK goes to logic "0" (FIG. 11; the signal is input to the AND gate 1511 in negative logic). The output of logic "1" is similarly supplied as the time constant change signal GX to the shifter 1003 in FIG. 10 through the OR gates 1512 and 1513.

In circuits corresponding to the second to sixth strings (not shown in FIG. 15), the pulses $\phi$2 to $\phi$6 from the timing generator 905 in FIG. 9 are input in place of $\phi$1 in FIG. 15, signals MAX2 to MAX6 and MIN2 to MIN6 from the peak detector 901 in FIG. 9 or 10 are input in place of the signals MAX1 and MIN1, and signals $\overline{WR2}$ to $\overline{WR6}$ are input from the MCP 301 in FIG. 3 through a control line (not shown) in place of $\overline{WR1}$.

<<Operation>>

The operation of the time constant conversion controller 904 in FIG. 9 or 15 will now be described.

As has been described in the section "Processing of Positive Portion of First String" or "Processing of Negative Portion of First String" in "Description of Peak Detector", in the peak detector 901 in FIG. 9 or 10, the threshold value signal p(n) or q(n) corresponding to the first string, which is slowly attenuated from the immediately preceding maximum/minimum peak value of the first string at a rate of 1/256 (equations (1) to (6)) and the digital waveform signal D1 = x(n) of the first string are compared with each other. When x(n) exceeds p(n) or q(n) for the next time, a peak timing of a waveform including a present maximum/minimum peak value of the first string is detected. This operation is similarly time-divisionally processed for other strings.

However, at the leading edge of a waveform of the digital waveform signal D1 corresponding to each string, in order to quickly detect a vibration of the waveform, an attenuation factor of a threshold value signal corresponding to each string is set so that the threshold value signal corresponding to each string is attenuated after the lapse of a period duration of a highest tone of the string (a period corresponding to depression of each string on the fret 103 in FIG. 1 corresponding to the highest tone). Immediately thereafter, the attenuation factor is set so that the threshold value corresponding to each string is immediately attenuated after the lapse of a period (lowest tone period) duration corresponding to each open string so as not to detect a harmonic overtone of each pitch period (vibration period of the digital waveform signal of each string). Furthermore, after the MCP 301 in FIG. 3 effectively extracts the pitch period of each string (which can be changed in real time) by an operation (to be described later), the attenuation factor is set so that the threshold value signal corresponding to the string is immediately attenuated after the lapse of the corresponding pitch period duration. With the above setting, it was experimentally found that the timing of the maximum/-minimum peak value of each pitch period can be most accurately detected from the digital waveform signal D1 corresponding to each string.

<Processing of Positive Portion of First String in Highest Tone Period>

In order to realize the above operations, according to the operation described with reference to FIG. 12 and the like, the maximum peak value detection signal MAX1 of the positive portion of the first string goes to logic "0" at discrete time na in FIG. 16, and the timing of the first maximum peak value is detected from a digital waveform signal x(n) of the first string. After the MCP 301 in FIG. 3 confirms this by an operation to be described later (refer to the explanation of step M1 in FIG. 21), the MCP 301 supplies the write signal WR1 to the register 1501 in FIG. 15 through a control line (not shown) to set a highest tone period duration corresponding to the first string in the register 1501. At the same time, at a timing at which the maximum peak value detection signal of the first string goes to logic "0", the timer 1502 is cleared through an inverter 1506 in FIG. 15, thus starting to count a time.

Figure 16:
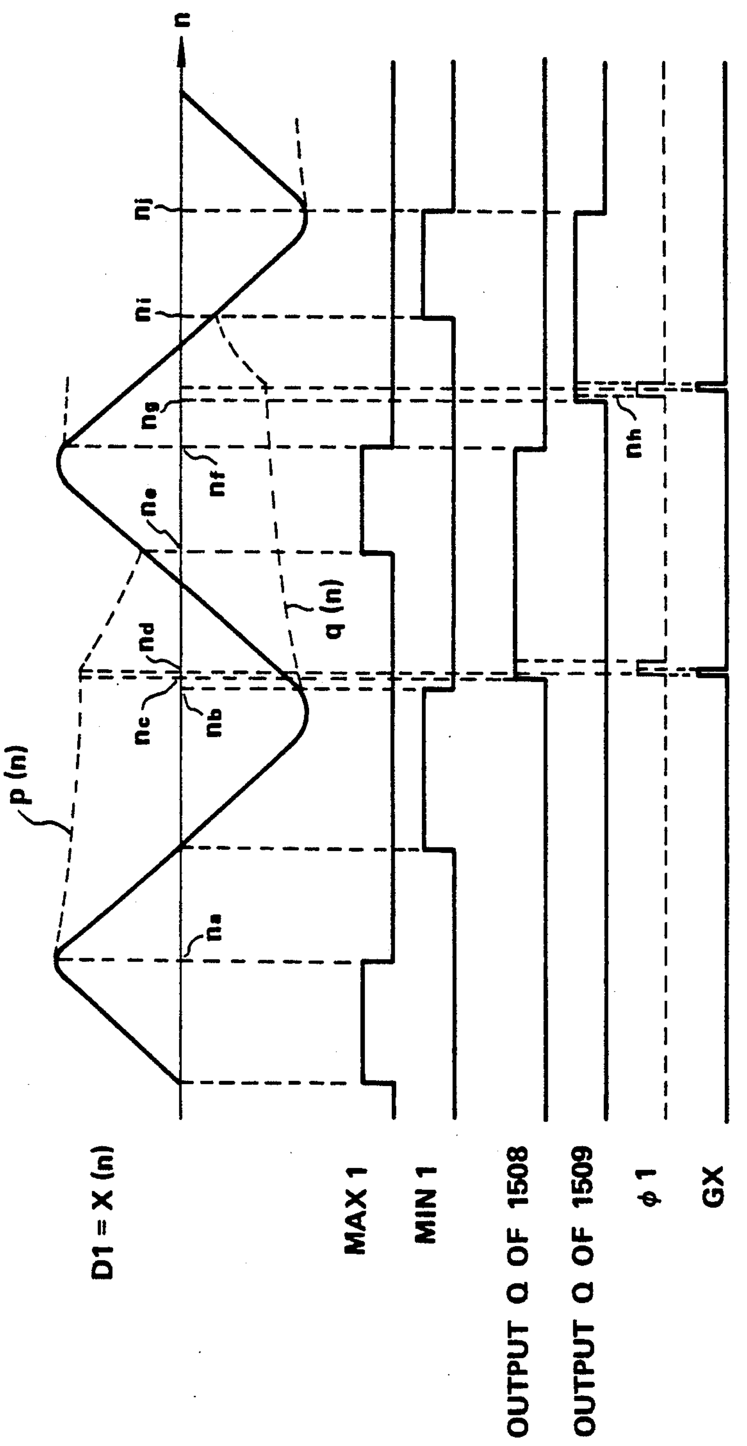
FIG. 16 is a chart for explaining in detail an operation of the time constant conversion controller.

After the discrete time na, the peak detector 901 in FIG. 9 or 10 generates a threshold value signal p(n) which is slowly attenuated at a rate of 1/256, as shown in FIG. 16, and corresponds to the positive portion of the first string, and is compared with the digital waveform signal x(n) of the positive portion of the first string. At the same time, the comparator 1503 in FIG. 15 compares the count output starting from the discrete time na (FIG. 16) from the timer 1502 to the terminal A with the highest tone period duration corresponding to the first string input from the register 1501 to the terminal B.

In FIG. 16, at discrete time nc the highest tone period duration corresponding to the first string after the discrete time na, the comparator 1503 detects a coincidence between the inputs at the terminals A and B, and its output goes to logic "1". At this timing, the D input terminal of the D flip-flop 1508 in FIG. 15 is set at logic level "1", and its Q output goes to logic "1", as shown in FIG. 16.

Subsequently, at discrete time nd in FIG. 15 immediately thereafter, in the first half portion in a period wherein the sequential pulse $\phi$1 goes to logic "1", i.e., at a timing at which the A/D conversion clock signal ADCK goes to logic "1", the AND gate 1510 is enabled, and the time constant change signal GX output through the OR gates 1512 and 1513 goes to logic "1", as shown in FIG. 16.

The time constant change signal GX is input to the shifter 1003 (FIG. 10) in the peak detector 901 in FIG.

9. The timing described above just coincides with a time-divisional timing at which the peak detector 901 performs processing of the positive portion of the first string. Therefore, with the above operation, the 1/256 division operation in the shifter 1003 in FIG. 10 is switched to a 1/16 division operation. As a result, the attenuation factor of the threshold value signal p(n) corresponding to the positive portion of the first string and output from the output terminal S of the subtractor 1002 in FIG. 10 is increased. This state is repeated every time the sequential pulse $\phi 1$ goes to logic "1" and the A/D conversion clock signal ADCK goes to logic "1" in the first half of the logic "1" period of the pulse $\phi 1$ after the discrete time nd, and the time constant change signal GX goes to logic "1" (omitted in FIG. 16). Therefore, the attenuation factor of the threshold value signal p(n) corresponding to the positive component of the first string is increased after the discrete time nd, and the threshold value signal is immediately attenuated, as shown in FIG. 16. This is apparent from the fact that the term of 1/256 in equations (1) to (4), and the like described in the section "Processing of Positive Portion of First String" in "Description of Peak Detector" is replaced with 1/16.

With the above operation, after the discrete time nd, the peak detector 901 in FIG. 9 or 10 compares the threshold value signal p(n) which corresponds to the positive component of the first string and is immediately attenuated at a rate of 1/16 with the digital waveform signal x(n) of the positive component of the first string. At discrete time ne, as shown in FIG. 16, a peak timing of a waveform including a next maximum peak value corresponding to the first string can be reliably detected, and the maximum peak value detection signal MAX1 corresponding to the first string goes to logic "1". At discrete time nf, a timing of the next maximum peak value corresponding to the first string can be detected as a timing at which the signal MAX1 goes to logic "0".

When the signal MAX1 goes to logic "0", the timer 1502 and the D flip-flop 1508 are cleared through the inverter 1506 in FIG. 15, and the Q output of the D flip-flop 1508 goes to logic "0", as shown in FIG. 16.

<Processing of Negative Portion of First String in Highest Tone Period>

The same operation as described above is performed for the negative portion of the digital waveform signal x(n) of the first string.

More specifically, according to the operation described with reference to FIG. 12 and the like, the minimum peak value detection signal MIN1 of the negative component of the first string goes to logic "0" at discrete time nb in FIG. 16, and the timing of the first minimum peak value is detected from the digital waveform signal x(n) of the first string. Then, the timer 1504 is cleared through an inverter 1507 in FIG. 15, thus starting to count a time.

After the discrete time nb, as shown in FIG. 16, a threshold value signal q(n) which is slowly attenuated at a rate of 1/256 and corresponds to the negative component of the first string is compared with the digital waveform signal x(n) of the negative component of the first string. At the same time, the comparator 1505 in FIG. 15 compares the count output starting from the discrete time nb (FIG. 16) input from the timer 1504 to the terminal A with the highest tone period duration corresponding to the first string input from the register 1501 to the terminal B (which has already been set at the discrete time na.)

In FIG. 16, at discrete time ng the highest tone period duration corresponding to the first string after the discrete time nb, the comparator 1505 in FIG. 15 detects a coincidence between the inputs at the terminals A and B, and its output goes to logic "1". At this timing, the D input terminal of the D flip-flop 1509 in FIG. 15 is set at logic level "1", and its Q output goes to logic "1", as shown in FIG. 16.

Subsequently, at discrete time nh in FIG. 15 immediately thereafter, in the second half portion in a period wherein the sequential pulse $\phi 1$ goes to logic "1", i.e., at a timing at which the A/D conversion clock signal ADCK goes to logic "0", the AND gate 1511 is enabled, and the time constant change signal GX output through the OR gates 1512 and 1513 goes to logic "1", as shown in FIG. 16.

The timing described above just coincides with a time-divisional timing at which the peak detector 901 performs processing of the negative component of the first string, as shown in FIG. 11. This state is repeated every time the sequential pulse $\phi 1$ goes to logic "1" and the A/D conversion clock signal ADCK goes to logic "0" in the second half of the logic "1" period of the pulse $\phi 1$ after the discrete time nh, and the time constant change signal GX goes to logic "1" (omitted in FIG. 16). Therefore, the attenuation factor of the threshold value signal q(n) corresponding to the negative portion of the first string is increased after the discrete time nh, and the threshold value signal is immediately attenuated as shown in FIG. 16. This is apparent from the fact that the term of 1/256 in equations (5) or (6), described in the section "Processing of Negative Portion of First String" in "Description of Peak Detector" is replaced with 1/16.

With the above operation, after the discrete time nh, the threshold value signal q(n) which corresponds to the negative portion of the first string and is immediately attenuated at a rate of 1/16 is compared with the digital waveform signal x(n) of the negative portion of the first string. At discrete time ni, as shown in FIG. 16, a peak timing of a waveform including a next minimum peak value corresponding to the first string can be reliably detected, and the minimum peak value detection signal MIN1 corresponding to the first string goes to logic "1". At discrete time nj, a timing of the next minimum peak value corresponding to the first string can be detected as a timing at which the signal MIN1 goes to logic "0".

When the signal MIN1 goes to logic "0", the timer 1504 and the D flip-flop 1509 are cleared through the inverter 1507 in FIG. 15, and the Q output of the D flip-flop 1509 goes to logic "0", as shown in FIG. 16.

<Processing of First String in Open String Period>

As described above, when the maximum/minimum peak value immediately after the digital waveform signal x(n) corresponding to the first string rises is detected at discrete time nf or nj in accordance with the threshold value signal p(n) or q(n) which corresponds to the first string and is immediately attenuated after the lapse o the highest tone period duration, the MCP 301 in FIG. 3 supplies the write signal WR1 to the register 1501 in FIG. 15 by an operation (to be described later; refer to step S21 in FIG. 24). so that an open string period duration corresponding to the first string is set in the register 1501 through the bus BUS.

Thereafter, the time constant conversion controller 904 in FIG. 9 or 15 performs the same operation as described with reference to FIG. 16. As a result, the timing of the maximum/minimum peak value of the digital waveform signal x(n) corresponding to the first string is detected in accordance with the threshold value signal p(n) or q(n) which corresponds to the first string and is immediately attenuated after the lapse of the open string period duration, so as not to detect a harmonic overtone of the corresponding pitch period.

<Processing of First String in Pitch Period>

After the above operation, the MCP 301 can detect the pitch period from the digital waveform signal x(n) of the first string by an operation (to be described later; see FIGS. 25 and 26) in real time. Every time the MCP detects the pitch period, it supplies the write signal $\overline{WR1}$ to the register 1501 in FIG. 15 by an operation (to be described later; refer to step S62 in FIG. 26), so that each pitch period duration extracted in correspondence with the first string is set in the register 1501 through the bus BUS.

Therefore, the time constant conversion controller 904 in FIG. 9 or 15 detects the maximum/minimum peak value of the digital waveform signal x(n) corresponding to the first string in accordance with the threshold value signal p(n) or q(n) which corresponds to the first string and is immediately attenuated after the lapse of the pitch period duration.

<Processing of Other Strings>

The processing for the time-divisional signal x(n) of the digital waveform signal D1 corresponding to the first string has been described. For the remaining second to sixth strings, corresponding circuits (not sequential pulses $\phi 2$ to $\phi 6$, the maximum peak value detection signals MAX2 to MAX6 and the minimum peak value detection signals MIN2 to MIN6 from the peak detector 901 shown in FIG. 9 or 10, and the write signals $\overline{WR2}$ to $\overline{WR6}$ from the MCF 301 in FIG. 3, thereby performing the same processing as that for the first string synchronously when the peak detector 901 shown in FIG. 9 or 10 time-divisionally performs processing corresponding to the strings, as shown in FIG. 11.

In this embodiment, the MCP 301 in FIG. 3 extracts a pitch period to perform musical tone control in a software manner as will be described later in accordance with the timing of the peak value of the digital waveform signal D1 and the like detected by hardware, i.e., the peak detector 901 in FIG. 9. The pitch extraction result is fed back to the hardware of the peak detector 901 through the time constant conversion controller 904 in FIG. 9, thus realizing more accurate timing extraction of a peak value.

(Description of Zero-crossing Time Fetching Circuit)

The zero-crossing time fetching circuit 902 in FIG. 9 constituting the pitch extraction digital section 304 in FIG. 3 will now be described.

<<General Description>>

In this embodiment, as has been described in the section "General Operation of Electronic Stringed Instrument of This Embodiment" with reference to FIG. 4, the peak values $a_0$ to $a_3$ or $b_0$ to $b_3$ (FIG. 4) are extracted from the digital waveform signal D1 output from the pitch extraction analog section 303 in FIG. 3 or 5 in units of strings. At the same time, the zero-crossing times $t_1$ to $t_7$ (FIG. 4) immediately after the corresponding peak values are extracted. These data are supplied to the MCP 301 in FIG. 3. The MCP 301 extracts the pitch periods $T_0$ to $T_5$ (FIG. 4) in units of strings in accordance with an operation to be described later.

Figure 17:
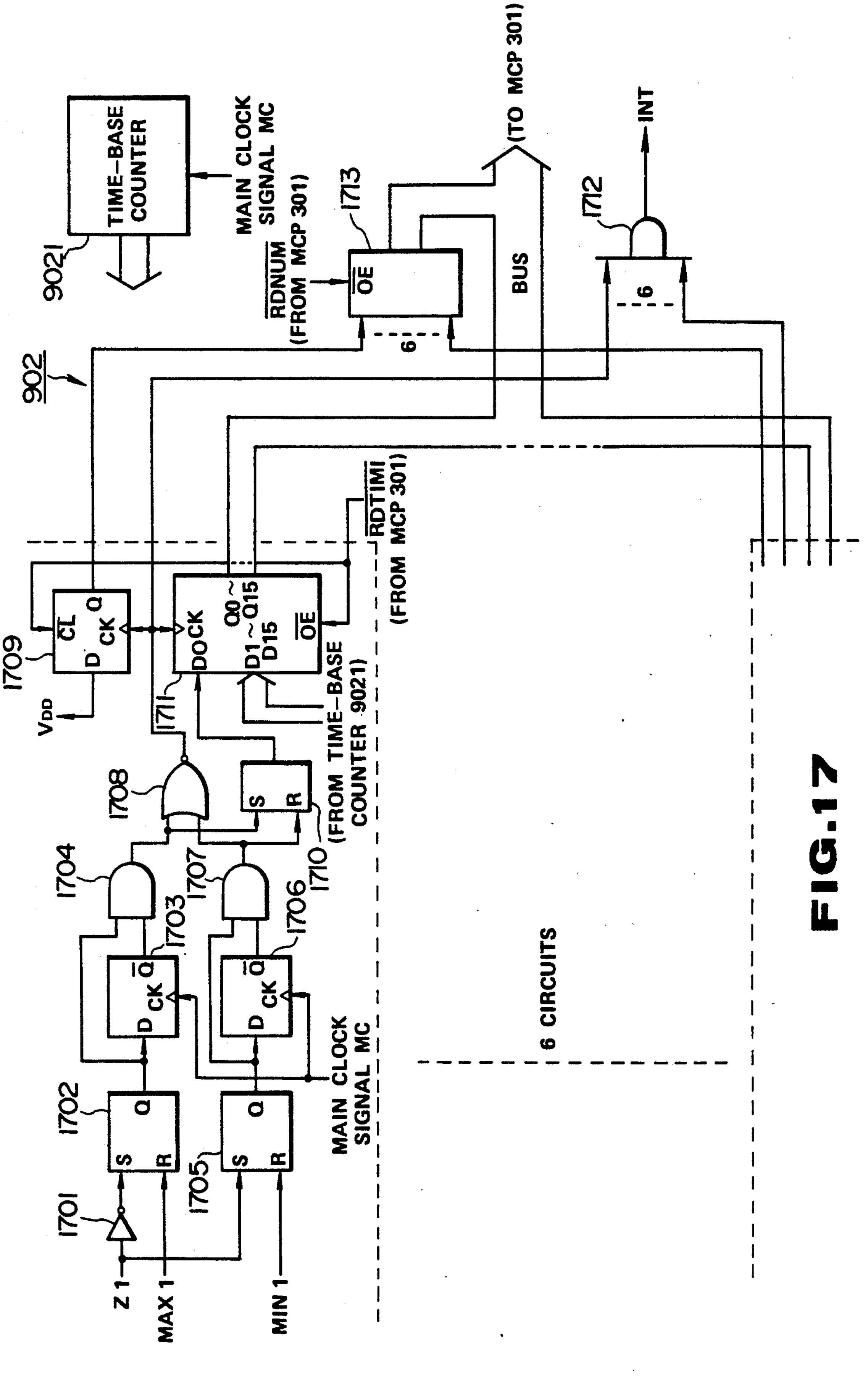
FIG. 17 is a detailed circuit diagram of a zero-crossing time fetching circuit.

The zero-crossing time fetching circuit 902 in FIG. 9 or 17 fetches the zero-crossing times immediately after the maximum or minimum peak values in units of strings on the basis of the zero-crossing signals Z1 to Z6 corresponding to the strings output from the pitch extraction analog section 303 in FIG. 3 or 5, and the maximum peak value detection signals MAX1 to MAX6 and minimum peak value detection signals MIN1 to MIN6 corresponding to the strings output from the peak detector 901 in FIG. 9 or 10. The circuit 902 outputs the zero-crossing times to the MCP 301 in FIG. 3.

<<Arrangement>>

FIG. 17 is a detailed circuit diagram of the zero-crossing time fetching circuit 902 in FIG. 9. FIG. 17 illustrates only one circuit portion corresponding to the first string. In practice, a total of six circuits same as that shown in FIG. 17 are provided.

The maximum peak value detection signal MAX1 corresponding to the first string output from the peak detector 901 in FIG. 9 or 10 is input to the R (reset) input terminal of an R-S flip-flop 1702, and the zero-crossing signal Z1 corresponding to the first string from the pitch extraction analog section 303 in FIG. 3 or 5 is input to the S (set) input terminal of the flip-flop through an inverter 1701. An output from the Q output terminal of the R-S flip-flop 1702 is input to the D input terminal of a D flip-flop 1703.

The minimum peak value detection signal MIN1 corresponding to the first string output from the peak detector 901 is input to the R (reset) input terminal of an R-S flip-flop 1705, and the zero-crossing signal Z1 corresponding to the first string is input to its S (set) input terminal. An output from the Q output terminal of the R-S flip-flop 1705 is input to the D input terminal of a D flip-flop 1706.

The CK (clock) terminals of the D flip-flops 1703 and 1706 receive a main clock signal MC from the timing generator 905 in FIG. 9. In response to the leading edge of the clock signal MC, the flip-flops fetch the signals input at the corresponding D input terminals, and output them from their Q output terminals. The output signals are input to the first input terminals of AND gates 1704 and 1707, respectively. The second input terminals of the AND gates 1704 and 1707 receive the outputs from the Q output terminals of the R-S flip-flops 1702 and 1705.

The outputs from the AND gates 1704 and 1707 are input to a NOR gate 1708 and are also input to the S (set) and R (reset) input terminals of an R-S flip-flop 1710, respectively. The output from the NOR gate 1708 is input to the CK (clock) terminals of a D flip-flop 1709 and a multi-input/multi-output type D flip-flop 1711.

An output from the Q output terminal of the R-S flip-flop 1710 is input to a 0th-bit input terminal DO of the D flip-flop 1711. First- to 15th-bit input terminals D1 to D15 of the flip-flop 1711 receive a count output from a time-base counter 9021 which operates in accordance with the main clock signal MC. These storage values are output onto the bus BUS through output terminals Q0 to Q15.

The D input terminal of the D flip-flop 1508 is applied with a voltage $V_{DD}$ of logic level "1".

The $\overline{\mathrm{CL}}$ (clear) terminal of the D flip-flop 1709 and the OE (output enable) terminal of the D flip-flop 1711 receive time read signal $\overline{\mathrm{RDTIM1}}$ corresponding to the first string from the MCP 301 in FIG. 3.

The input terminals of a gate 1713 receive an output from the Q output terminal of the D flip-flop 1709 (the circuit corresponding to the first string), and outputs from D flip-flops corresponding to the second to sixth strings (not shown). The OE (output enable) terminal of the gate 1713 receives a string number read signal $\overline{\mathrm{RDNUM}}$ from the MCP 301 in FIG. 3. The output from the gate 1713 is output to the MCP 301 in FIG. 3 through the bus BUS.

The input terminals of an AND gate 1712 receive the output from the NOR gate 1708 corresponding to the first string and outputs from NOR gates corresponding to the second to sixth strings (not shown). Thus, the AND gate 1712 outputs the interruption signal INT common to all the strings to the MCP 301 in FIG. 3. Note that in the circuits corresponding to the second to sixth strings (not shown in FIG. 17), the signals Z2 to Z6, MAX2 to MAX6, and MIN2 to MIN6 are input in place of the signals Z1, MAX1, and MIN1 in FIG. 17, and signals $\overline{\mathrm{RDTIM2}}$ to $\overline{\mathrm{RDTIM6}}$ are input in place of the $\overline{\mathrm{RDTIM1}}$.

<<Operation>>

The operation of the zero-crossing time fetching circuit 902 in FIG. 9 or 17 will be described below.

Figure 18:
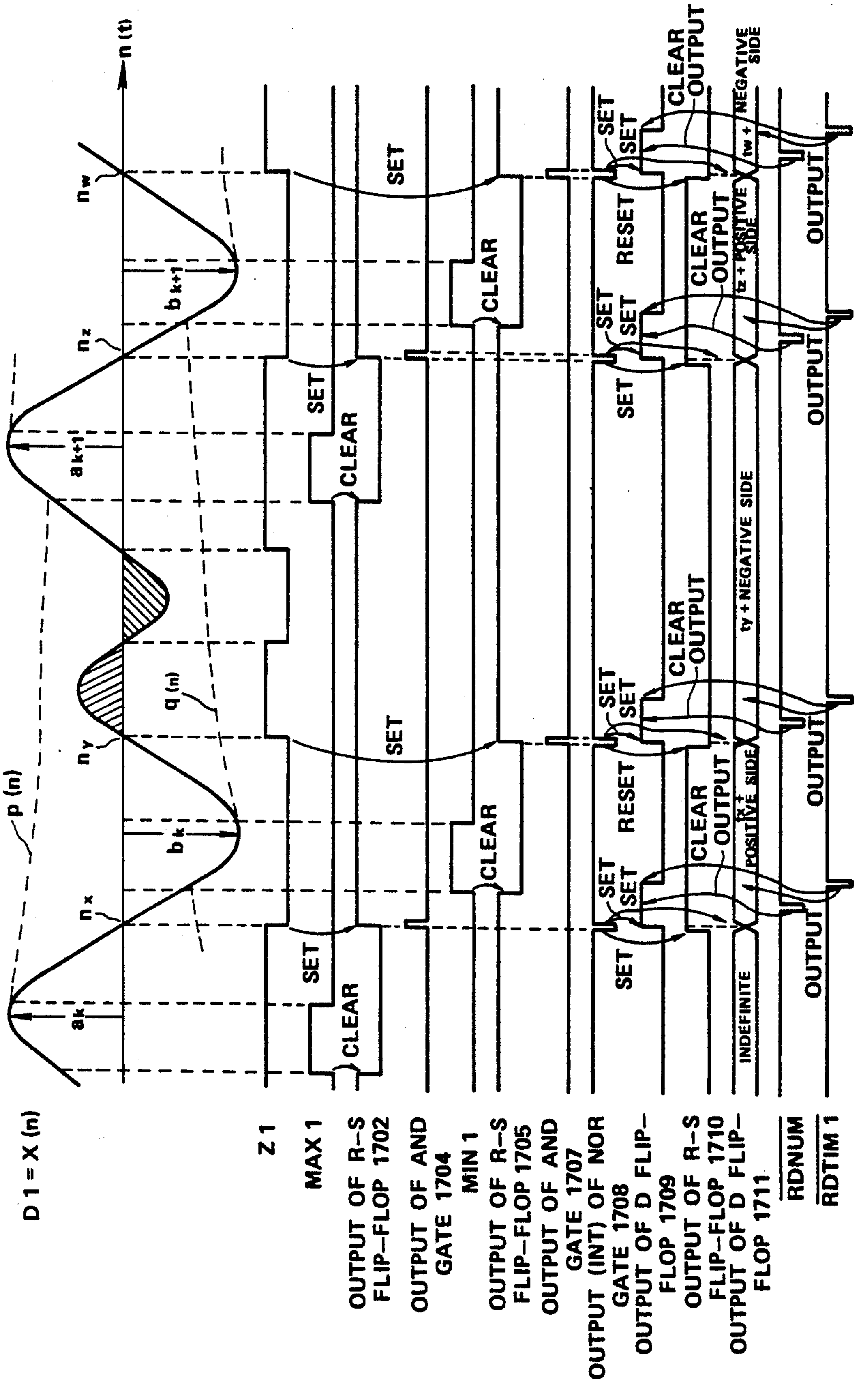
FIG. 18 is a timing chart showing an operation of the zero-crossing time fetching circuit.

The maximum peak value detection signal MAX1 and the minimum peak value detection signal MIN1 corresponding to the first string output from the peak detector 901 in FIG. 9 or 10 are signals which go to logic "1" before and after input timings of maximum peak values ak and a(k+1) and minimum peak values bk and b(k+1) of the digital waveform signal D1 =x(n) corresponding to the first string, as shown in FIG. 18. These signals are generated upon comparison between the digital waveform signal D1 =x(n) and the positive and negative threshold value signals p(n) and q(n), as has been described above with reference to FIG. 10. Note that the digital waveform signal D1 =x(n) corresponding to the first string is a time-divisional signal as shown in FIG. 12 in practice, and the negative portion is inverted to the positive portion. However, FIG. 18 illustrates a normal waveform for the sake of descriptive convenience.

Meanwhile, the zero-crossing signal Z1 output from the pitch extraction analog section 303 in FIG. 3 or 5 is a signal which goes to logic "1" in a positive portion of the digital waveform signal D1 =x(n), and goes to logic "0" in a negative portion thereof, as shown in FIG. 18.

<Fetching of Positive Zero-crossing Time>

Assuming that the maximum peak value detection signal MAX1 goes to logic "1" before or after the input timing of the maximum peak value ak, the R-S flip-flop 1702 is cleared at a timing at which the signal MAX1 goes to logic "1", and its output goes to logic "0", as shown in FIG. 18.

At discrete time nx immediately after the maximum peak value ak is input, when the zero-crossing signal Z1 goes from logic "1" to "0" at a timing at which the digital waveform signal D1 =x(n) zero-crosses from the positive side to the negative side, the R-S flip-flop 1702 is set accordingly, and its output goes to logic "1", as shown in FIG. 18.

Thus, in a one-shot pulse generator constituted by the D flip-flop 1703 and the AND gate 1704, at substantially the same timing at which the output from the R-S flip-flop 1702 goes from logic "0" to "1" at the discrete time nx, the AND gate 1704 outputs a one-shot pulse of logic "1" having the same pulse width as the main clock signal MC, as shown in FIG. 18 (in practice, the one-shot pulse is slightly offset from the above timing since it is synchronous with the main clock signal MC). With this operation, a zero-crossing timing can be detected.

At a timing at which the one-shot pulse from the AND gate 1704 changes from logic "0" to "1", the R-S flip-flop 1710 is set, and its output goes to logic "1", as shown in FIG. 18. Since this output goes to logic "1", the fact that a zero-crossing has occurred immediately after the maximum peak value ak, i.e., the positive peak value is input is stored. On the contrary, if the output is at logic "0", this means a zero-crossing immediately after the minimum peak value, i.e., the negative peak value. In this manner, the output from the R-S flip-flop 1710 indicates the maximum (positive) or minimum (negative) peak value immediately before the zero-crossing timing, and this output will be called a positive/negative flag hereinafter.

Subsequently, the one-shot pulse from the AND gate 1704 is inverted by the NOR gate 1708, and at a timing at which the one-shot pulse changes from logic "0" to "1", the D flip-flop 1709 is operated, and its output goes to logic "1", as shown in FIG. 18. Since this output goes to logic "1", the fact that a zero-crossing has occurred immediately after the peak value is input in the first string is stored.

Simultaneously with the above-mentioned timing, the D flip-flop 1711 is operated, and the positive/negative flag at logic "1" set in the R-S flip-flop 1710 immediately therebefore is set through the 0th-bit input terminal DO. The count output of the time-base counter 9021 at that time, i.e., at the zero-crossing timing is set through the 1st- to 15th-bit input terminals D1 to D15. More specifically, the D flip-flop 1711 stores a zero-crossing time tx (almost equal to discrete time nx) immediately after the maximum peak value ak is input and the positive/negative flag at logic "1" indicating that the peak value immediately before the zero-crossing time is a maximum peak value. Since the zero-crossing time tx is a count output of the time-base counter 9021, it is different from an actual time. However, there is no problem if the zero-crossing time tx is assumed to be an actual time for the sake of descriptive convenience. In the following description, the zero-crossing time tx is regarded as the actual time.

With the above operation, the D flip-flops 1709 and 1711 are set, and the one-shot pulse output from the NOR gate 1708 is output to the MCP 301 in FIG. 3 through the AND gate 1712 as the interruption signal INT. Since the one-shot pulse is active at low level, the AND gate 1712 outputs a low-active interruption signal in response to the one-shot pulse from one of circuits (not shown in FIG. 17) corresponding to the second to sixth strings other than the first string.

Upon reception of the interruption signal INT shown in FIG. 18, the MCP 301 outputs the string number read signal $\overline{\mathrm{RDNUM}}$ to the gate 1713 in FIG. 17 through a control line (not shown), as shown in FIG. 18. Thus, the gate 1713 is enabled, and the 6-bit output of the D flip-flop 1709 corresponding to the first to sixth strings is output from the gate 1713 onto the bus BUS. In FIG. 18, since a zero-crossing occurs in the digital waveform signal D1 =x(n) of the first string, the output from the D flip-flop 1709 corresponding to the first string is at logic "1", as described above. Therefore, when the MCP 301 in FIG. 3 detects this, it can confirm occurrence of a zero-crossing in the first string.

The MCP 301 outputs the time read signal $\overline{RDTIM1}$ corresponding to the first string to the D flip-flop 1711 corresponding to the first string in FIG. 17 through a control line (not shown), as shown in FIG. 18. Thus, the D flip-flop 1711 corresponding to the first string can output data from the 16-bit output terminals Q0 to Q15, and its storage content is output to the MCP 301 in FIG. 3 through the bus BUS. With this operation, the MCP 301 can fetch the zero-crossing time tx immediately after the maximum peak value ak associated with the first string shown in FIG. 18 is input, and the positive/-negative flag at logic "1" indicating that the peak value immediately before the zero-crossing time is a maximum peak value. Note that the D flip-flop 1709 corresponding to the first string is cleared at a timing at which the time read signal $\overline{RDTIM1}$ corresponding to the first string changes from logic "0" to "1", as shown in FIG. 18.

<Fetching of Negative Zero-crossing Time of First String>

A case will be described below wherein after the positive maximum peak value ak for the digital waveform signal D1 =x(n) of the first string in FIG. 18 is input, a negative minimum peak value bk is input.

When the minimum peak value detection signal MIN1 corresponding to the first string goes to logic "1" before or after the timing of the minimum peak value bk, the R-S flip-flop 1705 is cleared at a timing the signal MIN1 goes to logic "1", and its output goes to logic "0", as shown in FIG. 18.

At discrete time ny immediately after the minimum peak value bk is input, when the zero-crossing signal Z1 goes from logic "0" to "1" at a timing at which the digital waveform signal D1 =x(n) zero-crosses from the negative side to the positive side, the R-S flip-flop 1705 is set accordingly, and its output goes to logic "1", as shown in FIG. 18.

Thus, in a one-shot pulse generator constituted by the D flip-flop 1706 and the AND gate 1707, at substantially the same timing at which the output from the R-S flip-flop 1705 goes from logic "0" to "1" at the discrete time ny, the AND gate 1707 outputs a one-shot pulse of logic "1" having the same pulse width as the main clock signal MC, as shown in FIG. 18. With this operation, a zero-crossing timing can be detected.

At a timing at which the one-shot pulse from the AND gate 1707 changes from logic "0" to "1", the R-S flip-flop 1710 is reset in a manner opposite to the positive side, and its output goes to logic "0", as shown in FIG. 18. Since this output is at logic "0", the fact that a zero-crossing has occurred immediately after the minimum peak value bk, i.e., the negative peak value is input is stored as the positive/negative flag.

The one-shot pulse from the AND gate 1707 is inverted by the NOR gate 1708. At a timing at which the one-shot pulse changes from logic "0" to "1", the D flip-flop 1709 is operated in the same manner as for the positive side, and its output goes to logic "1". Since this output is at logic "1", the fact that a zero-crossing has occurred immediately after the peak value is input in the first string is stored.

Simultaneously with the above-mentioned timing, the D flip-flop 1711 is also operated, and the positive/ negative flag at logic "0" set in the R-S flip-flop 1710 immediately therebefore is set through the 0th-bit input terminal D0. The count output of the time-base counter 9021 at that time, i.e., at the zero-crossing timing is set through the 1st- to 15th-bit input terminals D1 to D15. More specifically, the D flip-flop 1711 stores a zero-crossing time ty (almost equal to discrete time ny) immediately after the minimum peak value bk is input and the positive/negative flag at logic "0" indicating that the peak value immediately before the zero-crossing time is a minimum peak value.

With the above operation, the D flip-flops 1709 and 1711 are set, and the one-shot pulse output from the NOR gate 1708 is output to the MCP 301 in FIG. 3 through the AND gate 1712 as the interruption signal INT.

Upon reception of the interruption signal INT, the MCP 301 outputs the string number read signal $\overline{RDNUM}$ to the gate 1713 in FIG. 17 through a control line (not shown), as shown in FIG. 18, in the same manner as for the positive side. Thus, the gate 1713 is enabled, and the 6-bit output of the D flip-flop 1709 corresponding to the first to sixth strings is output from the gate 1713 onto the bus BUS. Therefore, when the MCP 301 in FIG. 3 detects this, it can confirm occurrence of another zero-crossing in the first string.

The MCP 301 outputs the time read signal $\overline{RDTIM1}$ corresponding to the first string to the D flip-flop 1711 corresponding to the first string in FIG. 17 through a control line (not shown), as shown in FIG. 18. Thus, the D flip-flop 1711 corresponding to the first string can output data from the 16-bit output terminals Q0 to Q15, and its storage content is output to the MCP 301 in FIG. 3 through the bus BUS. With this operation, the MCP 301 can fetch the zero-crossing time ty immediately after the minimum peak value bk associated with the first string shown in FIG. 18 is input, and the positive/-negative flag at logic "0" indicating that the peak value immediately before the zero-crossing time is a minimum peak value. The D flip-flop 1709 corresponding to the first string is cleared at a timing at which the time read signal $\overline{RDTIM1}$ corresponding to the first string changes from logic "0" to "1", as shown in FIG. 18.

Zero-crossing times tz (corresponding to discrete time nz) and tw (corresponding to discrete time nw) immediately after the maximum peak value a(k+1) and the minimum peak value b(k+1) in FIG. 18 are input, and the corresponding positive/negative flags can be similarly output to the MCP 301 in FIG. 3.

Peaks of hatched portions in FIG. 18 correspond to those of harmonic overtones, and in this case, the zero-crossing signal Z1 changes. However, the peak detector 901 in FIG. 9 or 10 does not perform peak detection, as described above (FIG. 13). Therefore, since the maximum peak value detection signal MAX1 and the minimum peak value detection signal MIN1 are not changed, the states of the R-S flip-flops 1702 and 1705 are not changed, and zero-crossing times of these portions will not be erroneously detected.

<Processing of Other Strings>

The processing for the time-divisional signal x(n) of the digital waveform signal D1 corresponding to the first string has been described For the remaining second to sixth strings, corresponding circuits (not shown in FIG. 17) are operated on the basis of the zero-crossing signals Z2 to Z6 from the pitch extraction analog section 303 in FIG. 3 or 5, the maximum peak value detection signals MAX2 to MAX6 and the minimum peak value detection signals MIN2 to MIN6 from the peak detector 901 in FIG. 9 or 10, and time read signals $\overline{\text{RDTIM2}}$ to $\overline{\text{RDTIM6}}$ from the MCP 301 in FIG. 3. Thus, these circuits can output zero-crossing time and positive/negative flags to the MCP 301 in the same manner as for the first string.

In this case, in FIG. 17, if generation of zero-crossings in a plurality of strings is simultaneously detected when the MCP 301 fetches the outputs from the D flip-flops 1709 in units of strings from the gate 1713, the MCP 301 controls to sequentially output (not to simultaneously output) the time read signals $\overline{\text{RDTIM1}}$ to $\overline{\text{RDTIM6}}$ of the corresponding strings, so that data collision on the bus BUS can be avoided.

(Description of Peak Value Fetching Circuit)

The peak value fetching circuit 903 in FIG. 9 constituting the pitch extraction digital section 304 in FIG. 3 will now be described.

<<General Description>>

In this embodiment, as has been described in the section "General Operation of Electronic Musical Instrument of This Embodiment" with reference to FIG. 4, the peak values $a_0$ to $a_3$ or $b_0$ to $b_3$ (FIG. 4) are extracted for the digital waveform signal D1 in units of strings, and are supplied to the MCP 301 in FIG. 3. The MCP 301 uses these data in controlling fetching of the pitch periods $T_0$ to $T_5$ (FIG. 4) in units of strings in accordance with an operation to be described later. As will be described later, the MCP 301 often requires an instantaneous value of the digital waveform signal D1 for a given string.

Figure 19:
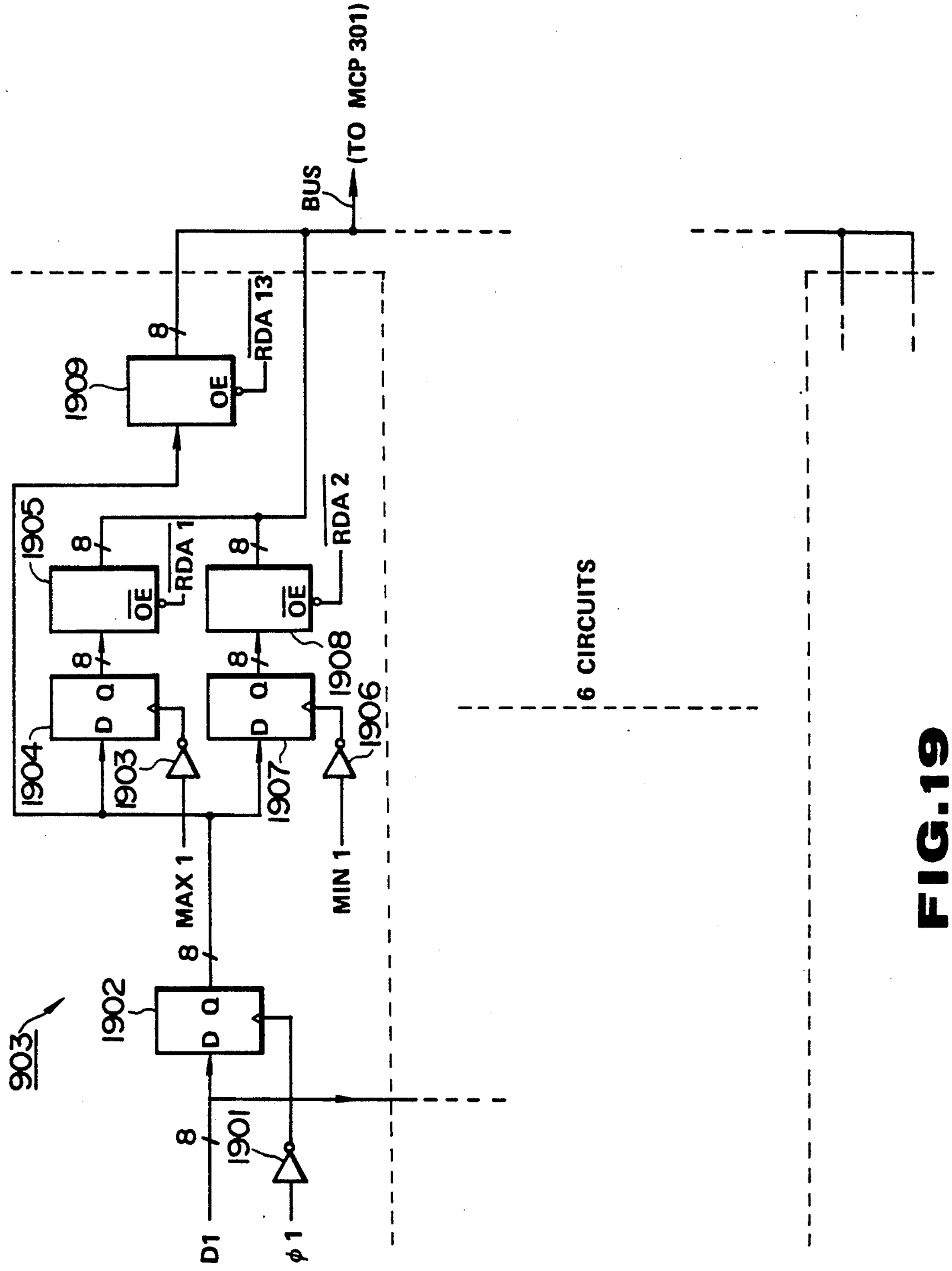
FIG. 19 is a circuit diagram showing in detail a peak value fetching circuit.

The peak value fetching circuit 903 in FIG. 9 or 19 fetches the maximum or minimum peak values and instantaneous value of the digital waveform signal D1 from the pitch extraction analog section 303 in FIG. 3 or 5 in units of strings on the basis of the maximum peak value detection signals MAX1 to MAX6 and the minimum peak value detection signals MIN1 to MIN6 corresponding to the strings output from the peak detector 901 in FIG. 9 or 10, and the sequential pulses $\phi 1$ to $\phi 6$ from the timing generator 905 in FIG. 9. The circuit 903 then outputs the fetched data to the MCP 301 in FIG. 3.

<<Arrangement>>

FIG. 19 is a detailed circuit diagram of the peak value fetching circuit 903 in FIG. 9. FIG. 19 illustrates only one circuit portion corresponding to the first string. However, in practice, a total of six circuits the same as that shown in FIG. 19 are arranged.

The 8-bit digital waveform signal D1 from the pitch extraction analog section 303 in FIG. 3 or 5 is input to the D input terminal of an 8-input/8-output type D flip-flop 1902. At a timing the sequential pulse $\phi 1$ input from the timing generator 905 in FIG. 9 through an inverter 1901 goes from logic "1" to "0", a time-divisional signal corresponding to the first string is fetched in the flip-flop.

An 8-bit output from the Q output terminal of the D flip-flop 1902 is input to the D input terminals of 8-input/8-output type D flip-flops 1904 and 1907, and also input to an 8-input/8-output type gate 1909. The OE (output enable) terminal of this gate 1909 receives a waveform read signal $\overline{\text{RDA13}}$ from the MCP 301 in FIG. 3 through a control line (not shown). The gate 1909 outputs an instantaneous value for the first string component of the digital waveform signal D1 to the MCP 301 through the bus BUS in synchronism with the processing of the MCP 301.

The 8-input/8-output type D flip-flops 1904 and 1907 for fetching the 8-bit output corresponding to the first string from the D flip-flop 1902 at the maximum or minimum peak timing are operated at a timing at which the maximum peak value detection signal MAX1 or the minimum peak value detection signal MIN1 input from the peak detector 901 in FIG. 9 or 10 through an inverter 1903 or 1906 goes from logic "1" to "0".

Eight-bit outputs from the Q output terminals of the D flip-flops 1904 and 1907 are input to 8-input/8-output type gates 1905 and 1908, respectively. The OE (output enable) terminals of these gates 1905 and 1908 receive waveform read signals $\overline{\text{RDA1}}$ and $\overline{\text{RDA2}}$ from the MCP 301 in FIG. 3 through a control line (not shown), and the maximum or minimum peak value from the gate 1905 or 1908 is output to the MCP 301 through the bus BUS.

Circuits corresponding to the second to sixth strings (not shown in FIG. 19) receive the pulses $\phi 2$ to $\phi 6$ and signals MAX2 to MAX6 and MIN2 to MIN6 in place of the pulse $\phi 1$ and the signals MAX1 and MIN1 in FIG. 19, receive signals $\overline{\text{RDA3}}$, $\overline{\text{RDA5}}$, $\overline{\text{RDA7}}$, $\overline{\text{RDA9}}$, and $\overline{\text{RDA11}}$ and signals $\overline{\text{RDA4}}$, $\overline{\text{RDA6}}$, $\overline{\text{RDA8}}$, $\overline{\text{RDA10}}$, and $\overline{\text{RDA12}}$ in place of the signals $\overline{\text{RDA1}}$ and $\overline{\text{RDA2}}$, and receive signals $\overline{\text{RDA14}}$ to $\overline{\text{RDA18}}$ in place of the signal $\overline{\text{RDA13}}$.

<<Operation>>

The operation of the peak value fetching circuit 903 in FIG. 9 or 19 with the above arrangement will now be described.

In the digital waveform signal D1 output from the A/D converter 533 (FIG. 5) in the pitch extraction analog section 303 in FIG. 3, as already shown in FIG. 6 or 11, the waveform signals W1 to W6 for six strings (FIG. 5) converted to digital data synchronously when the six kinds of sequential pulses $\phi 1$ to $\phi 6$ synchronous with the A/D conversion clock signal ADCK go to logic "1" are time-divisionally multiplexed. In this case, time-divisional signals are delayed by a delay time corresponding to the conversion time $\Delta t$ of the A/D converter 533 (FIG. 5) with respect to the sequential pulses $\phi 1$ to $\phi 6$.

<Fetching of Maximum Peak Value corresponding to First String>

When the D flip-flop 1902 in FIG. 19 is operated at a timing at which the sequential pulse $\phi 1$ input through the inverter 1901 goes from logic "1" to "0" according to the above relationship, this circuit fetches the time-divisional signal value corresponding to the first string of the digital waveform signal D1, as can be seen from FIG. 11.

The maximum peak value detection signal MAX1 corresponding to the first string input from the peak detector 901 in FIG. 9 or 10 changes from logic "0" to "1" or "1" to "0" at a timing at which the timing signal Q5 goes from logic "Q" to "1" at the end of the first half portion in a period wherein the sequential pulse $\phi 1$ goes to logic "1", as already shown in FIG. 11.

Therefore, when the D flip-flop 1904 in FIG. 19 is operated at a timing at which the maximum peak value detection signal MAX1 corresponding to the first string input through the inverter 1903 goes from logic "1" to "0", this circuit fetches the time-divisional signal value set in the D flip-flop 1902 at an immediately preceding timing at which the sequential pulse $\phi 1$ goes from logic "1" to "0", i.e., the time-divisional signal value one discrete time before.

The timing at which the maximum peak value detection signal MAX1 corresponding to the first string goes from logic "1" to "0" is one discrete time after the maximum peak value of the first string ($a_0$, $a_1$, or the like in FIG. 12) is input, as already shown in FIG. 12. For this reason, the time-divisional signal value corresponding to the first string fetched in the D flip-flop 1904 coincides with the maximum peak value of the first string.

As has been described above, at a timing at which the waveform zero-crosses immediately after the maximum peak value for the time-divisional signal of the first string is input, the interruption signal INT shown in FIG. 18 is output from the NOR gate 1708 (FIG. 17) in the zero-crossing time fetching circuit 902 in FIG. 9 to the MCP 301 in FIG. 3. The MCP 301 supplies the string number read signal $\overline{\text{RDNUM}}$ and then the time read signal $\overline{\text{RDTIM1}}$ corresponding to the first string to the zero-crossing time fetching circuit 902 in FIG. 17, as shown in FIG. 18. As a result, the MCP 301 can fetch the zero-crossing time immediately after the maximum peak value associated with the first string is input and the positive/negative flag at logic "1" indicating that the peak value immediately before the zero-crossing time is a maximum peak value.

Therefore, since the MCP 301 in FIG. 3 can determine with the above operation that the maximum peak value of the first string is input, it can supply the waveform read signal $\overline{\text{RDA1}}$ to the gate 1905 corresponding to the maximum peak value of the first string. Thus, the gate 1905 is enabled, and the maximum peak value read in the D flip-flop 1904 by the above operation is fetched in the MCP 301 in FIG. 3 through the bus BUS.

<Fetching of Minimum Peak Value corresponding to First String>

The minimum peak value detection signal MIN1 corresponding to the first string input from the peak detector 901 in FIG. 9 or 10 changes from logic "0" to "1" or "1" to "0" at a timing at which the timing signal Q5 goes from logic "0" to "1" at the end of the second half portion in a period wherein the sequential pulse $\phi 1$ goes to logic "1", as already shown in FIG. 11.

Therefore, when the D flip-flop 1907 in FIG. 19 is operated at a timing at which the minimum peak value detection signal MIN1 corresponding to the first string input through the inverter 1906 goes from logic "1" to "0", this circuit fetches the time-divisional signal value set in the D flip-flop 1902 at an immediately preceding timing at which the sequential pulse $\phi 1$ goes from logic "1" to "0", i.e., the time-divisional signal value one discrete time before, in the same manner as for the maximum peak value.

The timing at which the minimum peak value detection signal MIN1 corresponding to the first string goes from logic "1" to "0" is one discrete time after the minimum peak value of the first string ($b_0$, $b_1$, or the like in FIG. 12) is input, as already shown in FIG. 12, in the same manner as for the maximum peak value detection signal MAX1. For this reason, the time-divisional signal value corresponding to the first string fetched in the D flip-flop 1907 coincides with the minimum peak value of the first string.

As has been described above, at a timing at which the waveform zero-crosses immediately after the minimum peak value for the time-divisional signal of the first string is input, the MCP 301 shown in FIG. 3 can fetch the zero-crossing time immediately after the minimum peak value associated with the first string is input and the positive/negative flag at logic "0" indicating that the peak value immediately before the zero-crossing time is a minimum peak value like in the case wherein the maximum peak value is input.

Therefore, since the MCP 301 in FIG. 3 can determine with the above operation that the minimum peak value of the first string is input, it can supply the waveform read signal $\overline{\text{RDA2}}$ to the gate 1908 corresponding to the minimum peak value of the first string. Thus, the gate 1908 is enabled, and the minimum peak value read in the D flip-flop 1907 by the above operation is fetched in the MCP 301 in FIG. 3 through the bus BUS.

<Fetching of Instantaneous Value corresponding to First String>

The peak value fetching circuit shown in FIG. 9 or 19 can output a maximum or minimum peak value corresponding to the first string, and can output an instantaneous value of the time-divisional signal corresponding to the first string of the digital waveform signal D1 at a requested timing in response to a request from the MCP 301.

More specifically, when the MCP 301 in FIG. 3 requires an instantaneous value of the first string during musical tone control (to be described later) (refer to the step M11 in FIG. 21), it supplies the waveform read signal $\overline{\text{RDA13}}$ to the gate 1909 in FIG. 19. Thus, the gate 1909 is enabled, and at that timing, the instantaneous value of the first string already read in the D flip-flop 1902 is fetched in the MCP 301 in FIG. 3 through the bus BUS.

<Processing of Other Strings>

The processing of the time-divisional signal corresponding to the first string of the digital waveform signal D1 has been described. For the remaining second to sixth strings, corresponding circuits (not shown in FIG. 19) are operated on the basis of the sequential pulses $\phi 2$ to $\phi 6$ from the timing generator 905 in FIG. 9, the maximum peak value detection signals MAX2 to MAX6 and minimum peak value detection signals MIN2 to MIN6 from the peak detector 901 in FIG. 9 or 10, and the waveform read signals $\overline{\text{RDA3}}$ to $\overline{\text{RDA12}}$ and $\overline{\text{RDA14}}$ to $\overline{\text{RDA18}}$ from the MCP 301 in FIG. 3. Thus, these circuits can output the maximum peak value, minimum peak value, or instantaneous value to the MCP 301 in FIG. 3 in the same manner as for the first string.

In this case, since the bus BUS is commonly used by the six strings, the MCP 301 controls not to simultaneously output the waveform read signals $\overline{\text{RDA1}}$ to $\overline{\text{RDA18}}$, so that data collision on the bus BUS can be avoided.

{Operation of Main Control Processor (MCP)}

With the above operation, the pitch extraction digital section 304 in FIG. 3 or 9 inputs the maximum or minimum peak value, zero-crossing time, and positive/negative flag indicating the positive or negative peak value to the MCP 301 in FIG. 3.

As briefly described in the section "General Operation of Electronic Stringed Instrument of This Embodiment", the MCP performs fret scan processing of the fret No. detection section 302 to perform note-ON processing, and then performs pitch extraction and extraction of parameters associated with a tone volume, and the like. Thus, the MCP 301 generates musical tone control data for controlling the musical tone generator 305 in FIG. 3. Note that the MCP 301 executes the operation flow charts shown in FIGS. 20 to 26 in accordance with the programs stored in a memory (not shown), as will be described in detail later.

(Description of Variables)

Variables used in the control programs shown in the operation flow charts of FIGS. 20 to 26 (to be described later) will be described below.

AD . . . input amplitude value (instantaneous value) obtained by directly reading the input waveform D1 to the pitch extraction digital circuit 304 in FIG. 3

AMP(0,1) . . . positive or negative old peak value

AMRL1 . . . old amplitude value (peak value) stored in an amplitude register and used for a "relative-off" check. The "relative-off" operation means muting operation on the basis of immediate attenuation of the peak value, and corresponds to muting processing when a fret operation is finished, thereby becoming an open string status.

AMRL2 . . . amplitude value (peak value) before the old amplitude value stored in the amplitude register and used for the relative off operation. The value AMRL1 is input as this value.

CHTIM . . . period corresponding to a highest tone fret (22nd fret in this embodiment)

CHTIO . . . period corresponding to an open string fret

CHTRR . . . time constant conversion register 1501 (FIG. 15) arranged in the time constant conversion controller 904 (FIG. 9)

DUB . . . flag indicating that waveforms in the same direction (positive/negative direction) are successively input FOFR . . . relative-off counter HNC . . . waveform number counter MT . . . flag (positive =1, negative =0) indicating a side for which pitch extraction is to be performed NCHLV . . . no change level (constant)

OFTIM . . . off time (corresponding to an open string period of the corresponding string)

OFPT . . . normally off check start flag

ONF . . . note-on flag

RIV . . . flag for switching a processing route in STEP 4 (to be described later)

ROFCT . . . constant for determining the number of times of relative-off check

STEP . . . register (taking a value between 0 to 4 or 5) for designating a flow operation of the MCP 301

TF . . . valid old zero-cross time data

TFN(0,1) . . . old zero-cross time data immediately after a positive or negative peak value TFR . . . time storing register THLIM . . . upper limit frequency (constant)

TLLIM . . . lower limit frequency (constant)

TP(0,1) . . . positive or negative old period data

TRLAB(0,1) . . . positive or negative absolute trigger level (note-on threshold value)

TRLRL . . . threshold value for relative-on operation (restart of tone generation)

TRLRS . . . resonance removal threshold value

TTLIM . . . lower limit frequency upon triggering

TTP . . . previously extracted period data

TTR . . period register

TTU . . . constant (product of 17/32 and present period data tt)

TTW . . . constant (product of 31/16 and present period data tt)

X . . . flag indicating an abnormal or normal state b . . . present positive/negative flag stored in a working register B (1 for the next zero point of a positive peak; 0 for the next zero point a negative peak)

c . . . present peak value stored in a working register C e . . . peak value before the old peak value, stored in a working register E h . . . period data extracted in a period before the immediately preceding period, which is stored in a working register H t . . . present zero-cross time stored in a working register T0 tt . . . present period data stored in a working register TOTO (Operation of Interruption Processing Routine)

Figure 20:
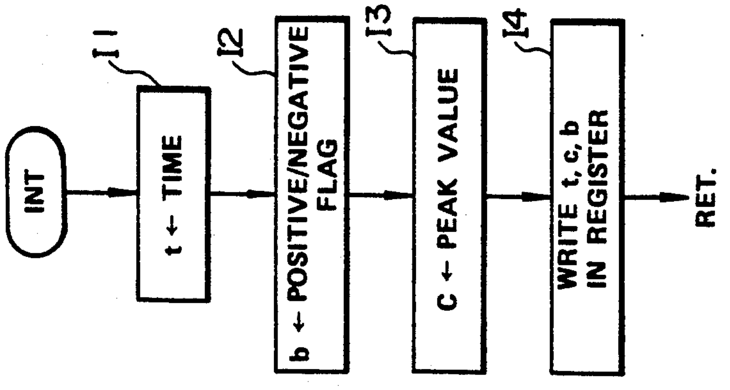
FIG. 20 is an operation flow chart of an interruption processing routine.

FIG. 20 is an operation flow chart of an interruption processing routine showing a processing to be executed when an interruption is performed in response to the interruption signal INT from the zero-cross time fetching circuit 902 (FIGS. 9 or 17) in the pitch extraction digital circuit 304.

As described above, when the interruption signal INT is output from the zero-cross time fetching circuit 902, the peak value fetching circuit 903 in FIGS. 9 or 17 holds the maximum or minimum peak value (absolute value), and the zero-cross time fetching circuit 902 latches the zero-cross time immediately after the corresponding peak value is generated and the positive/negative flag indicating "1" when the immediately preceding peak value is the maximum (positive) peak value and "0" when it is the minimum (negative) peak value.

In step I1 in FIG. 20, the MCP 301 outputs a string number read signal $\overline{\text{RDNUM}}$ to the fetching circuit 902, and causes the zero-cross time fetching circuit 902 in FIGS. 9 or 17 to output the string number read signal $\overline{\text{RDNUM}}$. The circuit 902 thus outputs, to the MCP 301 through the bus BUS, the string number data indicating a string number for which the interruption occurs. Subsequently, the MCP 301 outputs to the zero-cross time fetching circuit 902 a signal corresponding to the string number of the time read signals $\overline{\text{RDTIM1}}$ to $\overline{\text{RDTIM6}}$. The circuit 902 outputs, to the MCP 301 through the bus BUS, zero-cross time data set in a latch (similar to the D flip-flop 1711 in FIG. 17) corresponding to the string number by the output time read signal $\overline{\text{RDTIMi}}$ (i =1 to 6). This time data is set as the present zero-cross time t, as shown in step I1 in FIG. 20.

In step I2 in FIG. 20, the positive/negative flag (see FIG. 17) added to the LSB of the zero-cross time data is extracted, and is set as the present positive/ negative flag b.

Thereafter, in step I3 in FIG. 20, the MCP 301 causes the peak value fetching circuit 903 in FIGS. 9 or 19 to output a peak value read signal $\overline{\text{RDAj}}$ (j =1 to 12) in the same manner as described above. Note that since the circuit 903 includes 12 latches (not shown) for holding maximum and minimum peak values for the six strings, the MCP 301 causes to selectively output the peak peak value read signal $\overline{RDAj}$ on the basis of the string number and the positive/negative flag b. Thus, the maximum or minimum peak value (absolute value) set in the latch designated by the peak value read signal $\overline{RDAj}$ is output from the circuit 903 to the MCP 301 through the bus BUS. This peak value is set as the present peak value c, as shown in step I3 in FIG. 20.

After the above operations, in step I4 in FIG. 20, the values t, c, and b obtained as described above are set in registers T0, C, and B (not shown). Every time the interruption processing is executed, a set of the zero-cross time data, the peak value data (absolute value), and the positive/negative flag data is set in these registers. In a main routine (to be described later), processing for data associated with each string is performed.

The registers T0, C, and B are arranged six each in correspondence with the six strings. Musical tone control processing to be described with reference to FIGS. 21 to 26 is time-divisionally performed for the six strings, but will be described for one string for the sake of descriptive convenience.

(Operation of Main Routine)

Figure 21:
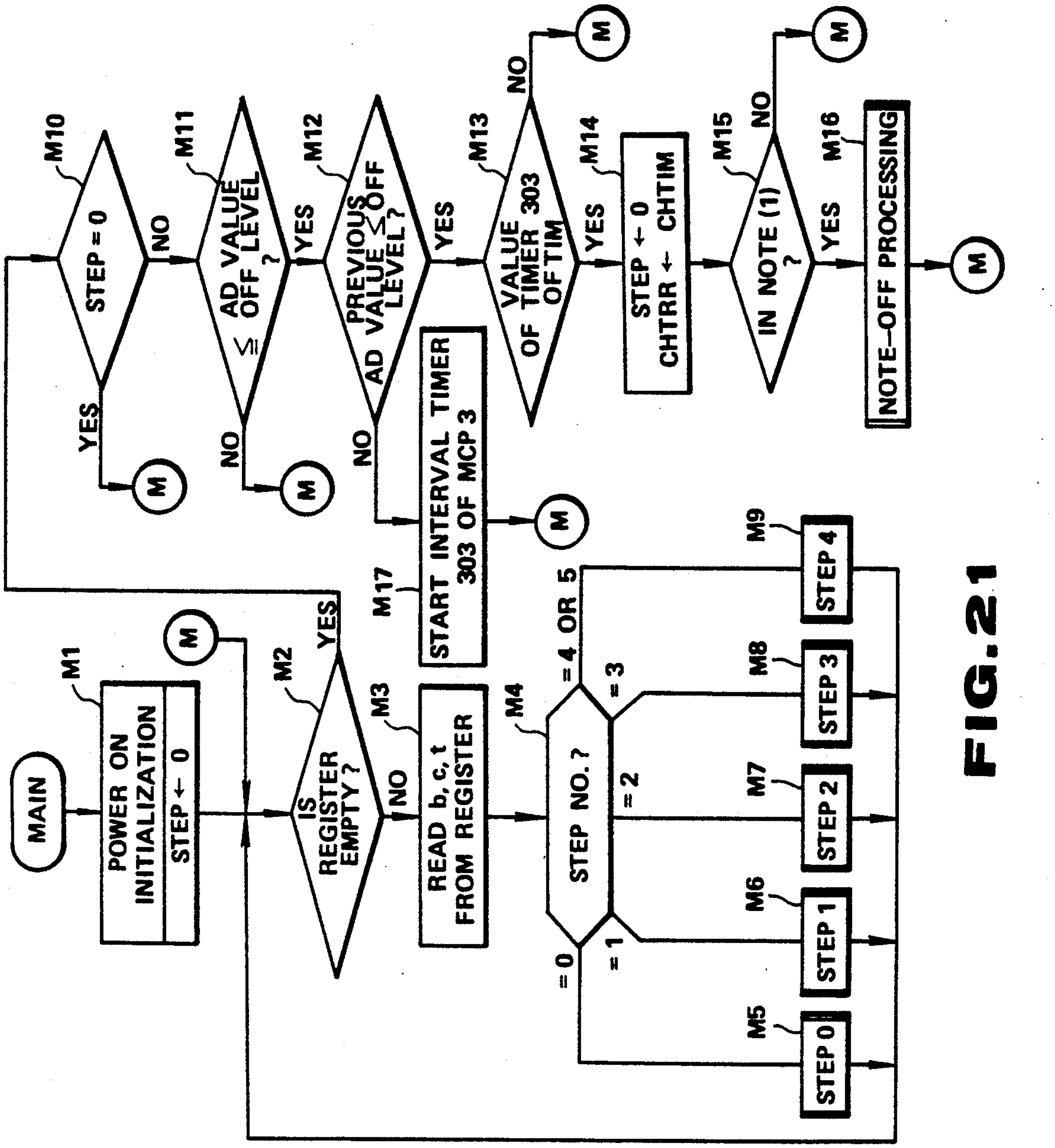
FIG. 21 is an operation flow chart of a main routine.

FIG. 21 is an operation flow chart showing main routine processing. In this routine, initialization after power-on, note-off (muting) processing of a musical tone, and selection processing of operations of STEP 0 to STEP 4 (or 5) are performed in step Ml. In this embodiment, as will be described later, musical tone control processing is performed according to the processing concept named "STEP", that is, musical tone control is performed in the order of STEP 0→STEP 1→STEP 2→STEP 3→STEP 4 (→STEP 5)→STEP 0, as will be described later.

<Basic Operation>

In FIG. 21, when a power switch is turned on, various registers and flags are initialized in step M1, and the register STEP is set to be "0". In this case, as has been described in the description of the time constant conversion controller 904 (FIGS. 9 or 19) in Section "Operation of Pitch Extraction Digital Circuit", the MCP 301 sets the highest tone fret period CHTIM in the time constant conversion register CHTRR in the time constant conversion controller 904 through the bus BUS, so that the peak detector 901 (FIG. 9) can quickly detect a vibration at the leading edge of the waveform of the digital output D1. Thus, control is performed so that the threshold level signal generated from the peak detector 901 is immediately attenuated in the highest tone period time (refer to the description of FIG. 16).

Subsequently, in step M2 in FIG. 21, it is checked if the register described in Section "Operation of Interruption Processing Routine" is empty. If NO in step M2, the flow advances to step M3, and the contents of the registers B, C, and T0 are read. In step M4, the value of the register STEP is checked. Processing operations of STEP 0, STEP 1, STEP 2, STEP 3, and STEP 4 are sequentially executed in steps M5, M6, M7, M8, and M9. Note that updating to the next STEP is performed in the processing of STEP 0 to STEP 4, as will be described later.

<Note-Off Operation>

If it is determined in step M2 that the register is empty, i.e., YES in step M2, the control advances to processing in steps M10 to M16. In these steps, normal note-off algorithm processing is performed. In this note-off algorithm, if a state wherein the peak value of the digital output D1 is equal to or smaller than an OFF level is continued for a predetermined off time, a note-off operation is performed.

It is checked in step M10 if STEP =0. If YES in step M10, the note-off operation need not be performed since an initial state wherein no musical tone is generated is detected. Thus, the flow returns to step M2. If NO in step M10, the flow advances to step M11.

In step M11, the input peak value (instantaneous value) AD of the digital output D1 at that time is directly read. This can be achieved as follows. The MCP 301 supplies one of the peak value read signals $\overline{RDA13}$ to $\overline{RDA18}$ to the peak value fetching circuit 903 (FIGS. 9 or 19), so that the circuit 903 outputs the present instantaneous value of the digital output D1 to the MCP 301 through the bus BUS. It is then checked if this value AD is equal to or smaller than a preset OFF level. If NO in step M11, the flow returns to step M2 since the note-off operation need not be performed. However, if YES in step M11, the flow advances to step M12.

It is checked in step M12 if the old input peak value AD is equal to or smaller than the OFF level. If NO in step M12, the flow advances to step M17, and the timer (not shown) in the MCP 301 is started. The flow then returns to step M2. When the control comes again to this processing, since YES is obtained in step M12, the flow advances to step M13 to check if the value of the timer is equal to the off time OFTIM. As the off time OFTIM, the open string fret period CHTIO of a string subjected to processing is set. If NO in step M13, the flow returns to step M2 to repeat the above-mentioned processing. If YES in step M13, the flow advances to step M14, and data "0" is written in the register STEP and the highest tone fret period CHTIM is set in the time constant conversion register CHTRR. Thereafter, the flow advances to step M16 via step M15 (to be described later). More specifically, when the level of the digital output D1 becomes attenuated, if the input peak value AD equal to or smaller than the OFF level is kept unchanged for a time period corresponding to the off time OFTIM, it can be determined that no digital output D1 is input and a plucking operation of a string is stopped. Thus, the flow then advances to step M16, and note-off processing is performed.

In step M16, the MCP 301 sends a note-off instruction to the musical tone generator 305 (FIG. 3), thus stopping generation of a musical tone. In this manner, when the note-off processing is performed, the flow must return to STEP 0.

In a normal state, YES is obtained in step M15. However, with processing to be described below, the register STEP may take a value other than 0 even when a generation instruction of a musical tone is not performed (caused by, e.g., a noise input). In this case, the flow returns to step M2 after the processing in steps M14 and M15, so that the register STEP can be initialized to STEP 0.

(Processing Operation in STEP 0)

Each routine branching from the main routine shown in FIG. 21 and performing the corresponding processing will be described below.

Figure 22:
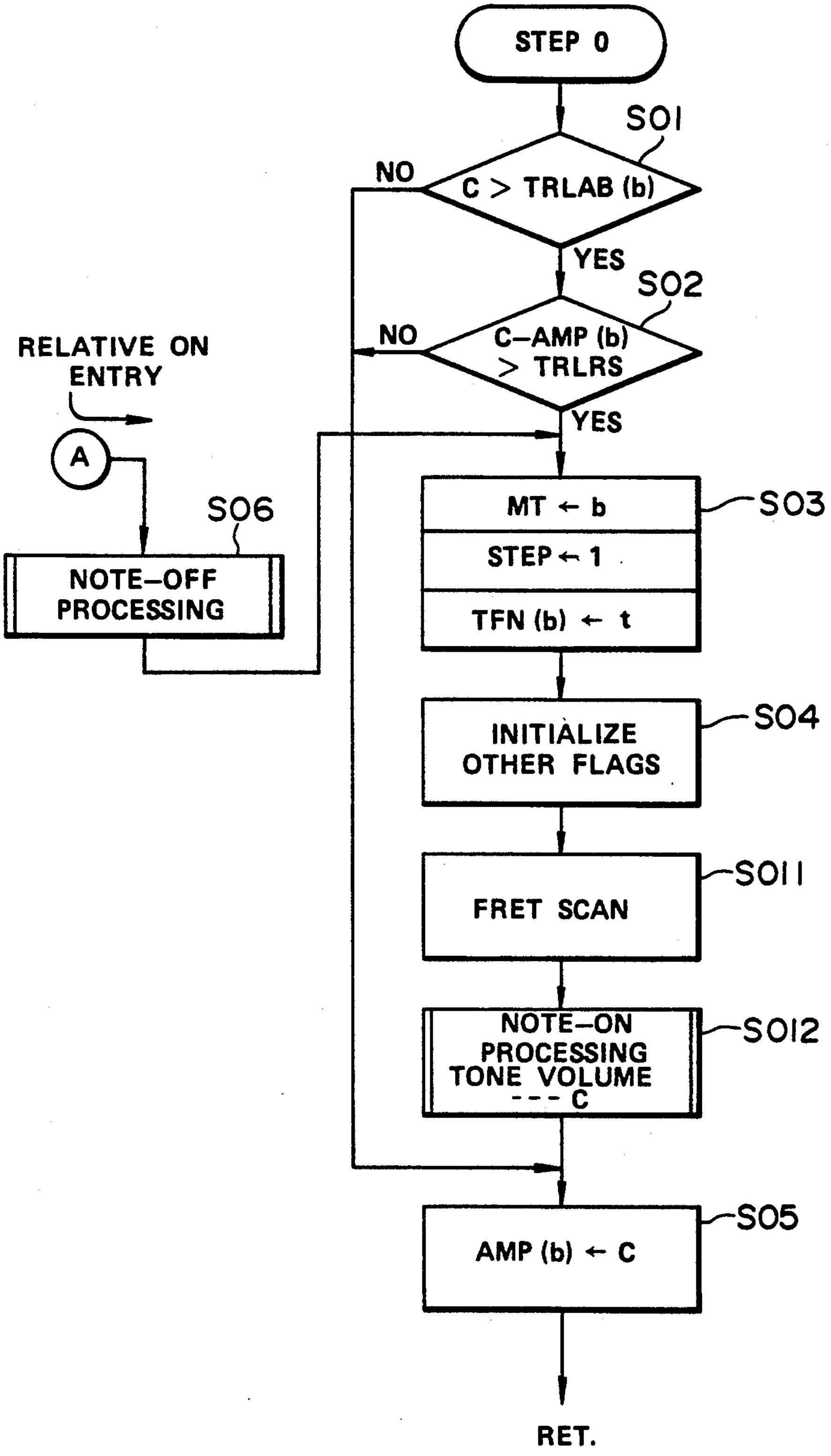
FIG. 22 is an operation flow chart of STEP 0.
Figure 27:
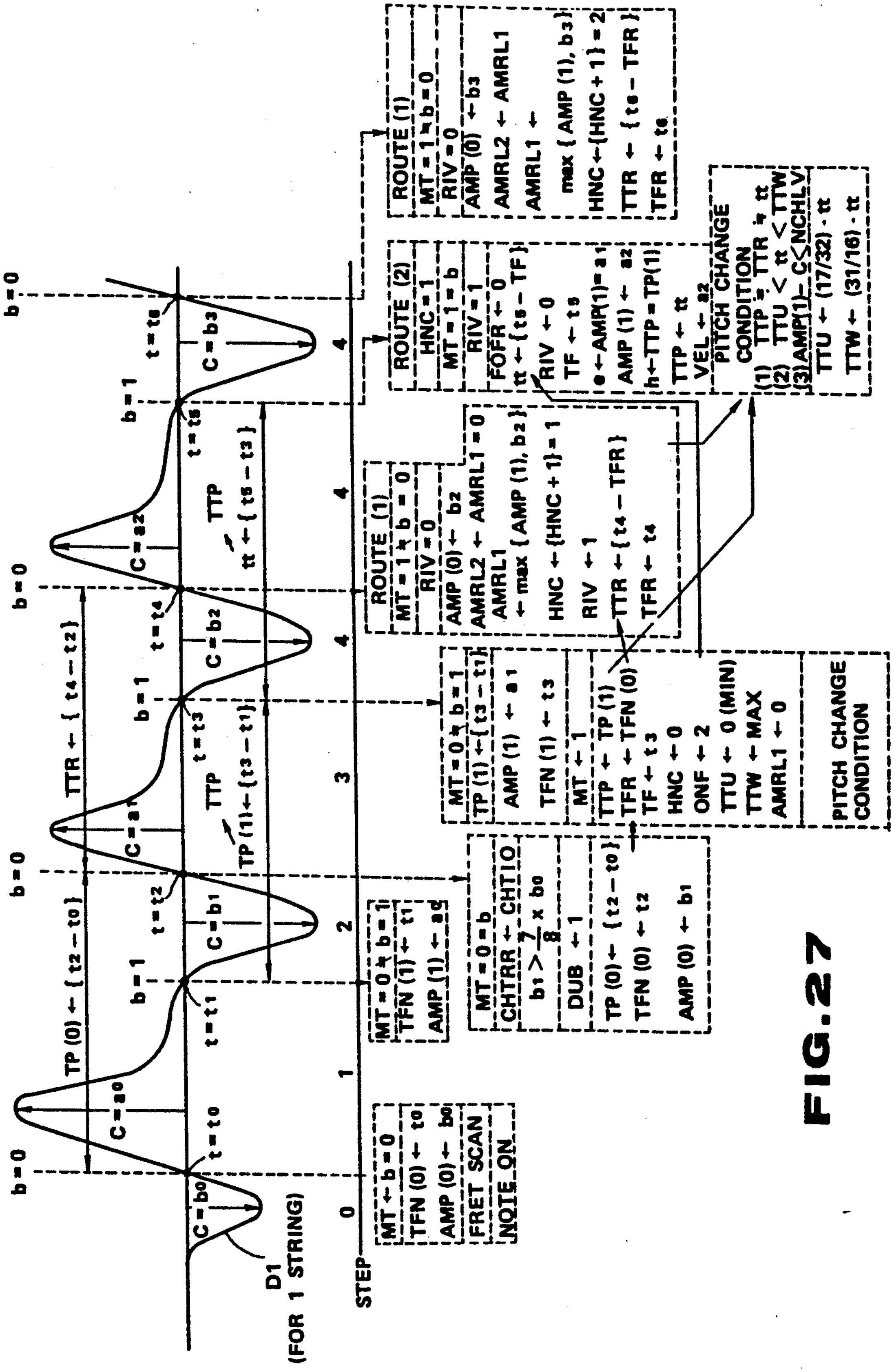
FIG. 27 is a chart for explaining a basic operation of this embodiment.

FIG. 22 is an operation flow chart of processing in STEP 0 as step M5 in the main routine shown in FIG. 21. In this processing, initialization for pitch extraction processing, and the like, and transition processing to next STEP 1 are performed. A description will be made with reference to the chart of FIG. 27 for explaining the basic operation. Note that a waveform in FIG. 27 is the same as that in FIG. 4.

<Basic Operation>

Now, the main routine shown in FIG. 21 waits for data input to the registers T0, C, and B upon interruption from the pitch extraction digital circuit 304 (FIGS. 3 or 9) by repeating the loop of steps M2 and M10, as has been described in Section "Operation of Interruption Processing Routine".

When data is input and the contents of the registers are read in step M3 via step M2 in FIG. 21, the flow advances to step M5 via step M4, i.e., the control transits to STEP 0 in FIG. 22. In this state, for example, as shown in FIG. 27, the present zero-cross time $t = t_0$, the positive/negative flag $b = 0$, and the present peak value is the minimum peak value $c = b_0$ (absolute value) since $b = 0$. Note that in FIG. 27, b and $b_0$ to $b_3$ and the like are different symbols.

It is checked in step S01 in FIG. 22 if the present peak value c is larger than the absolute trigger level (positive threshold value for note-on operation) TRLAB(b). This checking operation is executed for positive and negative polarities on the basis of the value of the present positive/negative flag b. The positive absolute trigger level TRLAB(1) and the negative absolute trigger level TRLAB(0) can be set to be different values according to an experience in consideration of a case wherein an offset is superposed on the digital output D1 (FIG. 4). In an ideal system, these trigger levels can be the same value. In FIG. 27, the present minimum peak value $c = b_0$ (absolute value) is compared with $TRLAB(b) = TRLAB(0)$, and yields $c = b_0 > TRLAB(0)$, that is, YES is obtained in step S01.

After step S02 (to be described later), processing in step S03 is executed. The present positive/negative flag b is written in a flag MT, and data "1" is written in the register STEP to prepare for transition to the next step. Furthermore, the present zero-cross time t is set as old zero-cross time data TFN(b) for the following processing. In FIG. 27, $MT = b = 0$, and $TFN(b) = TFN(0) = t = t_0$.

In step S04, flags (excluding constants) other than the flags described in the Section "Description of Variables" are initialized.

Further, in step S011, processing of fret scanning is executed. The MCP 301 determines the fact that a corresponding string has been plucked at the time when a first pair of data (b0, t0) of FIG. 27 is inputted, and delivers a scan signal of the fret switch 205 of FIG. 2 immediately to the fret number detector 302 of FIG. 3. So as to fetch the fret number data representing the depressed fret switch.

When the fret number is fetched in the above operation, a note-on processing is then executed in the next step S012 in FIG. 22. Thus, a pitch data corresponding to the obtained fret number is generated and the current peak value c is applied to the pitch data as a volume data. The resultant combined data is supplied to the tone generating circuit 305 of FIG. 3 together with a key-on data (sounding start data). Accordingly, a musical sound having the designated pitch is initiated at the tone generating circuit 305.

Since, in the present embodiment, a note-on processing can be initiated immediately after a time-division signal of the digital waveform signals corresponding to one of the strings, it is possible to provide an electronic musical instrument having a good response characteristic in which the sounding can be initiated at a very quick timing in response to the plucking operation of the string 105 of FIG. 1.

In step S05 in FIG. 22, the present peak value c is set as an old peak value AMP(b) (absolute value) for the following processing after above mentioned operation, and the flow returns to step M2 in the main routine in FIG. 21. In FIG. 27, $AMP(b) = AMP(0) = c = b_0$.

With the above processing, in FIG. 27, the present positive/negative flag $b = 0$ of the register B is written in the flag MT, the present zero-cross time data $t = t_0$ of the register T0 is written as the negative old zero-cross time data TFN(0), and the present minimum peak value $c = b_0$ of the register C is written as the negative old peak value AMP(0), as indicated between STEP 0 and STEP 1.

<Resonance Removal Operation>

Note that if it is determined in step S01 in FIG. 22 that the present peak value c is equal to or smaller than the absolute trigger level TRLAB(b), the control does not transit to the note-on processing. In this case, only the present peak value c is set as the old peak value AMP(b) in step S05, and the flow returns to the main routine shown in FIG. 21. However, when one string is plucked and another string is resonated, the vibration level of the another string is gradually increased. YES is then obtained in step S01 in FIG. 22, and the flow advances to the processing in step S02. However, in this case, since no regular plucking operation is performed, it is not proper that the control transits to the note-on operation. Thus, in the processing in step S02, the resonance is removed. More specifically, in this case, since the present peak value c is not almost increased as compared to the old peak value AMP(b), when a difference c - AMP(b) is not larger than the resonance removal threshold value TRLRS, it is determined that the resonance state occurs. Thus, the control does not transit to the note-on processing, and the present peak value c is set in the old peak value AMP(b) in step S05, and the flow returns to the main routine in FIG. 21. On the other hand, when a regular plucking operation is performed, as shown in FIG. 27, a waveform rises immediately, and the difference c - AMP(b) of the peak values exceeds the resonance removal threshold value TRLRS, and the flow advances from step S02 to step S03, as described above.

<Relative On Entry Operation>

In FIG. 22, a node A corresponds to a relative-on (tone regeneration start) entry, and the flow jumps from the flow in STEP 4 (to be described later) to step S06. In step S06, the present output musical tone is muted, and the flow advances to step S03 to start tone regeneration. Processing for starting tone regeneration is the same as that when normal tone generation is started, as described above. Note-off processing in step S06 is the same as that in step M16 in FIG. 21.

(Processing Operation in STEP 1)

Figure 23:
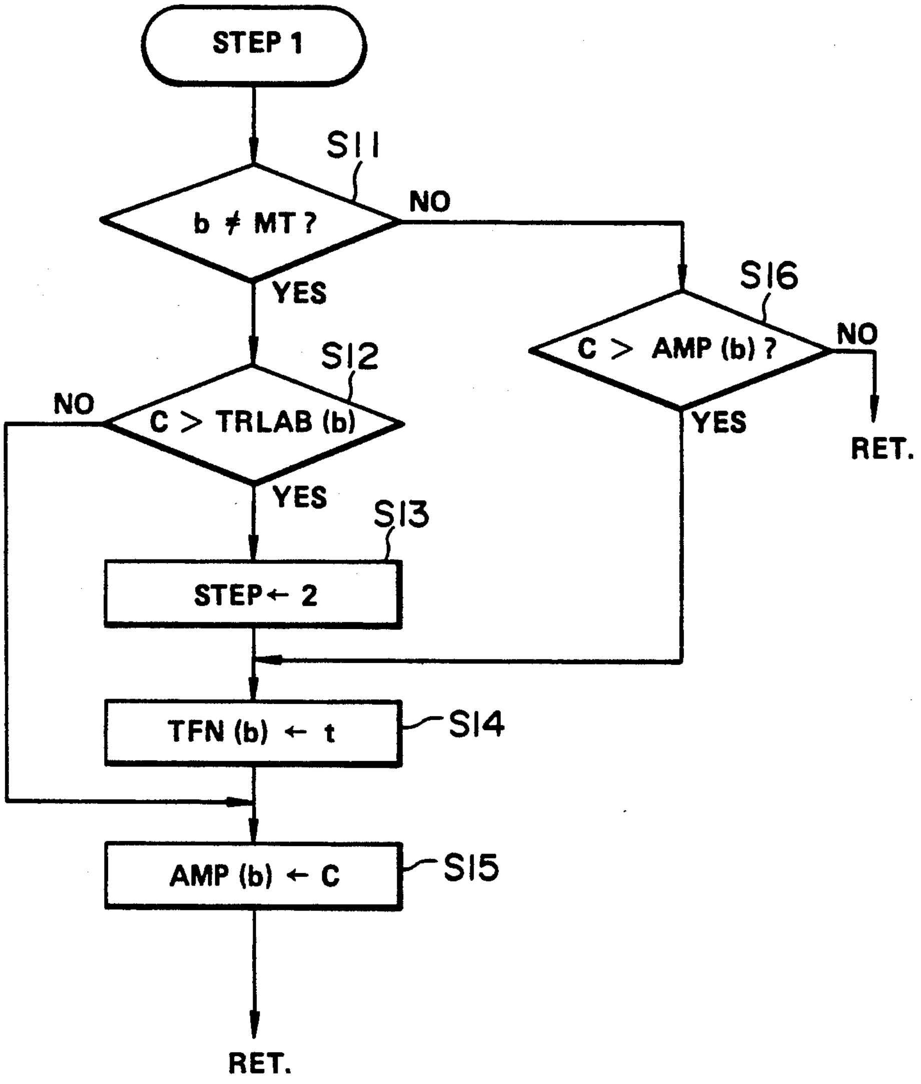
FIG. 23 is an operation flow chart of STEP 1.

FIG. 23 is an operation flow chart of processing in STEP 1 as step M6 in the main routine shown in FIG. 21. In this processing, initialization for pitch extraction processing after STEP 0, transition processing to following STEP 0 or repetition processing (error processing) when an abnormal waveform is input, and the like are performed.

<Basic Operation>

After initialization for the first data is performed in STEP 0, the main routine shown in FIG. 21 waits for data input to the registers T0, C, and B upon interruption from the pitch extraction digital circuit 304 (qigs. 3 or 9) by repeating the loop of step M2→M10→M11→M2.

When data is input and the contents of the registers are read in step M3 via step M2 in FIG. 21, the flow advances to step M6, i.e., STEP 1 in FIG. 23 via step M4. In this state, for example, as shown in FIG. 27, the present zero-cross time $t = t_1$, the present positive/negative flag $b = 1$, and the present peak value is the maximum peak value $c = a_0$ since $b = 1$.

After step S11 in FIG. 23 (to be described later), it is checked in step S12 if the present peak value c is larger than the absolute trigger level TRLAB(b), in the same manner as has been described in a description of step S01 in FIG. 22 in Section "Processing Operation in STEP 0". In FIG. 27, the present maximum peak value is compared with TRLAB(b) = TRLAB(1) and yields $c = a_0 >$ TRLAB(1), that is, YES is obtained in step S12.

In step S13, data "2" is written in the register STEP to prepare for transition to the next step. In step S14, the present zero-cross time t of the register TO is set as old zero-cross time data TFN(b) for the following processing. In step S15, the present peak value c of the register C is set as the old peak value AMP(b) for the following processing, and the flow returns to the processing in step M2 of the main routine shown in FIG. 21. In FIG. 27, TFN(1) $= t = t_1$, and AMP(1) $= c = a_0$. Note that the content of the flag MT is not rewritten and is kept to be "0".

<Operation of Repetition Processing>

When the normal digital output D1 as shown in FIG. 27 is input, after the negative (minimum)/positive (maximum) peak value (absolute value) is extracted in STEP 0, other side peak value i.e., positive (maximum/ negative (minimum) peak value is extracted in STEP 1. Therefore, in step S11 in FIG. 23, since the present positive/negative flag $b = 1$ (0) is different from the flag MT $= 0$ (1) set in STEP 0, the flow advances to step S12, as described above.

Figure 28A:
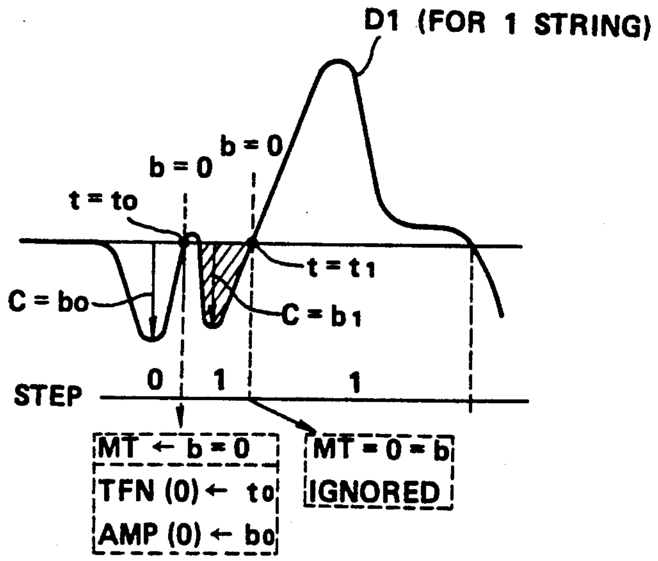
FIGS. 28A and 28B are charts for explaining repetition operation in STEP 1.
Figure 28B:
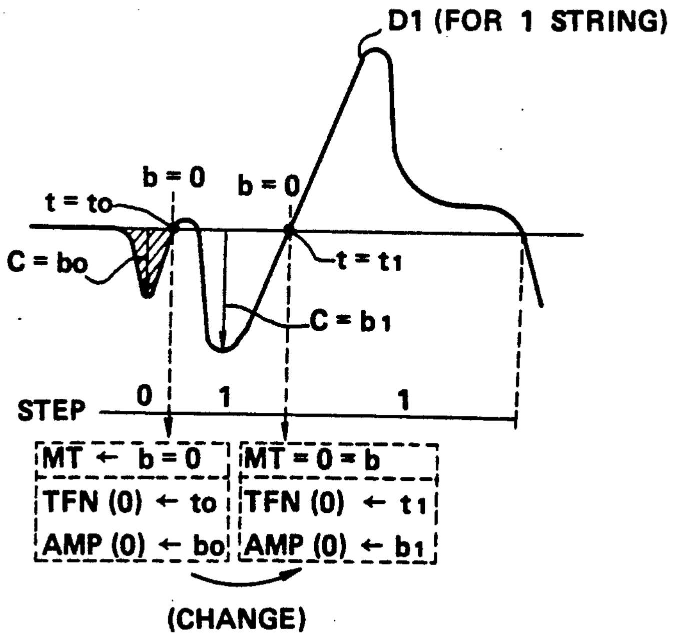

However, in some cases, a waveform shown in FIG. 28A or 28B may be input in STEP 1 after STEP 0. In this case, after the negative minimum peak value $b_0$. is extracted in STEP 0, the negative minimum peak value $b_1$ is repetitively extracted in STEP 1. Therefore, in step S11 in FIG. 23, the present positive/negative flag $b = 0$, and coincides with the flag MT $= 0$ set in STEP 0. In this case, the flow advances to step S16 in FIG. 23, and repetition processing (error processing) is executed.

It is checked in step S16 if the peak value c is larger than the old peak value AMP(b) having the same sign.

In the case of FIG. 28A, $c = b_1 >$ AMP(b) = AMP(0) $= b_0$ cannot be established. In this case, the present minimum peak value $b_1$ is ignored as an abnormal waveform (hatched portion), and the content of the register STEP is not updated. The flow returns to the processing in step M2 in the main routine shown in FIG. 21, and inputting of the next normal peak is waited for.

In the case of FIG. 28B, $c = b_1 >$ AMP(b) = AMP(0) $= b_0$ can be established. In this case, the minimum peak value $b_0$ extracted in the preceding STEP 0 is ignored as an abnormal waveform (hatched portion), and the contents of the negative old zero-cross time data TFN(0) and negative old peak value AMP(0) set in STEP 0 are updated to the present zero-cross time t and the present peak value c in steps S14 and S15 in FIG. 23. More specifically, in FIG. 28B, TFN(0) = t = t1 and AMP(0) $= c = b_1$. After the repetition processing, the content of the register STEP is not updated (without going through step S13 in FIG. 23), and the flow returns to the processing in step M2 of the main routine in FIG. 21. Thus, inputting of the next normal peak is waited for.

After the above-mentioned operation, when the normal peak value is input, the above-mentioned processing is performed in step S11→S12→S13→S14→S15 in FIG. 23, and for example, when $t = t_1$, the control transits to the next processing of STEP 2, as shown in FIG. 27.

(Processing Operation in STEP 2)

Figure 24:
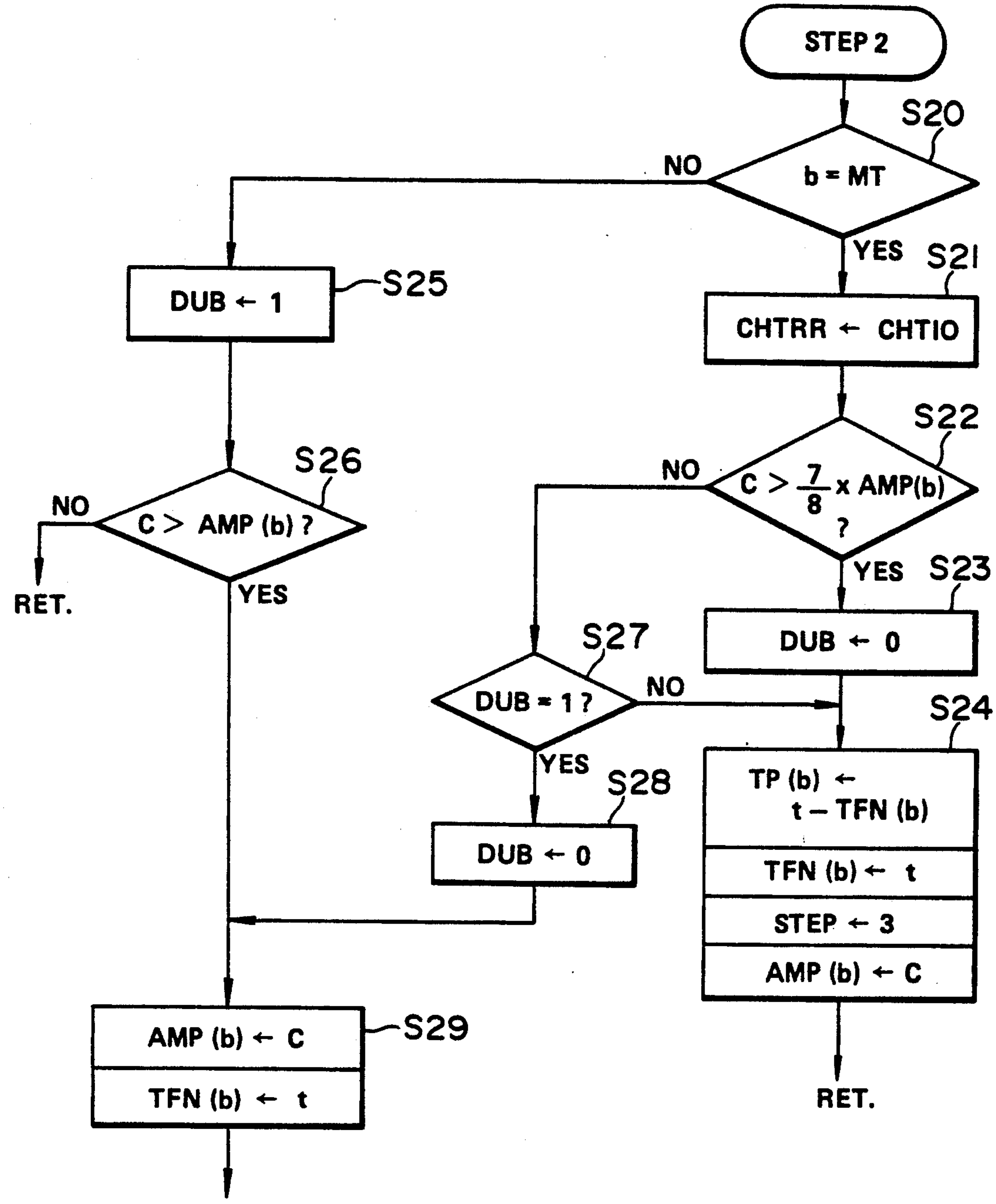
FIG. 24 is an operation flow chart of STEP 2.

FIG. 24 is an operation flow chart of the processing in STEP 2 as step M7 in the main routine of FIG. 21. In this processing, detection of a first pitch period for pitch extraction, setting of a velocity, transition processing to STEP 3 or error processing (repetition processing) when an abnormal waveform is input, and the like are executed.

<Basic Operation>

After the processing in STEP 1 is performed, the main routine shown in FIG. 21 waits for data input to the registers T0, C, and B upon interruption again from the pitch extraction digital circuit 304 (FIGS. 3 or 9) by repeating the loop of step M2→M10→M11→M2.

When data is input and the contents of the registers are read in step M3 in FIG. 21, the flow advances to step M7, i.e., STEP 2 in FIG. 24 via step M4. In this state, for example, as shown in FIG. 27, the present zero-cross time $t = t_2$, the present positive/negative flag $b = 0$, and the present peak value is the minimum peak value $c = b_1$ since $b = 0$.

After step S20 in FIG. 24 (to be described later), in step S21, the MCP 301 (in FIG. 3) sets the open string fret period CHTIO of a string, which is presently subjected to processing, in the time constant conversion register CHTRR in the time constant conversion controller 904 in FIG. 9 through the bus BUS. As has been described with reference to the time constant conversion controller 904 in Section "Operation of Pitch Extraction Digital Circuit", after the peak detector 904 (FIGS. 9 or 10) detects a vibration at the leading edge of the waveform of the digital output D1, the threshold signal generated from the peak detector 904 is immediately attenuated in the lapse of an open string period of each string, i.e., a lowest tone period CHTIO so that the detector 904 does not pick up an overtone of each pitch period.

It is checked in step S22 if the present peak value c is larger than a $\frac{3}{8}$ multiple of the old peak value AMP(b) having the same sign. As will be described later, since a waveform obtained by plucking a string is naturally attenuated, YES is obtained in step S22, and the flow advances to step S24 via step S23 (to be described later).

In step S24, {(present zero-cross time t) $-$(old zero-cross time data TFN(b) having the same sign} is calculated to detect the first pitch period. The difference is set as old period data TP(b) so as to be used as a pitch change condition in STEP 3 (to be described later). In FIG. 27, $TP(0) = t - TFN(0) = t_2 - t_0$.

In step S24, the present zero-cross time t is set as the old zero-cross time data TFN(b) for the following processing. In FIG. 27, TFN(0) $=t=t_2$. Note that TFN(0) $=t_0$ set in STEP 0 is no longer necessary and is erased since the old period data TP(b) $=$TP $=t_0$ can be calculated.

In step S24, data "3" is written in the register STEP to prepare for transition to the next step.

Furthermore, in step S24, for the following processing, the present peak value c is set as the old peak value AMP(b), and the flow returns to the processing in step M2 of the main routine shown in FIG. 21. In FIG. 27, AMP(0) $=c=b_1$. Note that AMP(0) $=b_0$ set in STEP 0 is no longer necessary and is erased.

<Operation of Repetition Processing>

When the normal digital output D1 as shown in FIG. 27 is input, after the positive (maximum)/negative (minimum) peak value is extracted in STEP 1, the other peak value i.e., negative (minimum)/positive (maximum) peak value is extracted in STEP 2. Therefore, in this case, the sign of the peak value in STEP 2 is opposite to that in STEP 1, and is the same as that in STEP 0. In step S20 in FIG. 24, the present positive/negative flag b $=0$ (1) coincides with the flag MT $=1$ (0) set in STEP 0, and the flow advances to step S21, as described above.

Figure 29A:
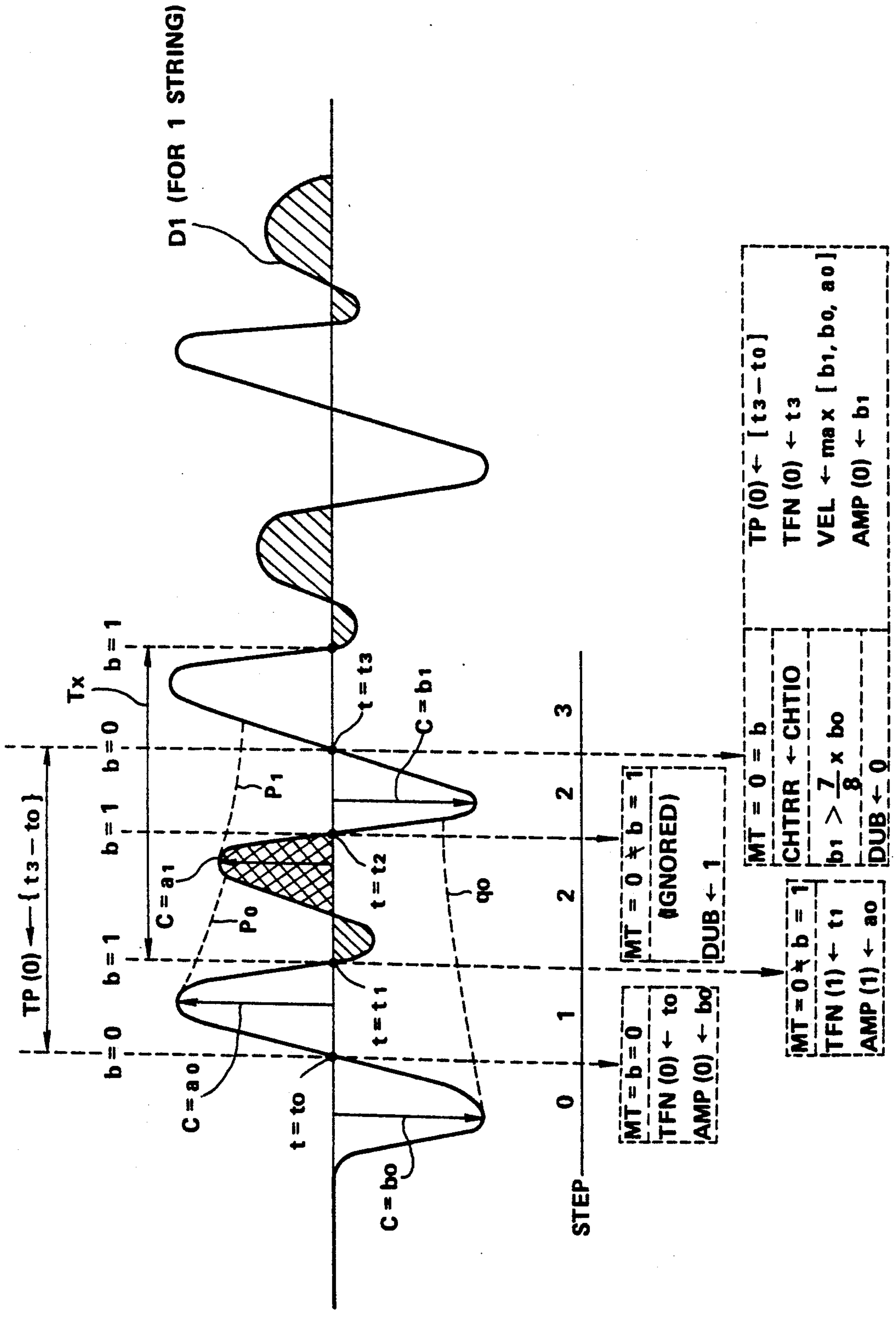
FIGS. 29A, 29B, and 29C are charts for explaining repetition processing in STEP 2.
Figure 29B:
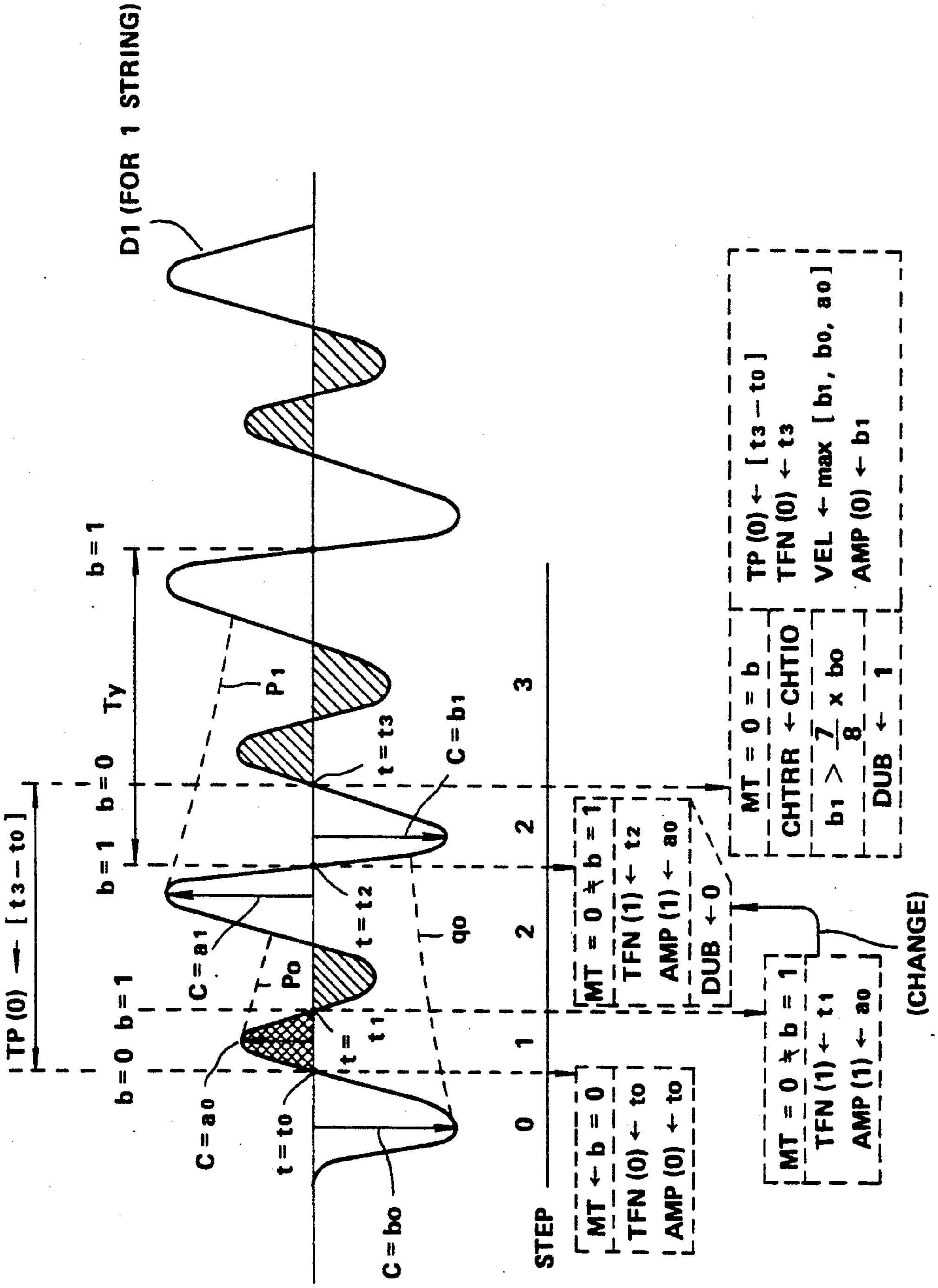

However, as has been described in the description of Sub-section "Operation of Repetition Processing" in Section "Processing Operation in STEP 1", waveforms may be repetitively input after STEP 1, as shown in FIG. 29A or 29B. In this case, after the positive (maximum) peak value $a_0$ is extracted in STEP 1, the positive (maximum) peak value $a_1$ is repetitively extracted in STEP 2. Therefore, in step S20 in FIG. 24, the present positive/negative flag b $=1$, and coincides with the flag MT $=0$ set in STEP 0. In this case, the flow advances to step S25, and repetition processing (error processing) is executed. Note that peaks indicated by simple hatching are not picked up as the threshold signals $p_0$, $p_1$, $q_0$, (same as p(n), q(n) in FIG. 13) and the like shown in FIG. 29A or 29B generated from, peak detector 901 shown in FIGS. 9 or 10, and are not detected as peak values.

In step S25, the repetition flag DUB is set to be "1" (to be described later), and the flow then advances to step S26 to check if the present peak value c is larger than the old peak value AMP(b) having the same sign.

Assuming that STEP 2 is executed at a $t=t_2$ after STEP 0 ($t=t_0$) and STEP 1 ($t=t_1$), $C=a_1>$AMP(b)$=$AMP(1)$=a_0$ cannot be established. More specifically, NO is obtained in step S26 in FIG. 24. In this case, the present peak value al is ignored as an abnormal waveform (cross-hatched portion in FIG. 29A). Thus, the register STEP is not updated, and the flow returns to the processing in step M2 in the main routine shown in FIG. 21 to wait for the next normal peak. When the minimum peak value $c=b_1$ is input at $t=t_3$, YES is obtained in step S20 in FIG. 24, and the processing in step S21→S22→S23→24 is executed in the same manner as in FIG. 27. At $t=t_3$ in FIG. 29A, the control transits to the next processing in STEP 3. Note that the old period data TP(0) set in step S24 in FIG. 24 corresponds to a difference between the present zero-cross time $t_3$ and the old zero-cross time $t_0$ set in STEP 0, as shown in FIG. 29A. The start point of the next period data $T_x$ calculated in STEP 3 (to be described later) corresponds to the old zero-cross time TFN(1) $=t_1$ set in STEP 1 since the cross-hatched peak ($c=a_1$) is ignored, as shown in FIG. 29A.

On the contrary, in FIG. 29B, $c=a_1>$AMP(b) $=$AMP(1) $=a_0$ can be established. That is, YES is obtained in step S26 in FIG. 24. In this case, the maximum peak value $a_0$ extracted in the preceding STEP 1 is ignored as an abnormal waveform (cross-hatched portion in FIG. 29B), and the contents of the old zero-cross time data TFN(1) and the positive old peak value AMP(1) are updated to the present zero-cross time t and the present peak value c in step S29 in FIG. 24. More specifically, in FIG. 29B, TFN(1)$=t=t_2$ and AMP(1) $=c=a_0$. After the repetition processing, the register STEP is not updated, and the flow returns to the processing in step M2 in the main routine shown in FIG. 21 to wait for inputting of the next normal peak value. Thereafter, the processing after the minimum peak value $c=b_1$ is input at $t=t_3$ is the same as that in FIG. 29A. However, since the peak (cross-hatched peak $c=a_0$ in FIG. 29B) extracted in STEP 1 is ignored and is updated to the peak $c=a_1$, the start point of the next period data $T_x$ of TP(0) calculated in STEP 3 (to be described later) corresponds to the old zero-cross time TFN(1) $=t_2$ set in the repetition processing in STEP 2, and is different from that in FIG. 29A.

As shown in FIG. 29A or 29B, when waveforms are repetitively input, a peak having a smaller peak value is ignored as an abnormal waveform, and error processing is executed.

A branch at step S22 in FIG. 24 for other cases of the repetition processing will be explained below.

When the processing in STEP 2 in FIG. 24 is executed, since a normal waveform obtained by plucking a string is smoothly and naturally attenuated, the present peak value becomes larger than a $\frac{7}{8}$ multiple of the old peak value AMP(b) having the same sign in step S22, and YES is obtained in step S22. Thus, the flow advances to step S23.

In some cases, however, $c>(\frac{7}{8}$x AMP(b) cannot be established. In a first case, when a string 105 of FIG. 1 is plucked near the bridge 107*b*, for example, a waveform abruptly attenuating immediately after it is plucked may be generated. In this case, although the waveform is normal, it is not smoothly attenuated, and NO may often be obtained in step S22. In this case, the processing in step S24 in FIG. 24 must be normally performed. Since the waveform is normal, the above-mentioned repetition does not occur, and the flow does not branch from step S20 to step S25 in FIG. 24. Therefore, the repetition flag DUB is kept to be "0". If DUB $=1$ is not established in step S27 in FIG. 24, the flow returns to step S24 regardless of the judgement result in step S22, and the processing described in Subsection "Basic Operation" is executed. Note that the repetition flag DUB is initialized to 0 in the processing of step S04 in STEP 0 in FIG. 22.

In a second case, step S22 in FIG. 24 cannot be established when repetition of waveforms described above occurs. This case will be explained below with reference to FIG. 29C.

Figure 29C:
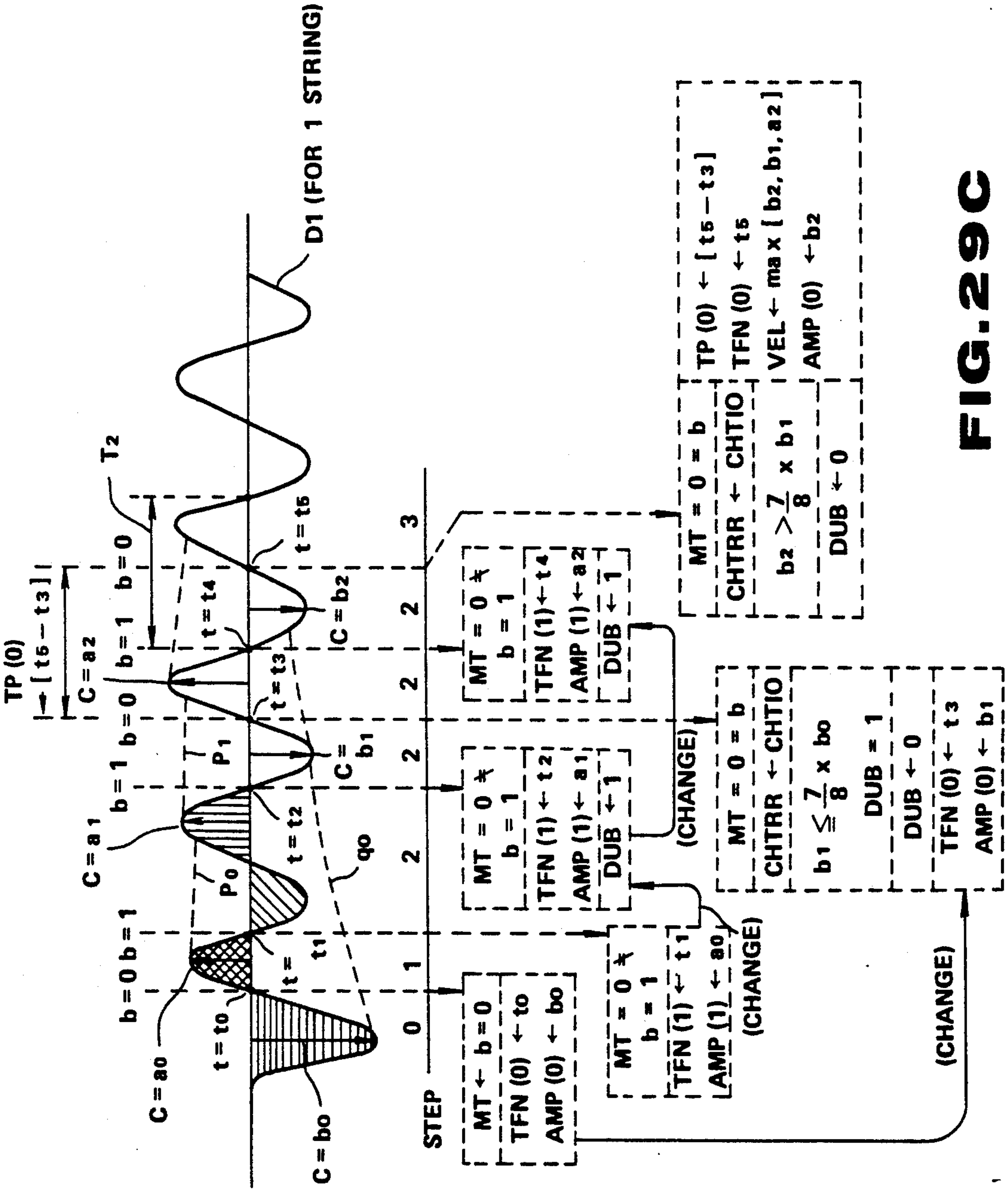

As shown in FIG. 29C, the repetition processing is performed at $t=t_2$ after the processing of STEP 0 ($t=t_0$) and STEP 1 ($t=t_1$), and the peak $c=a0$ (cross-hatched peak in FIG. 29C is removed while the peak $c=a_1$ (vertically hatched peak in FIG. 29C) is left, in the same manner as has been described in FIG. 29B. Note that the simple-hatched peak ($c=a_1$) is not originally detected as in FIG. 29A or 29B.

When the repetition occurs as described above, since the positive/negative flag becomes $b=0$ at the next $t=t_3$, as shown in FIG. 29C, it coincides with the flag $MT=0$ set in STEP 0. Therefore, the flow advances from step S20 to the processing in step S22 via step S21 in FIG. 24. However, the present minimum peak value $c=b_1$ detected at $t=t_3$ is much smaller than the old minimum peak value AMP(0) having the same sign due to repetition of the waveforms, and is largely attenuated. Therefore, as shown in FIG. 29C, NO may be obtained in step S22 in FIG. 24.

In this case, since the repetition processing is performed at $t=t_2$, the value of the repetition flag DUB is "1" Therefore, NO is obtained in step S27 in FIG. 24, and the flow advances to step S29 via step S28 (to be described later).

In step S29, in order to restart processing by acquiring a normal waveform after $t=t_3$ in FIG. 29C, the contents of the old zero-cross time data TFN(0) and the negative old peak value AMP(0) set in STEP 0 are updated to the present zero-cross time t and the present peak value c in step S29 in FIG. 24. More specifically, in FIG. 29C, $TFN(0)=t=t_3$ and $AMP(0)=c=b_1$. As a result, the horizontally hatched peak ($c=b_0$) in FIG. 29C is ignored. For the following processing, the repetition flag DUB is reset to "0" in step S28 in FIG. 24. After the above-mentioned operations, the content of the register STEP is not updated, and the flow returns to the processing in step M2 of the main routine in FIG. 21 to wait for the next peak input.

In the above case, as shown in FIG. 29C, STEP 2 in FIG. 24 is repeated at $t=t_4$ and $t=t_5$, and the control then transits to STEP 3. The repetitive operation of STEP 2 described above includes various patterns, and a detailed description thereof will be omitted. A normal waveform can be acquired as the entire control flow, and an operation is performed to effectively determine the data TFN(0), AMP(0), TFN(1), and AMP(1) used for next STEP 3. Thereafter, the control transits to STEP 3. Note that in the case shown in FIG. 29C, $TP(0)=t_5-t_3$, and the start point of the next period data $T_2$ calculated in STEP 3 (to be described later) corresponds to $TFN(1)=t_4$.

(Processing Operation in STEP 3)

Figure 25:
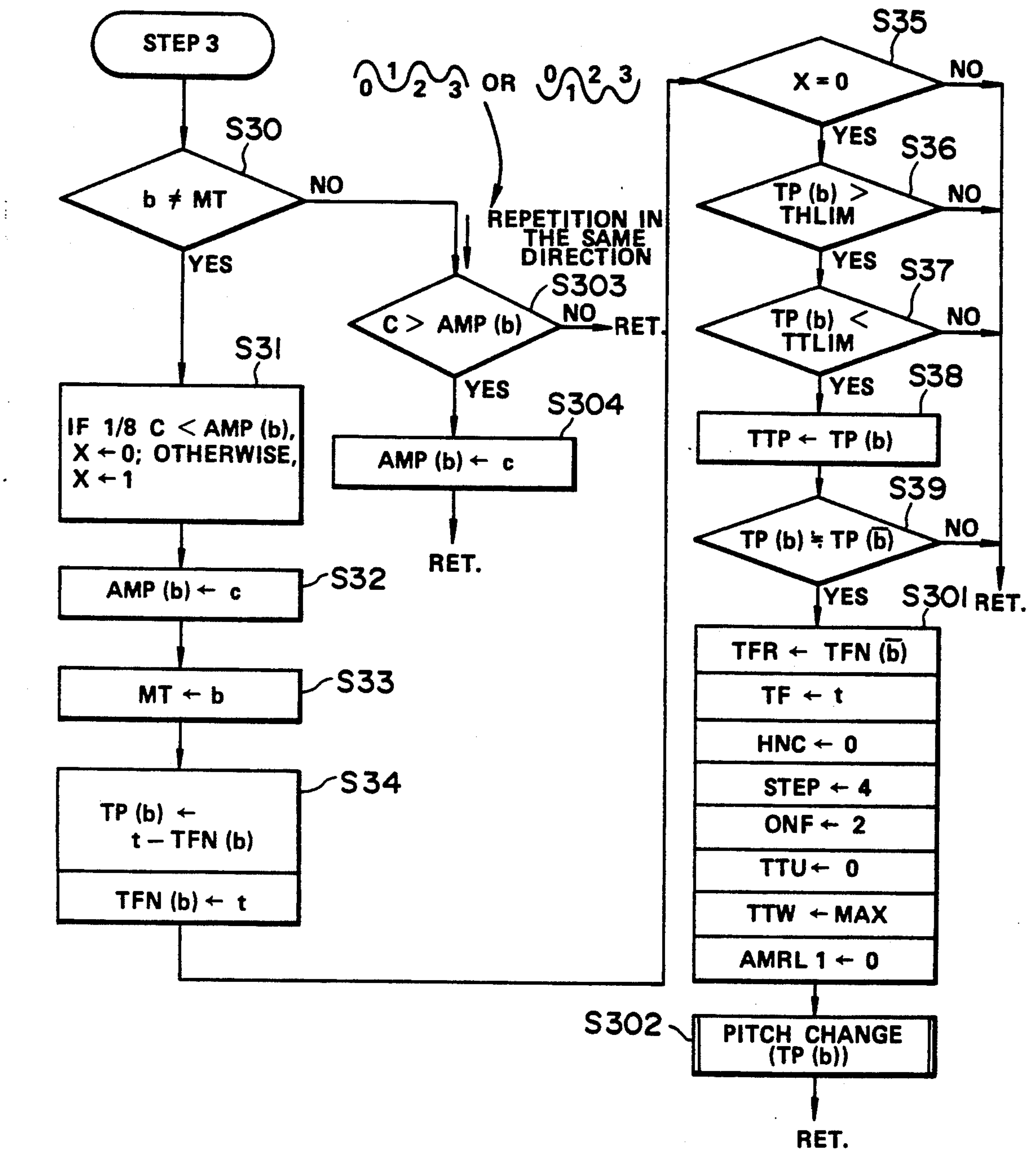
FIG. 25 is an operation flow chart of STEP 3.

FIG. 25 is an operation flow chart of processing in STEP 3 as step M8 in the main routine of FIG. 21. In this processing, extraction of a pitch period for the second time, pitch change operation based on the extracted pitch, transition processing to STEP 4, error processing when an abnormal waveform is input, and the like are executed.

<Basic Operation>

After the processing in STEP 2 is executed, the main routine shown in FIG. 21 waits for next data input to the registers T0, C, and B upon interruption again from the pitch extraction digital circuit 304 (FIGS. 3 or 9) by repeating the loop of step M2→M10→M11→M2.

When data are input and the contents of the registers are read in step M3 in FIG. 21, the flow advances to step M8, i.e., STEP 3 in FIG. 25 via step M4. In this state, as shown in FIG. 27, the present zero-cross time $t=t_3$, the present positive/negative flag $b=1$, and the present peak value is the maximum peak value $c=a_1$ since $b=1$.

Note that after steps S30, S31, and S32 in FIG. 25 (to be described later), in step S34, {(present zero-cross time t)−(old zero-cross time data TFN(b) having the same sign)} is calculated to detect a pitch period for the second time, and the detected period is set as old period data TP(b). In FIG. 27, $TP(1)=t_3-t_1$.

After steps S35 to S38 in FIG. 25 (to be described later), it is checked in step S39 if the old period data TP(b) calculated in step S34 is substantially equal to the old period data $TP(\bar{b})$ having the different polarity set in step S24 in FIG. 24. If YES in step S39, since it can be determined that the pitch period can be started to be stably extracted, pitch change processing is executed in step S302 via step S301 (to be described later). That is, pitch change operation is executed by outputting the second pitch period data obtained as the old period data TP(b) from MCP 301 in FIG. 3 to the musical tone generator 305. Pitch of the musical tone now sounding is changed in real time basis according to this pitch change operation. In FIG. 27, it is determined that the negative old period data $TP(1)=t_1-t_1$ is substantially equal to the positive old period data $TP(0)=t_2-t_0$, and the control transits to the pitch change processing. Note that a case wherein NO is obtained in step S39 will be described later.

Simultaneously with the pitch change processing, parameters used in STEP 4 next are set in steps S38 and S301 in FIG. 25, and the flow returns to the processing in step M2 of the main routine shown in FIG. 21. Thus, the control transits to the next STEP 4. More specifically, in step S38, the old period data TP(b) extracted in step S34 is set as the previously extracted period data TTP. In step S301, the old zero-cross time data $TFN(\bar{b})$ set in step S24 in STEP 2 is set in the time storing register TFR, the present zero-cross time data t is set as valid old zero-cross time data TF, a waveform number counter HNC is cleared to "0", the value of the register STEP is updated to "4", the note-on flag ONF is set to be "2" (sound generation state), the constant TTU is set to be "0" (minimum MIN), the constant TTW is set to be maximum MAX, and the old amplitude value AMRL1 for relative-off check is cleared to "0". These parameters will be described later in STEP 4.

<Operation When Period is Inappropriate>

When the old period data TP(b) is detected in step S34 in FIG. 25, the pitch period must be longer than a period when the corresponding string is plucked at its highest fret, and shorter than the open string period of the string.

As the constant, i.e., the upper limit frequency THLIM, a period of a pitch higher by 2 to 3 halftones than a pitch determined by the highest tone fret of a string which is presently subjected to processing, and as the constant, i.e., the lower limit frequency TTLIM, a period of a pitch lower by 5 halftones or more than a pitch determined by the open string state of the identical string is set. In steps S36 and S37 in FIG. 25, it is checked if the old period data TP(b) calculated in step S34 is larger than THLIM and is smaller than TTLIM. If YES is obtained in both steps S36 and S37, the flow advances to step S39, and the period judgement processing described above is performed.

If NO in step S36 or S37, it is determined that the old period data TP(b) extracted in step S34 is inappropriate. Therefore, in this case, the flow returns from step S36 or S37 to the processing in step M2 in the main routine of FIG. 21, and STEP 3 is repeated.

If it is determined in step S39 in FIG. 25 that the old period data TP(b) calculated in step S34 is different from the old period data $TP(\bar{b})$ having the different polarity, an overtone or the like may be accidentally extracted and an accurate pitch period fails to obtain. In this case, the pitch period cannot be stably extracted. Therefore, NO is obtained in step S39, and the flow returns to the processing in step M2 in the main routine of FIG. 21 to repeat STEP 3.

When STEP 3 is repeated with the above operations, in a normal waveform, the polarities of a newly detected peak via steps M2 and M3 in FIG. 21 are alternately switched, and the value b is alternately inverted to be 0 and 1. In addition, in step S33 in FIG. 25, the value of the flag MT is alternately updated, and in step S34, new TP(b) is calculated and the content of TFN(b) is updated. Therefore, judgement in steps S36 and S37 is performed for the latest pitch period, and judgement in step S39 is performed for the latest pitch period and second latest pitch period (before about half a period) having the opposite polarity. When the pitch periods can be stably extracted, the control transits to the pitch change processing.

In steps S32 in FIG. 25, the old peak value AMP(b) is updated accordingly in correspondence with the newly detected present peak value e.

<Operation of Noise Removal Processing>

Figure 30:
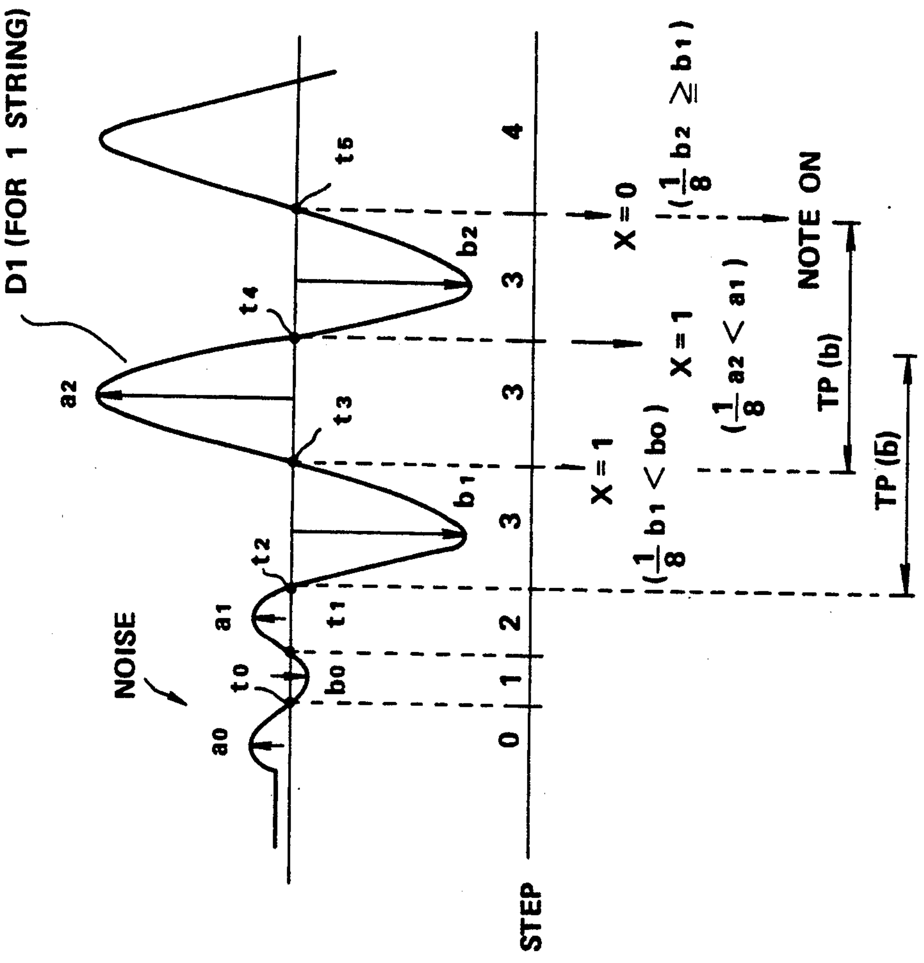
FIG. 30 is a chart for explaining noise removal processing in STEP 3.

The processing in step S31 in FIG. 25 is performed to cope with a case wherein a noise component appears in the leading edge portion of the waveform. Assume that peaks $a_0$, $b_1$, $a_1$, and the like caused by noise are accidentally detected in STEPs 0, 1, and 2, as shown in FIG. 30. If the periods of these noise components are detected and tone generation start is instructed, a quite unnatural musical tone is generated In step S31 in FIG. 25, when successive peak values are largely changed, it is determined that a noise component is generated, and the abnormal detection flag X is set to be "1". Thus, NO is obtained in step S35 so as to prevent pitch change processing on the basis of the noise portion.

More specifically, normality is determined if a $\frac{1}{2}$ value of the present peak value c is smaller than the old peak value AMP(b) having the same sign, and the flag X is set to be "0"; otherwise, $X=1$ is set. If it is not determined in step S35 that $X=0$, the flow returns to the processing in step M2 in the main routine of FIG. 21 to repeat STEP 3. In this case, since the old peak value AMP(b) is sequentially updated in step S32 in FIG. 25, the processing in step S31 is performed for the latest peak value and the immediately preceding peak value having the same sign When the successive peak values are free from a large change, the control transits to the pitch change processing. In FIG. 30, both at $t=t_3$ and $t=t_4$, $X=1$ is determined in step S31. Therefore, the pitch change processing is not performed. At $t=t_5$, since it is determined that a normal peak is input for the first time, $X=0$ is determined in step S31, and the pitch change processing is performed at $t=t_5$. In this case, the successive pitch periods TP(b) and $TP(\bar{b})$ have normal values.

<Operation of Repetition Processing>

The judgement processing in step S30 in FIG. 25 is performed for repetition processing. If the normal waveform D1 as shown in FIG. 27 is input, the present positive/negative flag $b=1$ at $t=t_3$ does not coincide with the flag $MT=0$, and the flow advances to step S31, as described above.

However, as has been described in Sub-section "Operation of Repetition Processing" in Section "Processing Operation in STEP 1" or "Processing Operation in STEP 2", when the waveforms are repetitively input, NO is obtained in step S30.

When the repeating peak value c is smaller than the old peak value AMP(b) having the same sign, NO is obtained in step S303 in FIG. 25, and the repeating peak is ignored Thereafter, the flow returns to the processing in step M2 in FIG. 21 to repeat STEP 3, based on the same consideration as in FIG. 29A and the like.

In contrast to this, if the repeating peak value c is larger, YES is obtained in step S303, and the flow advances to the processing in step S304. In step S304, the old peak value is ignored. The content of the AMP(b) is updated to the present peak value c, and the flow returns to step M2 in FIG. 21 to repeat STEP 3, based on the same consideration as in FIG. 29B and the like.

When the normal peak is input after the above-mentioned processing, YES is obtained in step S30, and YES is obtained in steps S35, S36, S37, and S39. Thus, the pitch change processing is performed, and change of the pitch of the musical tone is executed.

As has been described above, in STEP 3, the first pitch change operation is executed after a condition, wherein the stable pitch period can be extracted, is detected to be satisfied, since, when the digital waveform signal D1 is rendered to initiate the vibration upon the plucking of the string 105 of FIG. 1, the string vibration at the starting portion thereof is unstable and the pitch period may be disturbed. Thus, it is possible to change the pitch of the tone, which is brought into a note-on state, so as to correspond to a read pitch of the plucked string.

(Processing Operation in STEP 4)

Figure 26:
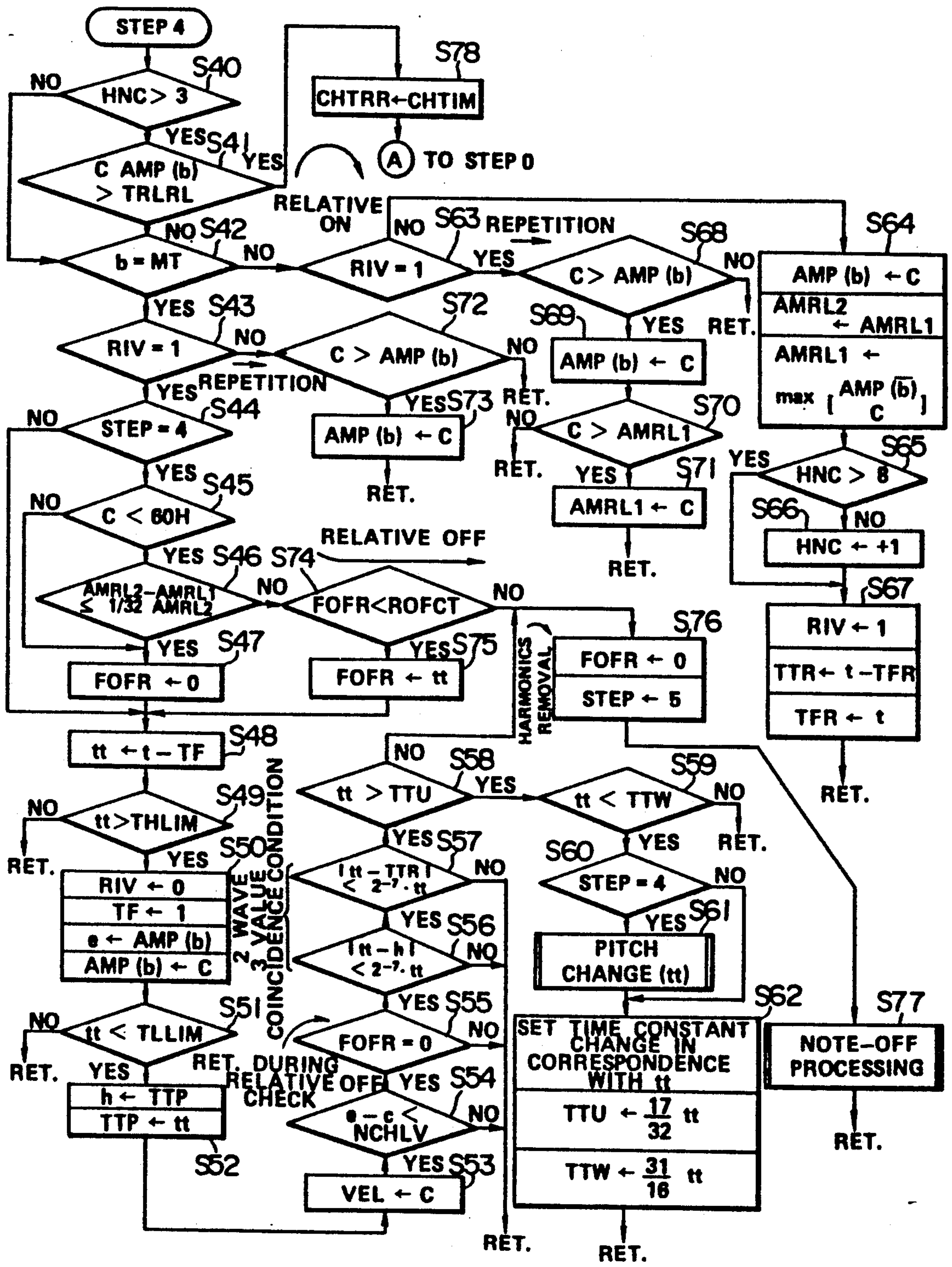
FIG. 26 is an operation flow chart of STEP 4 (5)

FIG. 26 is an operation flow chart of processing in STEP 4 as step M9 of main routine in FIG. 21. In this processing, pitch extraction/change processing, relative-on/relative-off processing, processing when a pitch period is inappropriate, repetition processing, and the like are performed. This processing is not directly related to the present invention but is important for tone pitch control of a musical tone. Thus, this processing will be described below. The pitch extraction/change processing includes a route (1) for performing only pitch extraction and a route (2) for actually changing a pitch, and generally these routes are alternately repeated every time a new peak is input.

Where, the pitch change processing in STEP 4 is slightly different from that in STEP 3. In STEP 4, when, after the initiation of the tone, the tension of the string 105 in FIG. 1 is varied, by a player, by performing a choking operation (the finger of the player depressing the string 105 on the fingerboard 104 of FIG. 1 is moved across the lengthwise direction of the neck 102), or by operating the tremolo 111 in FIG. 1, the pitch period of the digital waveform signal D1 is varied. Therefore, the STEP 4 is executed so as to change the pitch in a real time fashion.

Operation of Pitch Extraction Processing (Route (1))

The route (1) shown in steps S40, S41, S42, and S63 to S67 will be described first. In step S40, whether or not the waveform number counter HNC >3 is checked If YES in step S40, the flow advances to step S41. It is checked in step S41 if the relative-on threshold value TRLRL < (present peak value c−old peak value AMP(b) having the same sign). If NO in step S41, the flow advances to step S42 (a case of YES will be described later). It is then checked in step S42 if the present positive/negative flag b =flag MT, i.e., a pitch is to be changed. If YES in step S42, the flow advances to step S43.

However, in an initial static, the content of the waveform number counter HNC is 0 (see step S301 in FIG. 25). Thus, NO is obtained in step S40, and the flow advances to step S42. For example, when the waveform as shown in FIG. 27 is input, since b =0 and MT =1 (which latter is written in step S33 in STEP 3 in FIG. 25) at t $=t_4$, the flow advances from step S42 to step S63.

It is checked in step S63 if the register RIV =1 in order to check whether or not the peaks having the same polarity are repetitively input (repetition is detected). If YES in step S63 (peaks having the same polarity are repetitively input), the flow advances to step S68 to perform repetition processing (to be described later). If NO in step S63 (repetition is not detected), the flow advances to step S64, and the following processing is executed.

In step S64, the present peak value c is input as the old peak value AMP(b), and the old amplitude value AMRL1 is input as the amplitude value AMRL2 immediately preceding the old amplitude value AMRL1 for relative-off processing (to be described later). Note that the content of AMRL1 is initially set to be "0" (step S301 in STEP 3 in FIG. 25).

Furthermore, a larger one of the old and present peak values AMp($\bar{b}$) and c having opposite signs is input as the old amplitude value AMRL1. More specifically, a larger one of the two, i.e., positive and negative peak values in a period is set in the amplitude value AMRL1.

It is checked in step S65 if the waveform number counter HNC >8. The waveform number counter (zero-cross counter not at a pitch change side) HNC is incremented by 1. Therefore, the upper limit of the waveform number counter HNC is 9. After the processing in step S65 or S66, the flow advances to step S67. In step S67, the register RIV is set to be "1", the content of the time storing register TFR is subtracted from the present zero-cross time t, and the difference is input to the period register TTR. The period register TTR indicates the period data TTR $=t-TFR=t_4-t_2$ in FIG. 27. The present zero-cross time t is saved in the time storing register TFR, and thereafter, the flow returns to the processing in step M2 in the main routine of FIG. 21.

As described above, in the route (1), the following processing is executed according to FIG. 27. More specifically, MT $=1 \neq b$, RIV $=0$, AMP(0)$\leftarrow c=b_2$, AMRL2$\leftarrow$AMRL1$=0$, AMRL1$\leftarrow$max{AMP(1)$=a_1$, $c=b_2$ (a larger one of them)}, HNC$\leftarrow${HNC+1}$=1$, RIV$\leftarrow$1, TTR$\leftarrow$}t$-$TFR}$=\{t_4-t_2\}$, and TFR$\leftarrow t=t_4$. Therefore, a time data difference of time data from the old zero-cross time t $=t_2$ (change point from STEP 2$\rightarrow$STEP 3) to the present zero-cross time t $=t_4$, i.e., period data is set in the period register TTR. The flow then returns to the processing in step M2 in the main routine of FIG. 21 to wait for the next peak input.

<Operation of Pitch Change Processing (Route (2))>

A case will be described below wherein the control advances to the route (2) shown in steps S40 to S62. Since the waveform number counter HNC =1 (step S66), the flow advances from step S40 to step S42 (step S40 will be described later).

YES is obtained in step S42 since MT =1 and b =1 in FIG. 27, and the flow advances to step S43.

It is checked in step S43 if the register RIV =1. Since the register RIV has already been set to be "1" in the route (1) (step S67), YES is obtained in step S43, and the flow advances to step S44. Repetition processing performed when NO is obtained in step S43 will be described later.

It is checked in step S44 if the register STEP =4. If YES in step S44, the flow advances to step S45 (a case of NO will be described later). It is checked step S45 if the present peak value c <60H (H indicates the hexadecimal notation). If a large peak value is input, NO is obtained in step S45, and the flow advances to step S47. Contrary to this, when the input value is smaller than 60H, YES is obtained in step S45, and the flow advances to step S46.

In step S46, it is checked if {the amplitude value (peak value) AMRL2 before AMRL1} $-${the old amplitude value (peak value) AMRL1} $\leqq$(1/32) x {the amplitude value (peak value) AMRL2 before AMRL1}. If YES in step S46, the flow advances to step S47, and the relative-off counter FOFR is set to be "0". If NO in step S46, the flow advances to step S74, and relative-off processing is executed. The relative-off processing will be described later.

In step S48, a period calculation is made. More specifically, (present zero-cross time t$-$old zero-cross time data TF) is set in the register TOTO as present period value tt. The flow then advances to step S49.

In step S49, it is checked if the present period data tt >upper limit frequency THLIM (upper limit after tone generation start). If YES in step S49, the flow advances to step S50 (a case of NO will be described later). The upper limit frequency THLIM in step S49 is the same as the upper limit of the allowable range of the frequency (i.e., corresponding to a minimum period of a tone, pitch of which is higher by 2 to 3 halftones than that of a highest tone fret) used in step S36 in STEP 3 in FIG. 25.

In step S50, the following processing is executed. More specifically, the register RIV is set to be "0", the present zero-cross time t is input as the old zero-cross time data TF, the old peak value AMP(b) is input as the peak value e before the old peak value AMP(b), and the present peak value c is input as the old peak value AMP(b).

After the processing in step S50, the flow advances to step S51 to check if the lower limit frequency TLLIM > the present period data tt. If YES in step S51, i.e., if the value of the present period becomes smaller than the value of the lower limit pitch extraction tone range during note-on (sound generation), the flow advances to step S52. In this case, the lower limit frequency TLLIM is set to be a value lower by one octave than that of an open string note. More specifically, the allowable range is widened as compared to the lower limit frequency TTLIM (step S37) in STEP 3 shown in FIG. 25. Thus, a change in frequency upon choking operation or operation of a tremolo arm 111 (in FIG. 1) can be coped with.

With the above operation, when the present period falls within the range defined by the upper and lower limit frequencies, the flow advances to step S52; otherwise, the flow returns from step S49 or S51 to the processing in step M2 in the main routine shown in FIG. 21 to wait for the next peak input.

In step S52, the period data TTP is input as period data h extracted before the old period, and the present period data tt is input as the previously extracted period data TTP.

In step S53, the present peak value c is written as the velocity VEL, and the flow advances to step S54.

It is checked in step S54 if the no-change level NCHLV > (the peak value e before the old peak value − the present peak value c). If YES in step S54, the flow advances to step S55. More specifically, if the old peak value (e =AMP(b)) having the same polarity and the present peak value c are largely changed, a difference therebetween exceeds NCHLV. In this case, if a pitch is changed on the basis of the extracted period data, an unnatural change in tone pitch may occur. Thus, if NO is obtained in step S54, the flow returns to the processing in step M2 in the main routine of FIG. 21 without executing the processing in step S55 and the subsequent steps, thus waiting for the next peak input.

If YES in step S54, it is checked in step S55 if the relative-off counter FOFR =0. If relative-off processing (to be described later) is performed, the relative-off counter FOFR is not "0". In this case, NO is determined in step S55 without executing pitch change processing (see step S61), and the flow returns to the processing in step M2 in the main routine of FIG. 21. If YES in step S55, the flow advances to steps S56 and S57.

In steps S56 and S57, a "2-wave 3-value coincidence condition" is checked. In step S56, whether or not the present period data tt x $2^{-7}$> | the present period data tt−period data h before the old period data | is checked. If YES in step S56, the flow advances to step S57. In step S57, whether or not the present period data tt x $2^{-7}$>the present period data tt−the content of the period register TTR | is checked. If YES in step S57, the flow advances to step S58. More specifically, for the case shown in FIG. 27, it is checked in step S56 if the present period data tt $=t_5-t_3$ (step S48) is almost equal to the old period data h =TTP $=t_3-t_1$ (step S52), and it is checked in step S57 if the present period data tt $=t_5-t_3$ is almost equal to the period TTR $=t_4-t_2$ (step S67) partially overlapping it. Note that its limit range is determined as $2^{-7}$.tt, and its value is changed depending on period data. Of course, although the limit range may be fixed, a better result can be obtained when this embodiment is employed.

It is checked in step S58 if the present period data tt > the constant TTU. If YES in step S58, the flow advances to step S59 to check if the present period data tt < the constant TTW. If YES in step S59, the flow advances to step S60. A case wherein NO is obtained in step S58 or S59 will be described later.

It is checked in step S60 if the register STEP =4. If YES in step S60, the flow advances to step S61.

In step S61, the MCP 301 shown in FIG. 3 instructs the musical tone generator 305 to change a pitch (based on the present period data tt), and the flow advances to step S62.

Thus, the pitch change is executed by delivering the present period data tt to the musical tone generator 305 from the MCP 301, so that the pitch of present tone is changed in a real time fashion in response to the choking operation or the operation of the tremolo arm 111 in FIG. 1.

In the step S62, the time constant is changed in accordance with the present period data tt. Thus, the present period data tt of the string now being processed is set into the time constant modification register CHTRR (identical with the register 1501 in FIG. 15) in the time constant modification control circuit 904 in FIG. 9 from MCP 301 via the bus BUS. As has been described in the explanation of the time constant modification control circuit 904 which is given in the item description of the pitch extraction digital section, after the effective pitch period is extracted by the MCP 301, the threshold value signals corresponding to the respective strings are set to be attenuated quickly upon a lapse of the pitch period time tt. In this manner, it is possible to extract the timing of the maximum and minimum peak values for every pitch period.

In step S62, the time constant is changed in correspondence with the present period data tt, the constant TTU is rewritten to (17/32) x the present period data tt, and the constant TTW is rewritten to (31/16) the present period data tt.

As will be described later, only when the relative-off processing is performed, STEP =5 is established. In this case, the flow directly advances from step S60 to step S62. Thus, the time constant is changed in step S62 without changing a pitch in step S61.

Upon completion of the processing in step S62, the flow returns to the processing in step M2 of the main routine shown in FIG. 21.

In the above-mentioned route (2), the following processing is executed in the case of FIG. 27. More specifically, it is determined that HNC =1, MT =1=b, and RIV =1. Operations FOFR ←0, tt ←t−TF $=t_5-t_3$, RIV ←0, TF ←t$=t_5$, e←AMP(1)$=a_1$, AMP(1)←c $=a_2$, h←TTP=TP(1)$=t_3-t_1$, TTP←tt$=t_5-t_3$, and VEL←c$=a_2$ are performed. Furthermore, a pitch is changed in accordance with tt when the following three conditions are satisfied:

$$TTP \approx TTR \approx tt \quad (1)$$

$$TTU < tt < TTW \quad (2)$$

$$AMP(0) - c < NCHLV \quad (3)$$

Thereafter, TTU←(17/32) x tt and TTW ←(31/16) x tt are set.

With the above-mentioned operations, in the route (2), actual pitch change processing for the musical tone generator 305 (FIG. 3) is performed. Thereafter, the processing of the route (1) is executed upon the next zero-cross interruption (detection of the next peak), and similarly, the processing in the route (2) is executed upon the next zero-cross interruption. In this manner, in the route (1), only a period is extracted (step S67), and in the route (2), actual pitch change processing (step S61) and time constant change processing (step S62) are executed.

<Relative-On Processing Operation>

After the waveform number counter HNC is counted up to exceed 3 in step S66 in the route (1) in STEP 4 in FIG. 26, YES is determined in step S40, and the flow advances to step S41 to detect a "relative-on condition".

This case occurs when c−AMP(b) >TRLRL, i.e., the present peak value c is increased to exceed the threshold value TRLRL as compared to the old peak value AMP(b). That is, when a given string 105 (FIG. 1) is plucked immediately after it was plucked (by, e.g., tremolo operation). In this case, YES is obtained in step S41, and the flow advances from step S41 to step S78 to execute the relative-on processing.

In step S78, the period CHTIM of the highest note fret (e.g., 22nd fret) is set in the time constant conversion register CHTRR 1501 (in FIG. 15) of the time constant conversion controller 904 (FIG. 9).

After the above processing, the flow advances to step S06 in STEP 0 in FIG. 22, a musical tone which is being produced is rendered note-off, and its tone generation is restarted. According to a normal performance operation, NO is determined in step S41 in STEP 4 in FIG. 26, and the flow advances to step S42. Thereafter, the control advances to the route (1) or (2).

<Relative-Off Processing Operation>

Figure 31:
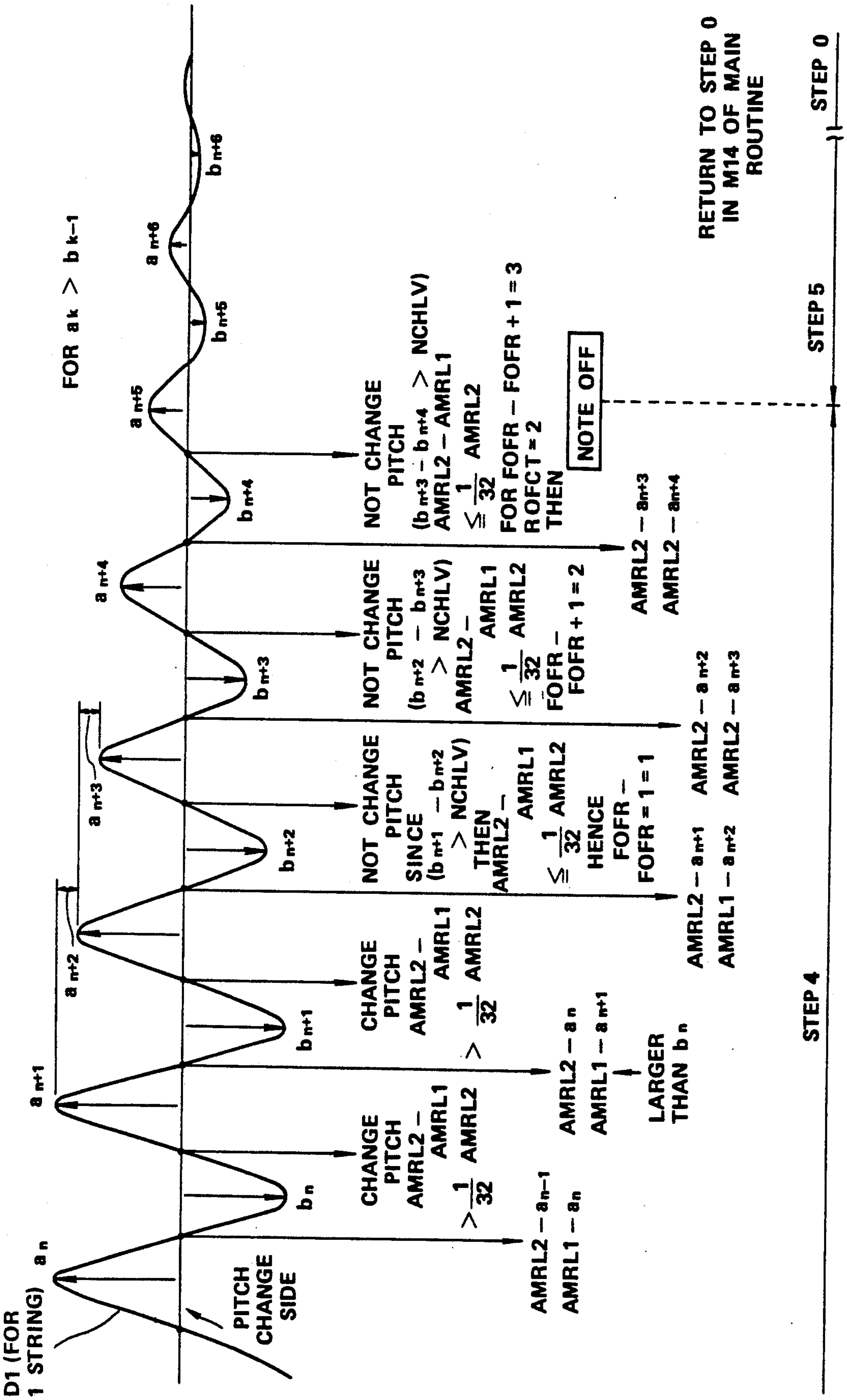
FIG. 31 is a chart for explaining relative OFF processing in STEP 4.

Relative-off processing will be described below with reference to FIG. 31. In "relative-off" processing, a note-off operation is performed when a state wherein the fret operation is performed transits to an open string state without plucking the corresponding string.

In this case, the amplitude level of the waveform immediately falls, and a difference between the peak value AMRL2 before the old peak value and the old peak value AMRL1 exceeds (1/32) AMRL2. Thus, the flow advances from step S46 to step S74 in FIG. 26.

The flow then advances from step S74 to step S75 until the relative-off counter FOFR is counted up beyond the constant ROFCT.

Subsequently, the flow advances from step S75 to step S48 and processing in steps S49 to S55 is executed. However, since FOFR =0, NO is obtained in step S55, and the flow returns to the processing in step M2 in the main routine of FIG. 21 without performing pitch change processing immediate before the relative-off processing.

Peaks in a relative-off state are sequentially input, and NO is obtained in step S74. That is, if the value of the counter FOFR becomes 3 in FIG. 31 (ROFCT =2), the from advances from step S74 to step S76.

Once YES is obtained in step S46, the flow advances from step S46 to step S47, and the counter FOFR is reset. Therefore, unless the condition in step S46 is kept satisfied a number of times designated by the constant ROFCT, the relative-off processing is not executed. Note that as the value ROFCT, a larger value is assigned to a string having a higher pitch, so that relative-off processing can be performed for any string after the lapse of an almost predetermined period of time.

The flow then advances from step S74 to step S76, in step S76, the relative-off counter FOFR is reset, and the register STEP is set to be 5. The flow advances to step S77, and the musical tone generator 305 (FIG. 3) is instructed to perform note-off.

When the register STEP =5, the pitch extraction processing is executed in the same manner as in STEP 4. However, since the flow advances from step S60 to step S62 without going through step S61, the musical tone generator 305 is not instructed to change a pitch. However, the MCP3 performs the time constant change processing in accordance with the period extracted in step S62.

When the register STEP =5, the relative-on processing is accepted (S41 and S73). In other cases, since a decrease in vibration level is detected in the main routine shown in FIG. 21, the register STEP is set to be "0" in step M14, and an initial state is set.

Note that AMRL1 and AMRL2 used in step S46 are formed in step S64, and a peak (one of maximum and minimum peaks) having a higher level in a period is determined as this value. A maximum peak ak in FIG. 31 is always higher than a minimum peak bk-1, and all differences between an+1 and an+2, an+2 and an+3, and an+3 and an+4 exceed a predetermined value.

In the processing of the route (2), since the minimum peaks bn+1, bn+2, and bn+3 are extremely decreased, NO is achieved in step S54. The flow then returns to the processing in step M2 of the main routine shown in FIG. 21, and the pitch change processing is not executed.

<Processing Operation When Pitch Period is Inappropriate>

Processing when a pitch period is inappropriate, that is, when overtones in an octave relationship, i.e., periods having tone pitches higher or lower by an octave are successively detected in steps S58 and S59 during pitch extraction will be described below.

The constant TTU used in step S58 in STEP 4 of FIG. 26 is set to be a minimum value "0" in step S301 in STEP 3 of FIG. 25, and the constant TTW is similarly set to be a maximum value MAX. When this flow is executed for the first time, YES is always determined in both steps S58 and S59. Thereafter, in step S62, (17/32).tt (period data having a tone pitch higher by almost one octave) is set as the constant TTU, and similarly, (31/16).tt (period data having a tone pitch lower by almost one octave) is set as the constant TTW.

Therefore, When the tone pitch is immediately increased by an octave (this is caused when a mute operation is performed to stop a vibration of a string with a finger) or when the tone pitch is immediately decreased by an octave (this is caused when the peak of the waveform fails to detect), if a pitch is changed, the resultant tone sounds unnatural. Thus, the flow branches so as not to execute pitch change processing.

More specifically, if tt does not exceed TTU, i.e., tt becomes smaller than the value TTU obtained by multiplying 17/32 with the previously extracted period in step S58, the flow advances to step S76. When a tone higher by an octave is extracted, it is determined that a mute operation is performed, and the flow advances from step S58 to step S76 without outputting a tone higher by an octave, and generation of the corresponding tone is stopped by the processing in steps S76 and S77 in the same manner as in the relative-off processing already explained.

If tt does not exceed TTW, i.e., tt becomes smaller than the value TTW obtained by multiplying 31/16 with the previously extracted period in step S59, the flow returns to the processing in step M2 of the main routine shown in FIG. 21 without advancing to step S60.

Figure 32:
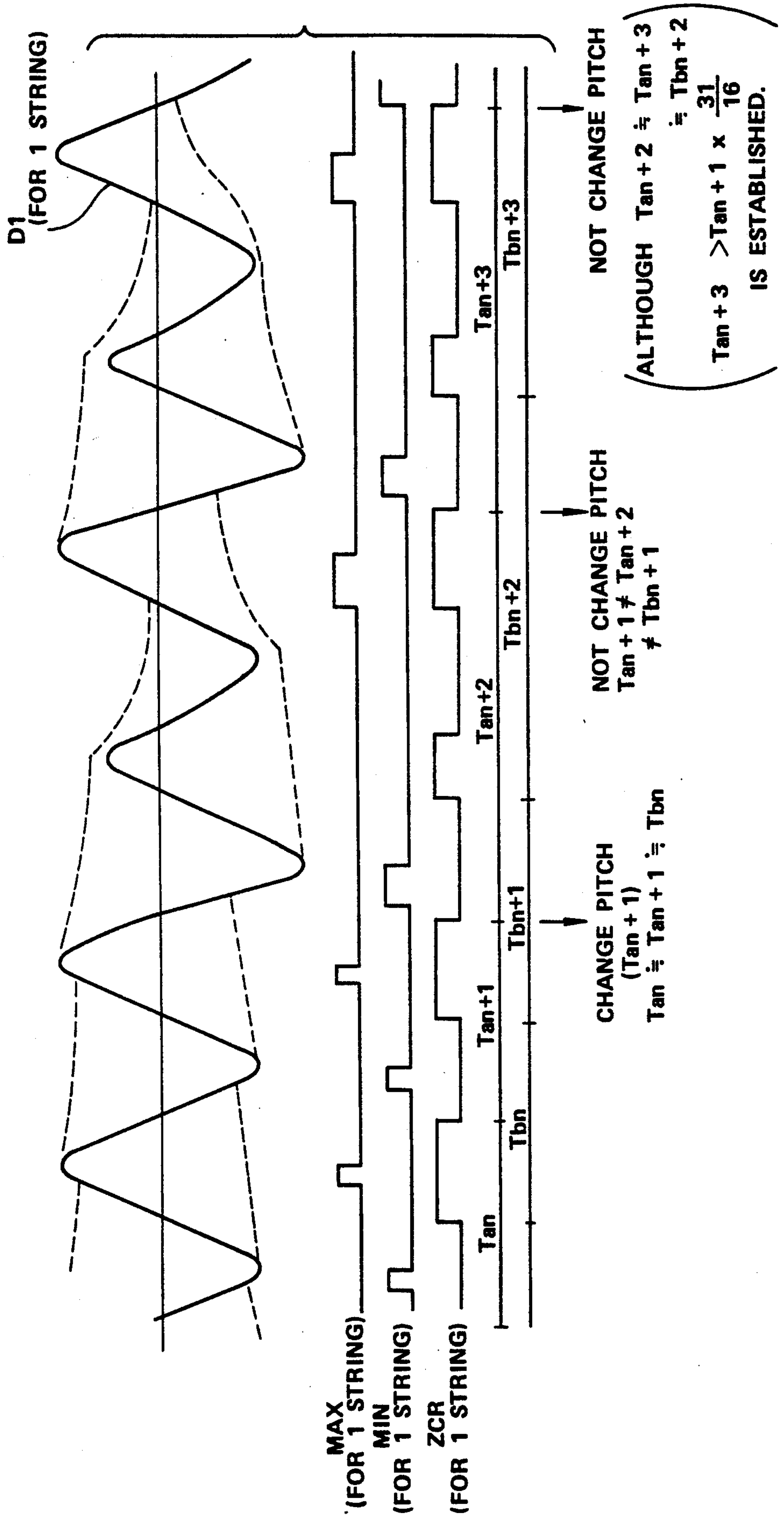
FIG. 32 is a chart for explaining processing when a pitch period is inappropriate in STEP 4.

This state is shown in FIG. 32. When a waveform near note-off is very small, another waveform is superposed due to a crosstalk of the hexa-pickup or a resonance of a body caused by plucking operation of other strings. Thus, the input waveform becomes as shown in FIG. 32, and an input waveform below one octave may be successively detected.

In this state, if no processing is performed, a tone below one octave is generated, thereby resulting in very unnatural tone generation. For this reason, even if Tan $+2 \approx$ Tan $+3 \approx$ Tbn $+2$ is detected in steps S56 and S57, since Tan $+3 >$ Tan $+1 \times (31/16)$, the flow returns from step S59 to the processing in step M2 in the main routine shown in FIG. 21 without changing a pitch.

<Repetition Processing Operation>

Processing when waveforms are repetitively extracted, i.e., when peaks having the same polarity are successively detected will now be described.

In the route (1) wherein NO is obtained in step S42 in STEP 4 in FIG. 26, if YES is obtained in step S63, the flow advances to step S68 to execute the repetition processing.

More specifically, if YES in step S63, the flow advances to step S68 to check if the present peak value c > the old peak value AMP(b) having the same sign. If YES in step S68, the flow advances to step S69.

In step S69, the old peak value AMP(b) is rewritten to the present peak value c, and the flow advances to step S70.

It is checked in step S70 if the present peak value c > the old amplitude value (peak value) AMRL1. If YES in step S70, the flow advances to step S71. In step S71, the present peak value c is set as the old amplitude value (peak value) AMRL1.

If NO is determined in step S68, the flow immediately returns to the processing in step M2 of the main routine shown in FIG. 21. Therefore, only when the peak of a new input wave is high, it can be determined that the peak of an overtone is not picked up. Therefore, the peak value of the new waveform is registered.

If NO in step S70 and if the processing in step S71 is completed, the control similarly returns to the main routine.

Figure 33:
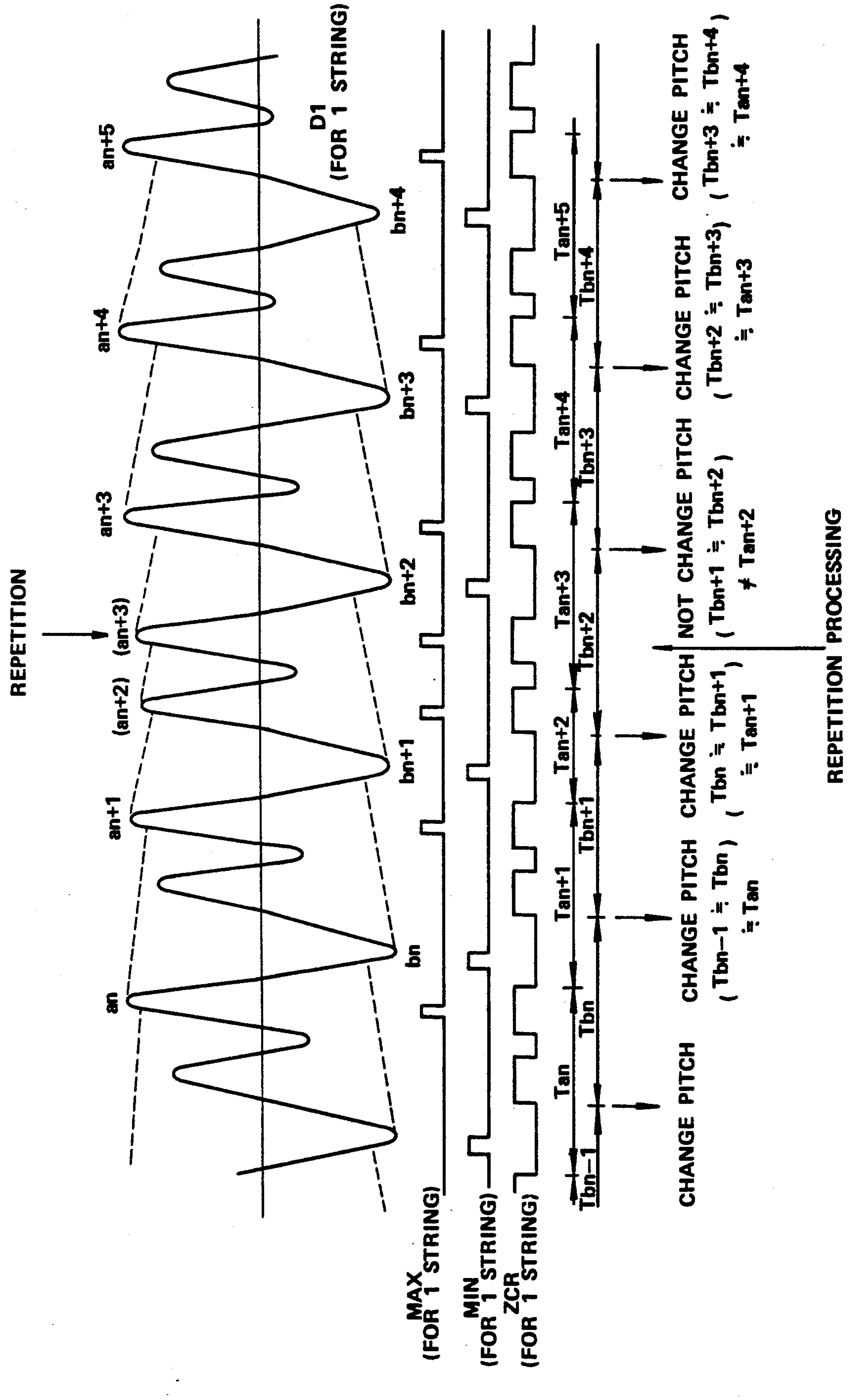
FIG. 33 is a chart for explaining repetition processing in route (1)

FIG. 33 shows the repetition processing. In this case, MT =0. In general, since the fundamental wave period has a non-integer multiple relationship with the period of an overtone component, the phase of the overtone is gradually shifted, and a zero-cross point having the same polarity may be accidentally detected. Therefore, erroneous pitch change processing caused by the above detection must be prevented. In FIG. 33, a repetition state occurs at a position indicated by "repetition". In this case, the flow advances from step S42 to step S63. YES is determined in step S63, and the flow advances to step S68. In this case, (an+2) is compared with (an+3) in step S68. Only when (an+3) is larger than (an+2), the flow advances to step S69, and AMP(1) is updated. The old amplitude value (peak value) AMRL1 is compared with the present amplitude value (peak value c) in step S70. If YES in step S70, the flow advances to step S71, and the present peak value c is set as the old amplitude value (peak value) AMRL1.

In the route (2) wherein YES is obtained in step S42 in STEP 4 in FIG. 26, if NO is obtained in step S43, the flow advances to step S72, and the repetition processing is executed in the same manner as described above.

More specifically, if NO in step S43, the flow advances to step S72 to check if the present peak value c > the old peak value AMP(b) having the same sign. If YES in step S72, the flow advances to step S73, and the old peak value AMP(b) is written to the present peak value c. Thereafter, the flow returns to the processing in step M2 of the main routine shown in FIG. 21.

If NO in step S72, the flow returns to the processing in step M2 of the main routine shown in FIG. 21. In this case, only when the peak of a new input wave is high, the peak value of the new waveform is registered.

Figure 34:
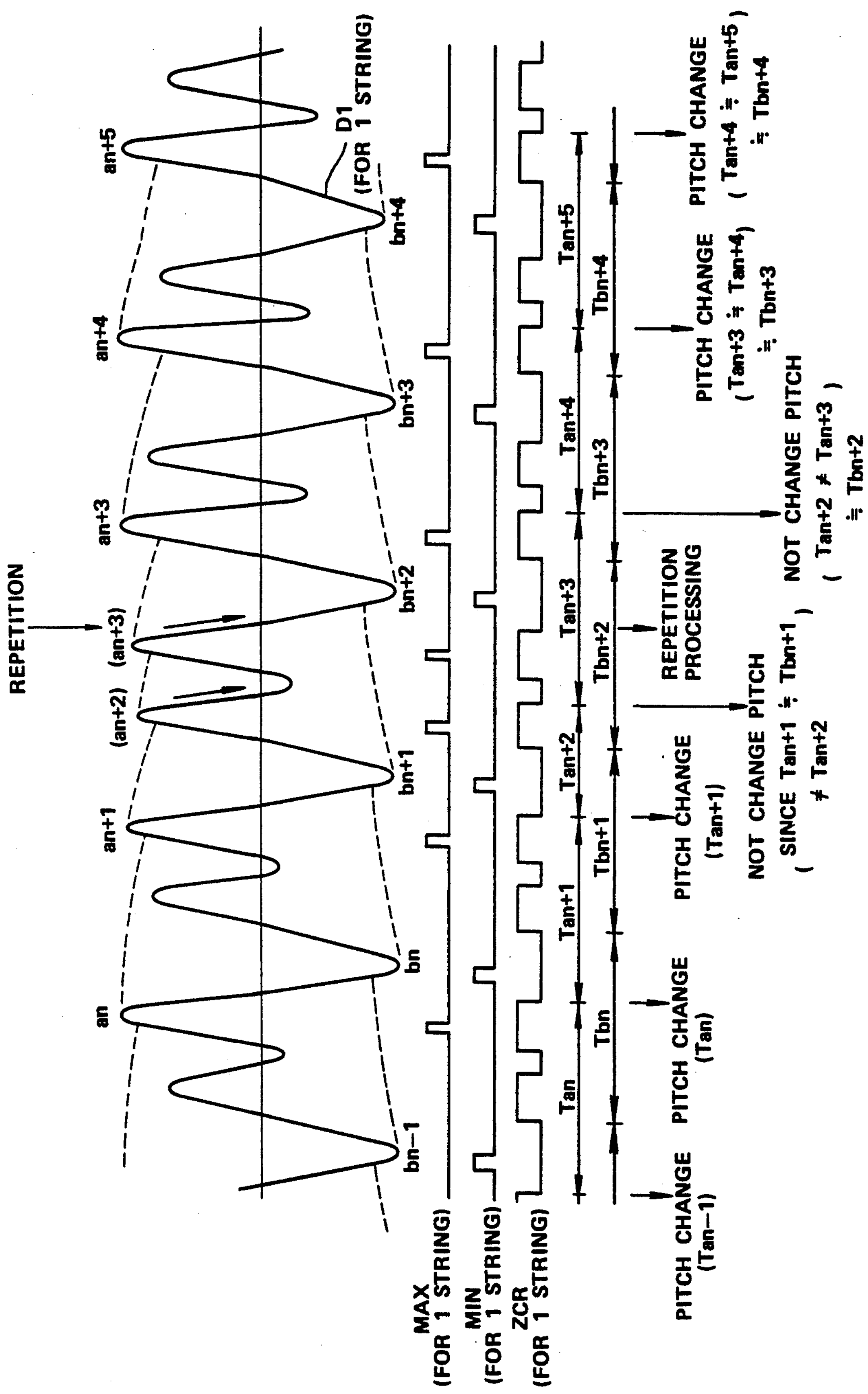
FIG. 34 is a chart for explaining repetition processing in route (2)

FIG. 34 shows this case. In this case, MT=1. In the processing of STEP 4 at the zero-cross point indicated by "repetition", the flow advances from step S42 to step S43. YES is obtained in step S43, and the flow advances to step S72. In this case, (an+3) is compared with (an+2) in step S72. If (an+3) is larger than (an+2), YES is determined instep S72, and (an+3) is set in AMP(1); otherwise, no change processing is executed.

In the repetition processing, extracted time data is not used. Therefore, period data Tan+3 is left unchanged. Pitch change processing based on the period data is not executed, either.

{Description of Second Embodiment}

With the above embodiment, the characteristic operation described in the section "General Operation of Electronic Stringed Instrument of This Embodiment" can be realized.

In the above embodiment, the fret switches shown in FIG. 2 are arranged in the neck 102 in FIG. 1. In fret scan processing in step S011 in STEP 0 of FIG. 22 in the musical tone control operation by the MCP 301 in FIG. 3, the MCP 301 outputs a scan signal of the fret switches 205 to the fret No. detection section 302 (FIG. 3), so that a decoder circuit (not shown) in the detection section 302 detects a fret No. indicating a depressed fret switch 205. Thus, the MCP 301 can perform note-ON processing (step S012 in FIG. 22) with a corresponding pitch.

In contrast to this, in the second embodiment, the fret switches 205 are omitted, the frets 103 shown in FIG. 1 are formed by electrically conductive members, and each string is formed by an electrically conductive member having an electrical resistance. A current is rendered to flow through each string 105, so that an effective string length of the string 105 between the bridge 107*b* (FIG. 1) and the fret 103 contacting the string upon depression of the string is detected as a voltage, thereby detecting a fret No.

(Arrangement)

Figure 35:
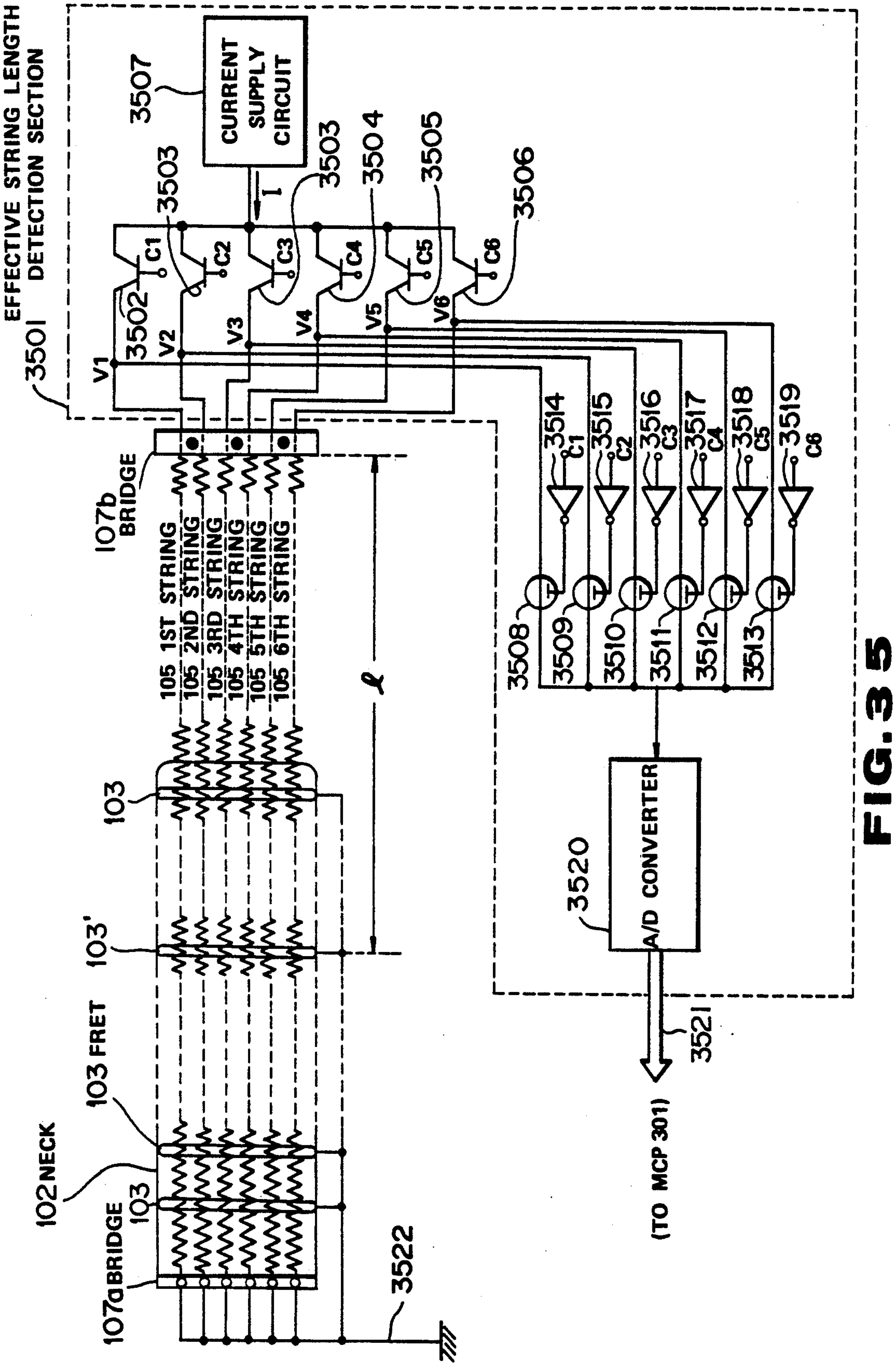
FIG. 35 is a diagram showing an arrangement according to a second embodiment of the present invention.

FIG. 35 is a diagram showing the second embodiment.

Frets 103 corresponding to those in FIG. 1 are formed by electrically conductive members, and are grounded through signal lines 3522.

Bridges 107*a* and 107*b* corresponding to those in FIG. 1 are formed by electrically insulating members.

Six strings 105 corresponding to those in FIG. 1 are formed by metal wires each having an electrical resistance (illustrated as a resistor in FIG. 35), and are grounded through the signal lines 3522 at the bridge 107*a* side. The strings 105 are connected to the collectors of transistors 3502 to 3505 in an effective string length detection section 3501 at the bridge 107*b* side.

The effective string length detection section 3501 corresponds to the fret No. detection section 302 in FIG. 3, and a constant current I flows from a current supply circuit 3507 to the emitters of the transistors 3502 to 3505. The bases of the transistors are applied with control pulses C1 to C6 from the MCP 301 in FIG. 3 through a control line (not shown).

Voltage values v1 to v6 at the collectors of the transistors 3502 to 3505 are selectively input to an A/D converter 3520 through gates 3508 to 3513 to be converted to digital values. The digital values are output to the MCP 301 in FIG. 3 as effective string length data 3521. The gates 3508 to 3513 are open/close-controlled by the control pulses C1 to C6 input through inverters 3514 to 3519, respectively.

Note that FIGS. 1, 3, 4 to 34 excluding FIG. 2 and the fret No. detection section 302 in FIG. 3 apply to this embodiment.

(Operation)

The operation of the second embodiment in FIG. 35 with the above arrangement will be described below.

Figure 36:
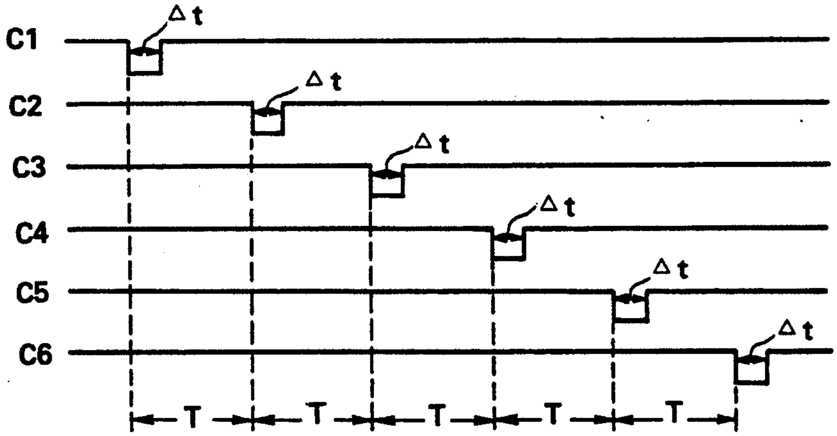
FIG. 36 is a timing chart showing an operation of the second embodiment.

When fret scan processing in step SOII in STEP 0 in FIG. 22 is to be executed in the musical tone control operation in the MCP 301 in FIG. 3, the MCP 301 outputs the low-active control pulses C1 to C6 (normally at high level) shown in FIG. 36 to the effective string length detection section 3501 in FIG. 35 at predetermined time intervals T.

When the control pulse C1 goes to low level, the transistor 3502 in FIG. 35 is turned on, and the constant current I (A) flows from the current supply circuit 3507 to the first string 105 at the same timing as the control pulse C1.

If the resistance of the string 105 between the bridges 107*a* and 107*b* is represented by R, the 12th fret equally divides the length of the string 105 into two, and a player currently depresses an nth fret 103′, the collector voltage value v1 (volt) of the transistor 3502 when the current I flows through the first string is given by:

$$v1 = R.I/(^{12}\sqrt{2})^n \qquad (7)$$

The voltage value v1 is proportional to an effective string length l from the bridge 107*b* to the fret 103′.

Simultaneously with the above operation, the output from the inverter 3514 goes to high level, and the gate 3508 is enabled. Thus, the voltage value v1 is converted to a digital value by the A/D converter 3520, and is output as the effective string length data 3521 to the MCP 301 in FIG. 3.

In the MCP 301, the effective string length data 3521 (voltage value) and pitch data corresponding to the frets 103 of the first string are prestored in a memory (not shown) as a table. The MCP 301 refers to this table on the basis of the effective string length data 3521 to generate corresponding pitch data. The MCP 301 performs note-ON processing in step SO12 in FIG. 22 on the basis of the pitch data.

The same operation is performed when the control pulses C2 to C6 in FIG. 36 are active low. In this case, the transistors 3503 to 3506 corresponding to the second to sixth strings are turned on, and the voltage values v2 to v6 are selectively converted to digital values by the A/D converter 3520 through the gates 3509 to 3513 which are enabled in response to the control pulses C2 to C6 input through the inverters 3515 to 3519. The digital values are read by the MCP 301 as effective string length data 3521, and are subjected to note-ON processing.

The constant current I flowing from the current supply circuit 3507 is preferably several amperes In order to reduce current consumption, each control pulse width Δt in FIG. 36 is set as small as possible but to be larger than an operation time of the A/D converter 3520 and is set to be, e.g., 10 μsec.

According to the second embodiment described above, a currently depressed fret 103 can be easily detected. This embodiment does not require a special mechanism in the neck 102 and the like, and is advantageous to realize a low-cost electronic stringed instrument.

{Description of Third Embodiment}

A third embodiment for detecting the fret No. will be described below. In this embodiment, an ultrasonic wave is transmitted to a string, and a turnaround time until the ultrasonic wave is reflected by the depressed fret and returns is detected to detect the fret No.

(Arrangement)

Figure 37:
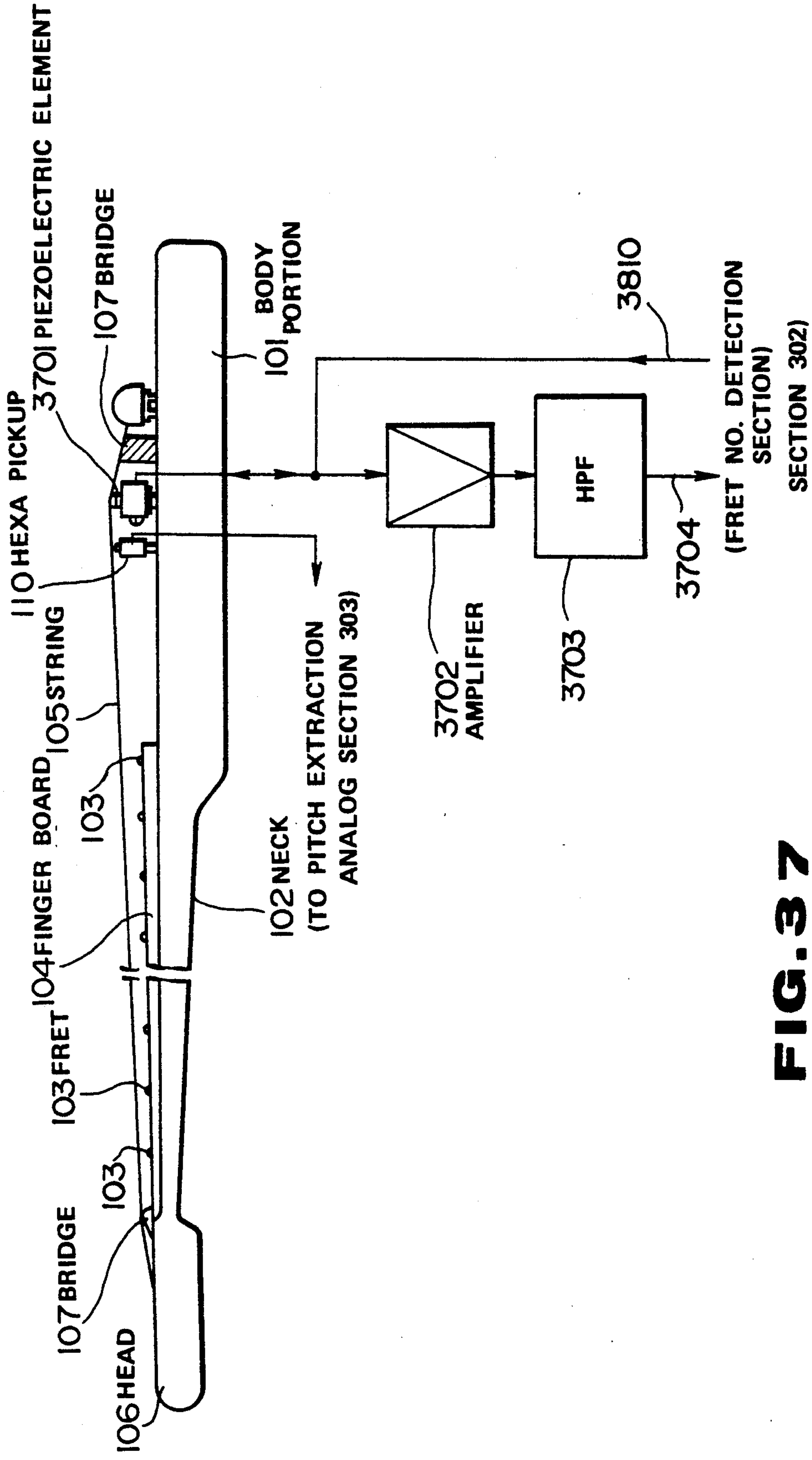
FIG. 37 is a view showing an arrangement according to a third embodiment of the present invention.

FIG. 37 is a diagram of the third embodiment.

In FIG. 37, parts denoted by the same reference numerals as in FIG. 1 perform the same operation. In this embodiment, six piezoelectric elements 3701 for transmitting or receiving an ultrasonic wave to or from six strings 105 are brought into contact with the strings 105 to support them to be parallel to hexa-pickups 110 for the six strings.

The six piezoelectric elements 3701 receive a high-frequency pulse 3810 from a transmitter 3802 (FIGS. 3 and 38) in a fret No. detection section 302 (to be described later). The output from each element 3701 is amplified by an amplifier 3702, and a low-frequency component is removed from the amplified signal by a high-pass filter (to be referred to as an HPF hereinafter) 3703. The resultant signal is output to a receiver 3803 (FIGS. 3 and 38) in the fret No. detection section 302 (to be described later) as an ultrasonic detection signal 3704.

FIG. 37 is a diagram of a third fret No. detection section 302 of the third embodiment (or a fourth embodiment to be described later).

A high-frequency pulse output from a pulse generator 3801 is output as the pulse 3810 to each piezoelectric element 3701 in FIG. 37 through the transmitter 3802.

The high-frequency pulse 3810 or the ultrasonic detection signal 3704 from each piezoelectric element 3701 in FIG. 37 (or 3901 in the fourth embodiment to be described later) is input to the receiver 3803.

The receiver 3803 sets an output pulse 3812 at high level at an output timing of the high-frequency pulse 3810 to enable a gate circuit 3807, and sets the output pulse 3812 at low level at a detection timing of the ultrasonic detection signal 3704 (3905) to disable the gate circuit 3807. While the gate circuit 3707 is enabled, a clock CLK from a clock oscillator 3806 causes a counter 3808 to count up.

A trailing differentiator 3804 detects a trailing edge timing of the output pulse 3812, and outputs a control pulse 3813 to operate a latch 3809.

The control pulse 3813 is delayed by a predetermined period of time by a delay circuit 3805, and is then input to a reset terminal RST of the counter 3808 to reset the counter.

A count output 3814 of the counter 3808 is converted to a fret No. by a data conversion table 3815 through the latch 3809, and is output to the MCP 301 in FIG. 3 as fret No. data 3816.

An overflow signal 3817 from the counter 3808 is input to the receiver 3803 to stop the reception operation.

Figure 38:
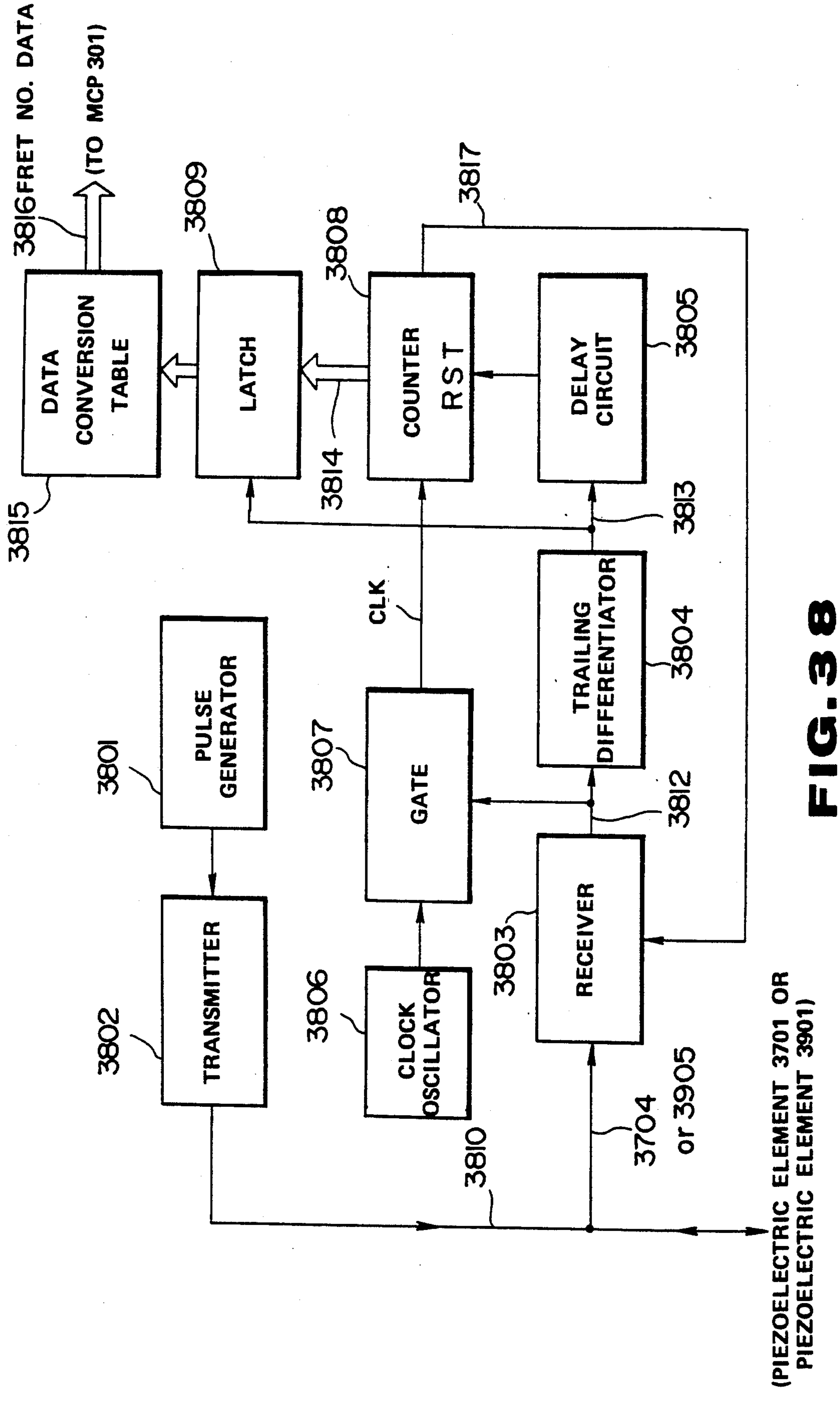
FIG. 38 is a block diagram showing a fret No. detection section in third and fourth embodiments.

In the third embodiment, the amplifier 3702 and the HPF 3703 in FIG. 37 and the fret No. detection section 302 in FIG. 38 (FIG. 3) are arranged for six circuits in correspondence with outputs for six strings. In the following description, only one circuit portion will be described for the sake of simplicity.

Note that FIGS. 1 to 34 excluding the above arrangement apply to this embodiment.

(Operation)

An operation of the third embodiment in FIGS. 37 and 38 will now be described.

In the musical tone control operation in the MCP 301 in FIG. 3, when fret scan processing in step S011 in STEP 0 in FIG. 22 is to be performed, the MCP 301 outputs an operation command to the fret No. detection section 302 in FIG. 3.

The transmitter 3802 in FIG. 38 outputs the high-frequency pulse 3810 from the pulse generator 3801 to the corresponding piezoelectric element 3701 in FIG. 37.

At the same time, the receiver 3803 detects an output timing of the high-frequency pulse 3810, and sets the output pulse 3812 at high level to enable the gate circuit 3807. Therefore, the clock CLK from the clock oscillator 3806 is input to the counter 3808, so that the counter 3808 starts counting.

In response to the high-frequency pulse 3810, the piezoelectric element 3701 in FIG. 37 transmits an ultrasonic wave of several hundreds of kHz to the string 105 (one of strings under control).

If a player depresses one of the frets 103, the ultrasonic wave propagating along the depressed string 105 is reflected by the fret 103 portion backward in the propagating direction.

Therefore, after the lapse of a turnaround time of the ultrasonic wave over the length of the string 105 from the piezoelectric element 3701 in FIG. 37 to the position of the currently depressed fret 103, the reflected ultrasonic wave is detected by the piezoelectric element 3701.

The detection signal of the reflected wave is amplified by the amplifier 3702 in FIG. 37, and a low-frequency vibration component caused by plucking the string 105 by the player is removed therefrom by the HPF 3703. The resultant signal is then input to the receiver 3803 in FIG. 38 as the ultrasonic detection signal 3704.

The receiver 3803 sets the output pulse 3812 at low level to disable the gate circuit 3807. Therefore, the count operation of the counter 3808 is stopped.

The trailing edge timing of the output pulse 3812 is detected as the control pulse 3813 by the trailing differentiator 3804, thus operating the latch 3809. Therefore, the latch 3809 latches the count output 3814 of the counter 3808 when it is stopped.

Therefore, the count output 3814 corresponds to a time from when the ultrasonic wave is transmitted from the piezoelectric element 3701 in FIG. 37 and is reflected by the currently depressed fret 103 and returned. This time changes in correspondence with the position of the depressed fret 103, i.e., the fret No.

The data conversion table 3815 in FIG. 38 prestores fret Nos. corresponding to the count outputs, so that a fret No. corresponding to the count output 3814 can be retrieved from the data conversion table 3815, and is output to the MCP 301 in FIG. 3 as the fret No. data 3816.

The output from the delay circuit 3805 resets the counter 3808 while being delayed from the operation timing of the latch 3809, thus allowing the next fret scan operation.

When the players does not depress any fret 103 in FIG. 37, the counter 3808 overflows. In this case, the counter 3808 outputs the overflow signal 3817 to the receiver 3803 to set the output pulse 3812 at low level and to stop the counter 3808. In this case, the count output 3814 corresponds to a maximum count value. In this case, data indicating an open string state is output as the fret No. data 3816.

After the above operation, the MCP 301 in FIG. 3 generates pitch data corresponding to the input fret No. data 3816, and performs note-ON processing in step SO12 in FIG. 22 based on this data.

According to the third embodiment, the currently depressed fret 103 can be easily detected as in the second embodiment. In this embodiment, since a vibration period of a string vibration frequency caused by plucking a string 105 in FIG. 37 by the player is sufficiently shorter than that of the frequency of a ultrasonic wave, the string vibration frequency can be effectively removed by the HPF 3703 in FIG. 37. The string vibration is detected by the corresponding hexa-pickup 110 in FIG. 37, and is input to the pitch extraction analog section 303 in FIG. 3 to be subjected to pitch extraction processing, as has been described above.

The circuit shown in FIG. 38 can be arranged for six circuits, so that the above control operation can be independently performed for the piezoelectric elements 3701 corresponding to the six strings. Alternatively, data for six strings may be time-divisionally processed by one circuit.

{Description of Fourth Embodiment}

A fourth embodiment for detecting a fret No. in FIG. 39 will be described below.

(Arrangement)

Figure 39:
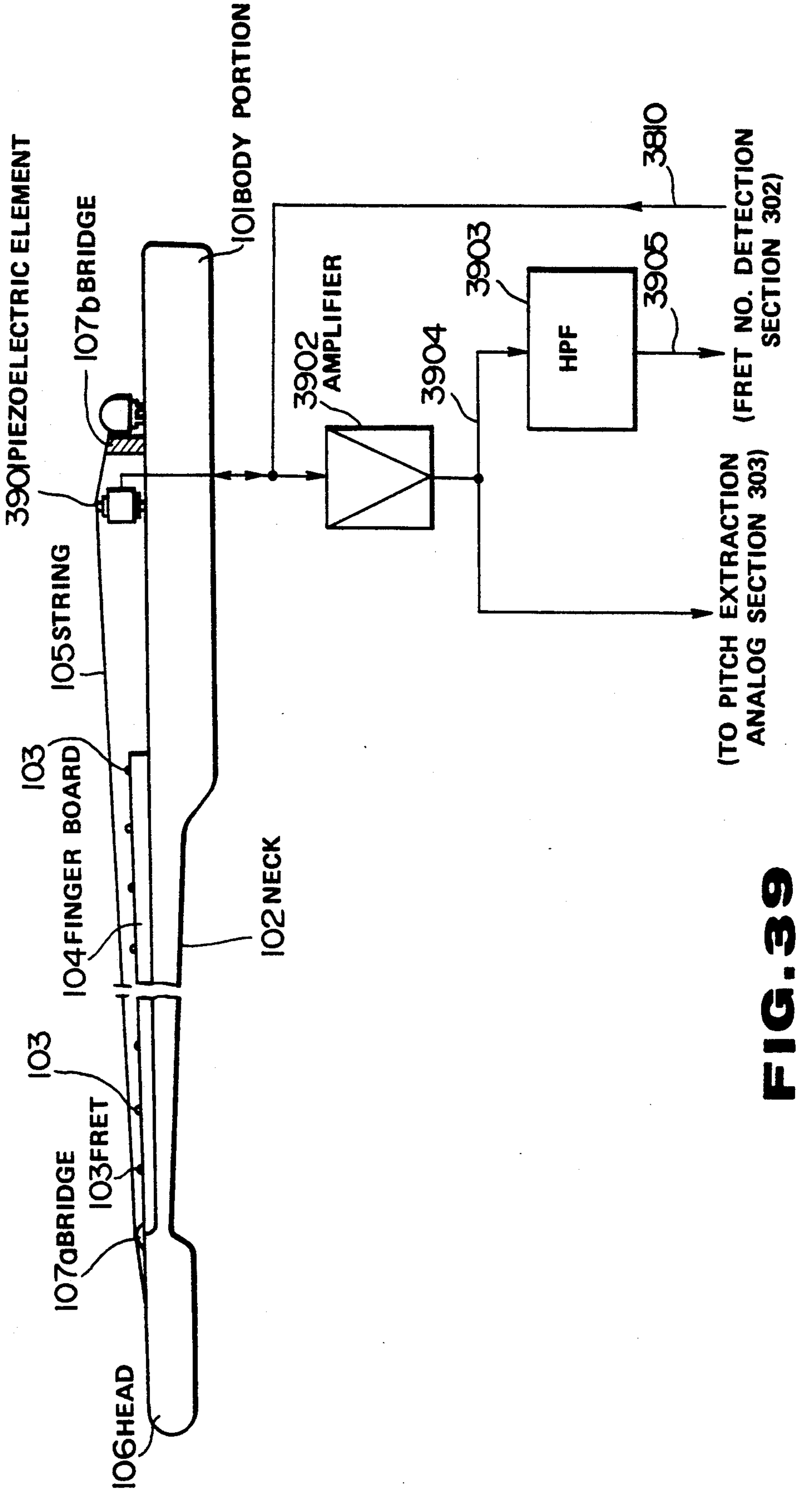
FIG. 39 is a view showing an arrangement according to the fourth embodiment of the present invention.

This embodiment has an arrangement wherein the hexa-pickup 110 and the piezoelectric element 3701 in FIG. 37 are replaced with one piezoelectric element 3901, as shown in FIG. 39.

The piezoelectric element 3901 receives a high-frequency pulse 3810 from the transmitter 3802 in the fret No. detection section 302 in FIG. 3 or 38 described above. The output from the element 3901 is amplified by an amplifier 3902, and a low-frequency component of an output 3904 from the amplifier is filtered out through an HPF 3903. The filtered signal is output to a receiver 3803 in the fret No. detection section 302 in FIG. 38 as an ultrasonic detection signal 3905. At the same time, the output 3904 from the amplifier 3902 is also input to the pitch extraction analog section 303 in FIG. 3 and is subjected to string vibration detection.

(Operation)

The operation of the fourth embodiment in FIGS. 39 and 38 will now be described.

In this embodiment, the piezoelectric element 3901 serves both as the piezoelectric element 3701 and the hexa-pickup 110 in the third embodiment shown in FIG. 37.

The operations associated with the high-frequency pulse 3810 input from the fret No. detection section 302 in FIG. 3 or 38 to the piezoelectric element 3901 in FIG. 39 and the ultrasonic detection signal 3905 output from the piezoelectric element 3901 to the fret No. detection section 302 through the amplifier 3902 and the HPF 3903 are the same as those in the third embodiment.

In this case, a low-frequency string vibration caused by plucking the string 105 in FIG. 39 by the player is simultaneously detected by the piezoelectric element 3901. However, since this component is effectively removed by the HPF 3903, the ultrasonic detection signal 3905 output to the fret No. detection section 302 in FIG. 38 can be prevented from being mixed with the low-frequency component.

The string vibration component can be detected by inputting the output 3904 from the amplifier 3902 to the pitch extraction analog section 303 in FIG. 3 or 5. In this case, the output 3904 (six outputs corresponding to each string 105) is input to the LPFs 501 to 506 through the input terminals 534 to 539 in FIG. 5. Therefore, a high-frequency component upon detection of an ultrasonic wave component mixed in the output 3904 can be effectively removed, and only a low-frequency waveform signal as indicated by W1 in FIG. 7 can be extracted. Thus, the pitch extraction processing, and the like described above can be executed.

As described above, according to this embodiment, an operation for detecting a low-frequency string vibration and a transmission/reception operation of an ultrasonic wave for detecting a fret No. can be commonly performed by one piezoelectric element 3901, and the arrangement can be simplified.

According to the present invention, generation of a string vibration at the beginning of tone generation of a musical tone and string depression data (e.g., a depressed fret position) can be detected by a string vibration presence/absence detecting means and a string depression position detecting means at a very early timing with respect to plucking of a string, thus generating a musical tone with short response time.

Detection of pitch data and pitch control after generation of a musical tone is started can be performed by a pitch extraction means and a musical tone control means in real time on the basis of the string vibration waveform from a string vibration waveform detecting means, thus allowing pitch control of a musical tone well responding to the string vibration. As a result, a performance effect with abundant expressions on the basis of a choking operation or an operation of a tremolo arm can be obtained.

The string vibration waveform is converted into a digital waveform, and an effective peak value and a zero-crossing time immediately after the peak value are sequentially detected from the digital waveform. The string vibration presence/absence detecting means and the pitch extraction means are operated on the basis of these data, thus allowing efficient processing.

When a plurality of strings are arranged and time-divisional processing is performed for the respective strings, the performance effect is enhanced.

In the above operation, when the string depression position detecting means comprises fret switches, string depression data, i.e., a depressed fret position can be detected simultaneously with a fret operation, resulting in quick control at the beginning of generation of a musical tone.

When the string depression position detecting means comprises means for detecting a resistance from a string end to a depressed fret position to detect an effective string length, string depression data can be detected simultaneously with the fret operation without modifying the structure of the fret portion, resulting in quick control at the beginning of generation of a musical tone.

When the string depression position detecting means comprises means for measuring a turnaround time of an ultrasonic wave from a string end to a depressed fret position, the same effect as described above can be obtained without modifying the structure of the fret portion.

Furthermore, when an ultrasonic wave transmission/reception means is also used as the string vibration waveform detecting means, and a string vibration waveform as a low-frequency signal and a high-frequency signal detecting an ultrasonic wave are separated by a low-pass filter and a high-pass filter, the mechanisms described above can be simplified, thus reducing cost.

What is claimed is:

1. An electronic stringed instrument in which a vibration of at least one extended string is detected to generate a corresponding musical tone from musical tone generating means, comprising:

a plurality of frets which are arranged at a plurality of positions on a body portion below an extending direction of said string, and each of which is brought into contact with said string when said string is depressed against said body portion at a depression position to change an effective string length of said string in accordance with the depression position;

string depression position detecting means for detecting the depressed position of said string, and for producing string depression data indicating the depressed position of said string;

string vibration waveform detecting means for detecting a string vibration waveform of said string whose effective string length is being changed;

string vibration presence/absence detecting means for detecting a presence/absence condition of a string vibration of said string;

pitch extraction means coupled to said string vibration waveform detecting means for extracting pitch data from the string vibration waveform, including means for measuring a vibration period of the string vibration waveform to provide said pitch data; and musical tone control means for, when said string vibration presence/absence detecting means detects generation of the string vibration, causing said musical tone generating means to start generation of the musical tone with a pitch according to the string depression data supplied from said string depression position detecting means, and thereafter for causing said musical tone generating means to change the pitch of the musical tone, which is being generated, in accordance with the pitch data extracted by said pitch extraction means.

2. An instrument according to claim 1, further comprising string vibration data detecting means, connected to said string vibration waveform detecting means, for converting the string vibration waveform from said string vibration waveform detecting means into a digital waveform signal and for sequentially detecting an effective peak value and a zero-crossing time associated with the effective peak value from the digital waveform signal, and wherein said string vibration presence/absence detecting means detects generation of the string vibration when the effective peak value detected by said string vibration data detecting means during muting of the musical tone exceeds a predetermined threshold value for the first time, and said pitch extraction means includes means for judging a set of the effective peak value and the zero-crossing time associated with the peak value sequentially detected by said string vibration data detecting means to extract the pitch data as an interval of sequential zero-crossing times.

3. An instrument according to claim 1, wherein a plurality of strings are extended parallel to each other above said body portion with a given tension, said string depression position detecting means and said string vibration waveform detecting means are arranged in correspondence with said plurality of strings, and said string vibration presence/absence detecting means, said pitch extraction means, said musical tone generating means, said musical tone control means, and a string vibration data detecting means connected to said string vibration waveform detecting means perform operations for said plurality of strings by time-divisional processing.

4. An instrument according to claim 1, wherein a surface portion of said body portion below the extending direction of said string is hollow along the extending direction, a rubber sheet is arranged to fit in the hollow portion, and said plurality of frets are arranged at a plurality of positions in the extending direction on an upper surface of said rubber sheet; and said string depression position detecting means comprises:

a plurality of fret switches which are embedded in an inner portion of said rubber sheet between adjacent fret positions, and are turned on when said string is depressed against said rubber sheet at corresponding positions, and fret number detecting means for scanning states of said fret switches to detect a corresponding fret number as the string depression data 5. An instrument according to claim 1, wherein said string is formed by an electric conductive member having an electrical resistance, said plurality of frets are formed by electric conductive members, and said string depression position detecting means comprises effective string length detecting means for detecting an effective string length of said string, between the fret against which said string is currently depressed and a support portion of said string on a side where said string is plucked, represented by an electrical signal corresponding to the resistance of said string, the electrical signal being used to generate the string depression data.

6. An instrument according to claim 1, wherein said string is formed by a member capable of transmitting an ultrasonic wave; and said string depression position means comprises:

a piezoelectric element, arranged adjacent to a support portion of said string at a said where said string is plucked, for transmitting and receiving an ultrasonic wave with respect to said string, and fret position detecting means for measuring a time duration from when a high-frequency transmission signal is applied to said piezoelectric element to transmit the ultrasonic wave to said string until a high-frequency reception signal output from said piezoelectric element is detected, including means for receiving the ultrasonic wave reflected and returned by the fret against which said string is currently depressed, to obtain a position of the fret contacting said string, and for outputting the fret position as the string depression data.

7. An instrument according to claim 1, wherein said string is formed by a member capable of transmitting an ultrasonic wave, said string vibration waveform detecting means and said string depression position detecting means commonly include a piezoelectric element, arranged adjacent to a support portion of said string on a side where string is plucked, for detecting a string vibration of string as a low-frequency signal, and for transmitting and receiving an ultrasonic wave with respect to said string, said string vibration waveform detecting means further comprises, a low-pass filter for extracting the low-frequency signal detected by piezoelectric element and for detecting the low-frequency signal as the string vibration waveform, and said string depression position detecting means further comprises, a high-pass filter for cutting off the low-frequency signal, and fret position detecting means for measuring a time duration from when a high-frequency transmission signal is applied to said piezoelectric element to transmit the ultrasonic wave to said string until a high-frequency reception signal output from said piezoelectric element is detected, including means for receiving the ultrasonic wave reflected and returned by the fret against which said string is currently depressed through said high-pass filter, to obtain a position of the fret contacting said string, and for outputting the free position as the string depression data.

8. An electronic stringed instrument, comprising:

at least one string extended on a body;

string depression position detecting means for detecting string depression data indicating a depression position of said string;

string vibration waveform detecting means for detecting a vibration waveform of said string;

string vibration presence/absence detecting means coupled to said string vibration waveform detecting means for detecting a presence/absence condition of a vibration of said string on the basis of the vibration waveform detecting by said string vibration waveform detecting means;

pitch extraction means coupled to said string vibration waveform detecting means for extracting pitch data from the string vibration waveform detected by said string vibration waveform detecting means, including means for measuring a vibration period of the string vibration waveform to provide said pitch data; and musical tone control means for, when said string vibration presence/absence detecting means detects generation of the string vibration, instructing generation of a musical tone with a pitch according to the string depression data detected by the string depression position detecting means, and thereafter changing the pitch of the musical tone, which is being generated, in accordance with the pitch data extracted by said pitch extracting means.

9. An input control apparatus for an electronic stringed instrument, comprising:

at least one string;

effective string length detecting mean for detecting a depression position of said string to obtain an effective string length of said string;

extraction means for extracting a vibration waveform of said string;

pitch detecting means for detecting a vibration pitch of said string on the basis of the vibration waveform detected by said extraction means, including means for measuring a vibration period of the vibration waveform to provide said vibration pitch; and pitch determining means for determining a pitch of a musical tone at the beginning of tone generation from the effective string length of said string obtained by said effective string length detecting means when the vibration of said string is started, and for determining a pitch of the musical tone, after the vibration pitch sequentially obtained by said pitch detecting means.

10. An apparatus according to claim 9, wherein said pitch detecting means includes peak detecting means for detecting an effective peak of the string vibration, and measuring means for measuring a time interval of at least one of the effective peak detected by said peak detecting means and a zero-crossing point associated with the peak so as to obtain a pitch period 11. An apparatus according to claim 10, wherein said measuring means measures a time interval of every effective peak point detected by said peak detecting means to obtain the pitch period.

12. An apparatus according to claim 10, wherein said measuring means measures a time interval corresponding to at least one zero-crossing point immediately after or before the effective peak point detected by said peak detecting means to obtain the pitch period.

13. An apparatus according to claim 9, wherein said effective string length detecting means comprises:

a plurality of fret means for dividing said string into a plurality of sections, and a plurality of switch means which are switched in response to a selective depression operation of said plurality of fret means; and wherein said effective string length detecting means detects a switching operation of said plurality of switch means to obtain the effective string length.

14. An apparatus according to claim 9, wherein said string is formed by an electric conductive member having an electrical resistance; and said effective string length detecting means comprises:

a plurality of fret means, formed of an electric conductive member, for dividing said string into a plurality of sections, and electrical signal detecting means for, when said string is depressed and is brought into contact with one of said plurality of fret means, detecting the effective string length represented by an electrical signal corresponding to the resistance of said string.

15. An apparatus according to claim 9, wherein said string is formed by a member capable of transmitting an ultrasonic wave; and said effective string length detecting means comprises:

a plurality of fret means for dividing said string into a plurality of sections, and time interval detecting means for, when said string is depressed and is brought into contact with one of said plurality of fret means, detecting the effective string length at a time interval of the ultrasonic wave propagating along said string between the operated fret means and a reference position.

16. An electronic apparatus in which a vibration of at least one string is detected to cause an electronic circuit to generate a corresponding acoustic wave, comprising:

vibration start detecting means for detecting a start of a vibration of said string;

first pitch determining means for, when said vibration start detecting means detects the start of the vibration, detecting a depression position of said string to obtain an effective string length of said string and for determining a pitch of the acoustic wave the generation of which is to be started; and second pitch determining means for, after said first pitch determining means determines the pitch of the acoustic wave when the generation of the acoustic wave is started, detecting a vibration period of said string and determining a pitch of the acoustic wave so as to sequentially change the pitch in accordance with the detected vibration period.

17. An apparatus according to claim 16, wherein said first pitch determining means comprises:

a plurality of fret means for dividing said string into plurality of sections;

a plurality of switch means which are switched in response to a selective depression operation of said plurality of fret means; and means for detecting a switching operation of said plurality of switch means to obtain the operated fret means and for determining the pitch of the acoustic wave when the generation is started 18. An apparatus according to claim 16, wherein said string is formed by an electric conductive member having an electrical resistance; and said first pitch determining means comprises:

a plurality of fret means, formed of an electric conductive member, for dividing said string into a plurality of sections, and means for, when said string is depressed and is brought into contact with one of said plurality of fret means, detecting the operated fret means represented by an electrical signal corresponding to the resistance of said string, and determining the pitch of the acoustic wave, when the generation is started, in accordance with the detected operated fret means.

19. An apparatus according to claim 16, wherein said string is formed by a member capable of transmitting an ultrasonic wave; and said first pitch determining means comprises:

a plurality of fret means for dividing said string into a plurality of sections, and means for, when said string is depression and is brought into contact with one of said plurality of fret means, detecting the operated fret means as a time interval of the ultrasonic wave propagating along said string between the operated fret means and a reference position, and determining the pitch of the acoustic wave, when the generation is started, in accordance with the detected time interval.

20. An apparatus according to claim 16, wherein said second pitch determining means comprises:

peak detecting means for detecting an effective peak of the string vibration, and measuring means for measuring a time interval of at least one of the effective peak detected by said peak detecting means and a zero-crossing point associated with the pea so as to obtain the vibration period of said string; and wherein said second pitch determining means includes means for determining a pitch while changing the pitch of the acoustic wave on the basis of the vibration period measured by said measuring means.

* * * * *